(12) United States Patent
Smith et al.

(10) Patent No.: US 12,511,109 B2
(45) Date of Patent: *Dec. 30, 2025

(54) SOFTWARE SYSTEMS AND METHODS FOR MULTIPLE TALP FAMILY ENHANCEMENT AND MANAGEMENT

(71) Applicant: C Squared IP Holdings LLC, Scottsdale, AZ (US)

(72) Inventors: Scott Andrew Smith, Ocala, FL (US); Christopher Graham Smith, Aurora, CO (US); Kevin David Howard, Mesa, AZ (US)

(73) Assignee: C SQUARED IP HOLDINGS LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/079,153

(22) Filed: Mar. 13, 2025

(65) Prior Publication Data
US 2025/0208841 A1 Jun. 26, 2025

Related U.S. Application Data

(63) Continuation-in-part of application No. 18/957,563, filed on Nov. 22, 2024, now Pat. No. 12,393,410.
(Continued)

(51) Int. Cl.
*G06F 8/41* (2018.01)
*G06F 11/3698* (2025.01)

(52) U.S. Cl.
CPC .......... *G06F 8/447* (2013.01); *G06F 11/3698* (2025.01)

(58) Field of Classification Search
CPC ........ G06F 8/4441; G06F 8/4434; G06F 8/45; G06F 9/455; G06F 8/447; G06F 11/3698
See application file for complete search history.

(56) References Cited

U.S. PATENT DOCUMENTS 11,687,328 B2 * 6/2023 Smith ...................... G06F 9/455
717/151
11,861,336 B2 * 1/2024 Smith .................. G06F 11/3698
(Continued)

*Primary Examiner* — Wei Y Zhen
*Assistant Examiner* — Amir Soltanzadeh
(74) *Attorney, Agent, or Firm* — Skaar Ulbrich Macari, P.A.

(57) ABSTRACT

Systems and methods of software enhancement and management can comprise inputting one or more data transformation algorithms representing asset data, decomposing the one or more data transformation algorithms into a plurality of TALPs, executing the plurality of TALPs to generate at least one or more value complexity prediction polynomials, simulating one or more investment data units and external stored data to generate a simulated data output based at least on the one or more value complexity prediction polynomials, executing a TALP control engine using predictive analytics and at least the simulated data output to create temporally sequenced TALP output data, pooling the temporally sequenced TALP output data, modeling predictive outcomes based at least on the pooled temporally sequenced TALP output data merged with external unoptimized context data via a feedback loop over time, and outputting optimized and discretized data based on the modeled predictive outcomes.

22 Claims, 63 Drawing Sheets

Related U.S. Application Data which is a continuation-in-part of application No. 18/586,490, filed on Feb. 25, 2024, now Pat. No. 12,175,224, which is a continuation of application No. 18/241,943, filed on Sep. 4, 2023, now Pat. No. 11,914,979, which is a continuation of application No. 18/102,638, filed on Jan. 27, 2023, now Pat. No. 11,861,336, which is a continuation-in-part of application No. 17/887,402, filed on Aug. 12, 2022, now Pat. No. 11,687,328.

(60) Provisional application No. 63/602,337, filed on Nov. 22, 2023, provisional application No. 63/602,339, filed on Nov. 22, 2023, provisional application No. 63/303,945, filed on Jan. 27, 2022, provisional application No. 63/232,576, filed on Aug. 12, 2021.

(56) References Cited

U.S. PATENT DOCUMENTS

| | | | |
|---|---|---|---|
| 11,914,979 B2* | 2/2024 | Smith | G06F 11/3698 |
| 12,175,224 B2* | 12/2024 | Smith | G06F 8/447 |
| 2017/0052960 A1* | 2/2017 | Alizadeh-Shabdiz | G06F 16/285 |
| 2020/0210162 A1* | 7/2020 | Howard | G06F 8/45 |
| 2020/0242268 A1* | 7/2020 | Epasto | G06F 16/285 |
| 2020/0342539 A1* | 10/2020 | Doney | G06Q 40/06 |
| 2021/0064639 A1* | 3/2021 | Wang | G06N 3/08 |
| 2021/0397703 A1* | 12/2021 | Stocks | G06F 21/577 |
| 2023/0127715 A1* | 4/2023 | Howard | G06F 5/01 708/136 |

* cited by examiner

| Example Input Dataset Size and Space Allocation ||
|---|---|
| d-values | s-values |
| 2 | 3 |
| 4 | 15 |
| 6 | 31 |

Table 1: Example Sorted Input Dataset Size and Space

FIG. 6A

| Example Source Values Table ||
|---|---|
| d-values | s-values |
| 1 | 1.000 |
| 2 | 4.333 |
| 3 | 10.333 |

Table 2: Example Source Values

FIG. 6B

| Scaled d-values | Example Scaled Target Values | | | | |
|---|---|---|---|---|---|
| | | | | | |
| 1 | | 0.000 | 0.000 | 1.000 | 1.000 | 1 |
| 2 | | 0.693 | 1.000 | 2.000 | 2.828 | 4 |
| 3 | | 1.099 | 1.585 | 3.000 | 5.196 | 9 |
| ... | | ... | ... | ... | ... | ... |
| n | | $\log_e n$ | $\log_2 n$ | $n$ | $n^{1.5}$ | $n^2$ |

Function Terms as Column Header

Table 3: Example Target Values

FIG. 6C

Table 4: Example New Source Values

Table 5: Example Shifted Source Values

Simulation and Selection Work Flow

TALP Family Generation Detail: General Embodiment

TALP Cross-Family Generation Details: General Embodiment

Stand-Alone (Single Server) System Examples

Data Discretization Optimization (DDO) Engine Details

Risk/Return Allocation Vehicle (rRAV) Engine Details

Cash Flow Distribution

Time, Event, Value Graph

Real-Time Portfolio Management Engine
with a Feedback Loop for a PE Fund or REIT Financing Engine for a PE Fund or REIT Real-Time Return Prediction Engine for a Structured PE Fund or REIT Data Flow and Analytics for Managing the Cash Flow of a PE Fund or REIT Using a Series of Credit Enhanced Rated Financings Data Flow and Analytics For Structuring and Managing Investment Units and Investment Vehicles That Provide Collateral For Credit Enhanced PE Funds and REITs.

SOFTWARE SYSTEMS AND METHODS FOR MULTIPLE TALP FAMILY ENHANCEMENT AND MANAGEMENT

CROSS-REFERENCE TO RELATED APPLICATIONS

This Application is a continuation-in-part of U.S. patent application Ser. No. 18/957,563, filed Nov. 22, 2024, which is a continuation-in-part of U.S. patent application Ser. No. 18/925,534, filed Oct. 24, 2024, which is a continuation of U.S. patent application Ser. No. 18/586,490, filed Feb. 25, 2024 and now issued as U.S. Pat. No. 12,175,224, which is a continuation of U.S. patent application Ser. No. 18/241,943, filed Sep. 4, 2023 and now issued as U.S. Pat. No. 11,914,979, which is a continuation of U.S. patent application Ser. No. 18/102,638, filed Jan. 27, 2023 and now issued as U.S. Pat. No. 11,861,336, which is a continuation-in-part of U.S. patent application Ser. No. 17/887,402, filed Aug. 12, 2022 and now issued as U.S. Pat. No. 11,687,328, wherein U.S. patent application Ser. No. 18/957,563 claims priority to and the benefit of U.S. Provisional Patent Application No. 63/602,337, filed Nov. 22, 2023, and U.S. Provisional Patent Application No. 63/602,339, filed Nov. 22, 2023, wherein U.S. patent application Ser. No. 18/102,638 claim priority to and the benefit of U.S. Provisional Patent Application No. 63/303,945, filed Jan. 27, 2022, and wherein U.S. patent application Ser. No. 17/887,402 claims priority to and the benefit of U.S. Provisional Patent Application No. 63/232,576, filed Aug. 12, 2021; with each of the listed and referenced applications and disclosures full incorporated herein by reference.

TECHNICAL FIELD

This disclosure generally relates to software systems and methods and, more particularly, to software systems and methods of time affecting linear pathway (TALP) management and TALP family enhancement.

BACKGROUND OF THE INVENTION

There exist many software products that analyze streams of input data and generate predictive outcomes or take user requests and analyze data for patterns. Examples include disease-spreading analysis systems like Airfinity's Cardio Metabolic & Vascular™ product, traffic analysis software like the TRANSOFT SOLUTIONS Vehicle Turn Simulation™ product, and investment analysis and fund or portfolio management systems like multiple products from IBM's MorningStar™.

Technology is a major part of the United States economy, with software playing a major role. By 2020, software alone accounted for $933 billion dollars of the US technology economy's $1.9 trillion dollars, which is 49%. The domination of software in technology will likely continue for the foreseeable future as almost every US company generates and uses software. Consider that in 2022, the average software engineer earns $127,342 per year, with an expected shortfall of 1.2 million software engineers by 2026. This means organizations will need to use non-software engineering personnel to meet their software creation, update, and repair needs. This, in turn, implies a need for new software tools and management techniques to automatically extend existing software functionality using new algorithmic solutions without sacrificing processing performance.

SUMMARY OF THE INVENTION

The present invention provides an extension to the multiple Time-Affecting Linear Pathway (TALP) family enhancement and management system (MTF E&M system) using feedback and feedforward loops with historical, real-time, and predicted output data to optimize pooled TALP output data and distribute the optimized pooled outputs. The present invention converts algorithms and software codes into TALPs and converts paired Input/Output (I/O) datasets into TALPs with associated prediction polynomials. These system-generated TALPs can be merged with enhancement TALPs as part of an enhancement and management system. After TALPs are generated, their associated prediction polynomials are used in simulation. Comparing the simulated output values with an associated set of acceptance criteria output values allows for the automatic selection of TALPs. Alternatively, in various embodiments, these system-generated and enhanced TALPs are grouped into families and cross-families. Uniquely, the TALP Families disclosed herein concern grouping TALPs by matching the outputs of the TALP-associated prediction polynomials with some set of given Family or Cross-Family acceptance criteria. Output data from TALPs that are grouped into families and/or cross-families are modeled, combined (e.g., pooled), discretized, and optimized, which is a new type of software optimization to enhance or meet user goals.

Particular embodiments of the present invention, e.g., the Multiple TALP Family Enhancement and Management (MTF E&M) system with multiple pooled TALP output optimized for combining, routing, and distribution, include stand-alone servers, client-server, and cloud-based systems. Temporal and spatial TALPs using various input sources including past/historical outputs, current/real-time outputs, and future/predicted outputs are used in the optimization process. Optimization uses a generated set of TALP analytics to structure and distribute data either continuously or per data distribution epoch. The data distribution epochs are defined in terms of advanced time complexity prediction polynomials. The resources required to process data are defined in terms of advanced space complexity prediction polynomials. The generated output is defined in terms of either type I or type II advanced value complexity.

Various embodiments of the present invention can include a method and system of software enhancement and management that comprises inputting one or more data transformation algorithms, wherein the one or more data transformation algorithms do not include software application source code, decomposing the one or more data transformation algorithms into a plurality of TALPS, executing the plurality of TALPs using a set of test data to generate associated value complexity prediction polynomials, advanced time complexity prediction polynomials, and advanced space complexity prediction polynomials, simulating TALP behavior by executing the generated, associated prediction polynomials, selecting one or more of the plurality of TALPs based on acceptance criteria, wherein the acceptance criteria includes one or more expected input to output value ranges, one or more expected TALP execution timings, and one or more expected TALP memory allocation requirements, modeling one or more outcomes with actual expected input data values using the value complexity prediction polynomials, the advanced time complexity prediction polynomials, and the advanced space complexity prediction polynomials for each of the selected one or more TALPs, and defining optimum TALP groupings for solution sets.

Various embodiments of the present invention can include components used to expand the TALP Enhancement and Management System for optimizing output values for use in temporal sequencing. This can include a three-engine system for optimizing TALP Family Temporal Sequencing (TFTS) and its use in an associated, example three-engine system for optimizing Credit Enhanced Temporally Sequenced Securities (CETSS) for a private equity (PE) Fund or real estate investment trust (REIT). The full TFTS discloses the merger of context data and all the TALP data In a TALP family, including the inherent predictive analytics from an analysis of multiple input data types for multiple TALPs that are within a TALP family, to predict the enhanced and optimized aggregate outputs of the TALP family. Various embodiments include the merger of finance data with multiple asset data in a portfolio, including the inherent predictive analytics from an analysis of multiple input asset data types within the portfolio to predict enhanced and optimized aggregate portfolio returns. Multiple feedback loops to CETSS execution engines serve to further improve the CETSS system's efficiency. The net effect of the CETSS system is that the manager of a PE Fund or REIT can double the return on their Assets Under Management (AUM) while also substantially reducing the time it takes to launch a new fund, thus showing an example of the enhancement and optimization capabilities possible from the use of a three-engine system for TALP Family Temporal Sequencing.

In various embodiments, Extensions or expansions of the TALP family enhancement and management system combine the effects of a TALP Execution Engine, a TALP Family Processing Engine, and a TALP Family Modeling Engine. This three-engine model generates a set of temporal predictions that can vary in real time, using feedback loops between the components. At each temporal epoch, time-sequenced optimization, and output discretization can be generated at temporal outputs. PE Funds and REITs have traditionally been capitalized at their inception using funding from a combination of sources; usually the managers of the investment vehicle (GPs), the equity investors (LPs), and the creditors (subscription lenders and bond investors). A return from the PE fund or REIT is usually realized through the liquidation of its assets upon maturity. Such investments are thus generally illiquid, of long duration, and "blind" at inception. The return that is necessary to attract equity investors in the industry is therefore high, around 14% per year. Returns are net of the GPs' fees, which are typically 2% per year plus a 20% carried interest. The industry has thus developed to be able to generate high gross returns, suggesting there may be other more efficient means of managing and financing investment vehicles than the ones used today. Other embodiments of the present invention can implement a different number of engines, some of these engines, and/or a different use, type, and combination of engines entirely.

An embodiment or instantiation of a system that optimizes the real-time operation of multiple aspects of operating a PE Fund or REIT is provided. The instantiation merges and uses data transformation algorithms to automatically convert the inherent predictive analytics in multiple types of unoptimized data in three optimization engines running in parallel into optimized TALP family output data in an advanced instantiation of Type II Chained TALPs. Merging of unoptimized Business data, Capital Markets data (which includes the goals of the GPs and LPs), and Portfolio Data in a Portfolio Management Engine is provided that uses data transformation algorithms to automatically convert the inherent predictive analytics in the merged data into optimized TALP family outputs (Selecting and Acquiring Assets, Managing Assets, and Selling Assets) used to optimize the selection and management of a PE Fund or REIT's Portfolio.

Various embodiments of the present invention can include inputting one or more data transformation algorithms representing asset data; decomposing the one or more data transformation algorithms into a plurality of TALPs, executing the plurality of TALPs to generate at least one or more value complexity prediction polynomials, simulating one or more investment data units and external stored data to generate a simulated data output based at least on the one or more value complexity prediction polynomials, executing a TALP control engine using predictive analytics and at least the simulated data output to create temporally sequenced TALP output data, pooling the temporally sequenced TALP output data, modeling predictive outcomes based at least on the pooled temporally sequenced TALP output data merged with external unoptimized context data via a feedback loop over time, and outputting optimized and discretized data based on the modeled predictive outcomes.

BRIEF DESCRIPTION OF THE DRAWINGS

The accompanying drawings, which are incorporated herein and form part of the specification, illustrate various embodiments of the present disclosure and, together with the description, further explain the principles of the disclosure and enable a person skilled in the pertinent art to make and use the embodiments disclosed herein. In the drawings, like reference numbers indicate identical or functionally similar elements.

FIG. 6A is a table showing example sorted input dataset size and space, in accordance with embodiments of the present invention.

FIG. 6B is a table showing example source values, in accordance with embodiments of the present invention.

FIG. 6C is a table showing example target values, in accordance with embodiments of the present invention.

DETAILED DESCRIPTION

Figure 1:
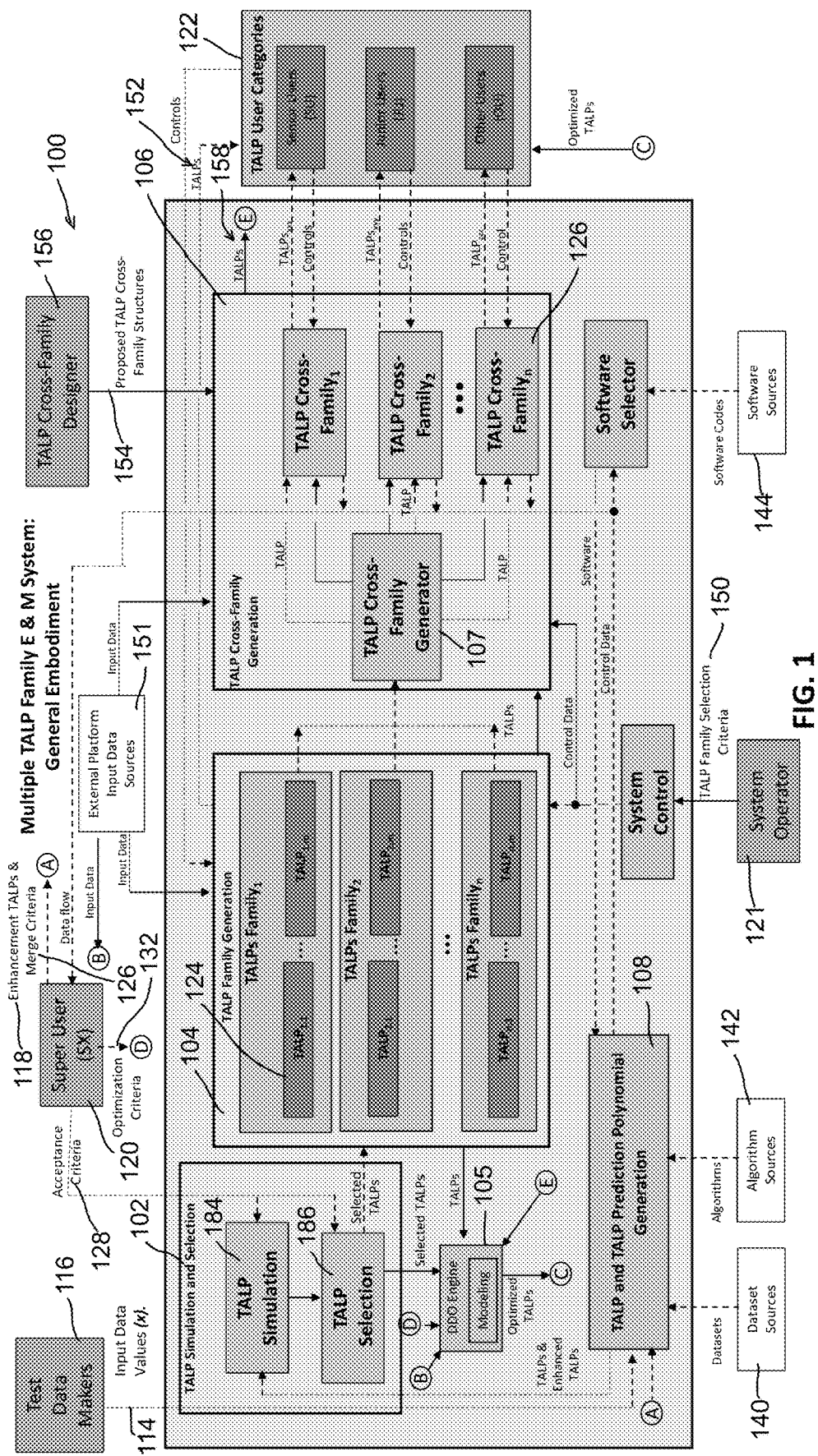
FIG. 1 is a diagram showing an example of the general MTF E&M system which can receive datasets, algorithms, or software codes and convert them into TALPs to be modeled and pooled for use by, or distribution to, various users or placed into families or cross-families of TALPs for use by, or distribution to, various classes of users, in accordance with embodiments of the present invention.

The present invention provides an extension to the multiple TALP family enhancement and management system (MTF E&M system) using feedback and feedforward loops with historical, real-time, and predicted output data to optimize pooled TALP output data and distribute the optimized pooled outputs. The MTF E&M system is comprised of time-affecting linear pathway (TALP) and TALP prediction polynomial generation, TALP enhancement, TALP simulation and selection, TALP modeling, TALP family/cross-family generation, and family/cross-family TALP output data optimization. TALPs are generated from paired Input/Output (I/O) datasets or from the decomposition of algorithms and/or software codes. TALPs are executed using test input data to generate prediction polynomials. System-generated TALPs can be merged with enhancement TALPs. Using TALP-associated prediction polynomials and acceptance criteria comprised of paired I/O datasets that represent acceptable TALP behavior, system-generated and enhanced TALPs are simulated and selected. The TALP-associated prediction polynomials of selected TALPs are then modeled using actual input data values from external platforms, and their output data values pooled, discretized, and optimized for use by, or distribution to, system users. Alternatively, the TALP-associated prediction polynomials of selected TALPs are executed using the input values from the TALP Family Selection criteria for inclusion in TALP Families. The associated output values of these TALP-associated prediction polynomials are compared to the associated output values of the TALP Family Selection criteria. TALP-associated prediction polynomials from each family can be re-executed using input from the Proposed TALP Cross-Family Structure criteria, with output value comparison for inclusion in one of those structures. TALP-associated prediction polynomials for each TALP in each TALP Family and each TALP Cross-Family are modeled using actual input data from external platforms, and their output data values pooled, discretized, and optimized for use by, or distribution to, system users.

A TALP is an execution pathway through an algorithm or software code which includes looping structures. TALPs allow for the direct and automatic selection of a pathway through an algorithm or software code via the examination of the values of input non-loop-control variable attributes. Time prediction for TALPs occurs through varying the input loop control variable attributes and generating a time prediction polynomial. This means that examining the values of input loop control variable attributes is enough to know the processing time of a TALP. The output value prediction of a TALP occurs through varying the attribute domain of the input variable attributes that affect output values forming an output prediction polynomial. This means that it is possible to know the output values of a TALP through the examination of the input variables. Various TALP methods and systems are disclosed in U.S. Pat. No. 11,520,560, which is hereby fully incorporated herein by reference and can be implemented with various aspects, embodiments, methods, and systems of the present invention.

Various devices or computing systems can be included and adapted to process and carry out the aspects, computations, and algorithmic processing of the software systems and methods of the present invention. Computing systems and devices of the present invention may include a processor, which may include one or more microprocessors and/or one or more circuits, such as an application specific integrated circuit (ASIC), field-programmable gate arrays (FPGAs), etc. Further, the devices can include a network interface. The network interface is configured to enable communication with a communication network, other devices and systems, and servers, using a wired and/or wireless connection.

The devices or computing systems may include memory, such as non-transitive, which may include one or more non-volatile storage devices and/or one or more volatile storage devices (e.g., random access memory (RAM)). In instances where the computing devices include a microprocessor, computer readable program code may be stored in a computer readable medium or memory, such as, but not limited to drive media (e.g., a hard disk or SSD), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input device is configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile device screens, tablet screens, speakers, remote screens, etc. The output device can be configured to display images, media files, text, video, or play audio to a user through speaker output.

Server processing systems for use or connected with the systems of the present invention, can include one or more microprocessors, and/or one or more circuits, such as an application specific integrated circuit (ASIC), field-programmable gate arrays (FPGAs), etc. A network interface can be configured to enable communication with a communication network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable medium, such as, but not limited to drive media (e.g., a hard disk or SSD), optical media (e.g., a DVD), memory devices, etc.

FIG. 1 is a diagram showing an example of a multiple TALP Family Enhancement and Management (MTF E&M) system 100. The exemplary MTF E&M System shown in FIG. 1 is composed of four primary components: TALP Simulation and Selection 102, TALP Family Generation 104, TALP Cross-Family Generation 106, and TALP and TALP Prediction Polynomial Generation 108.

Figure 2:
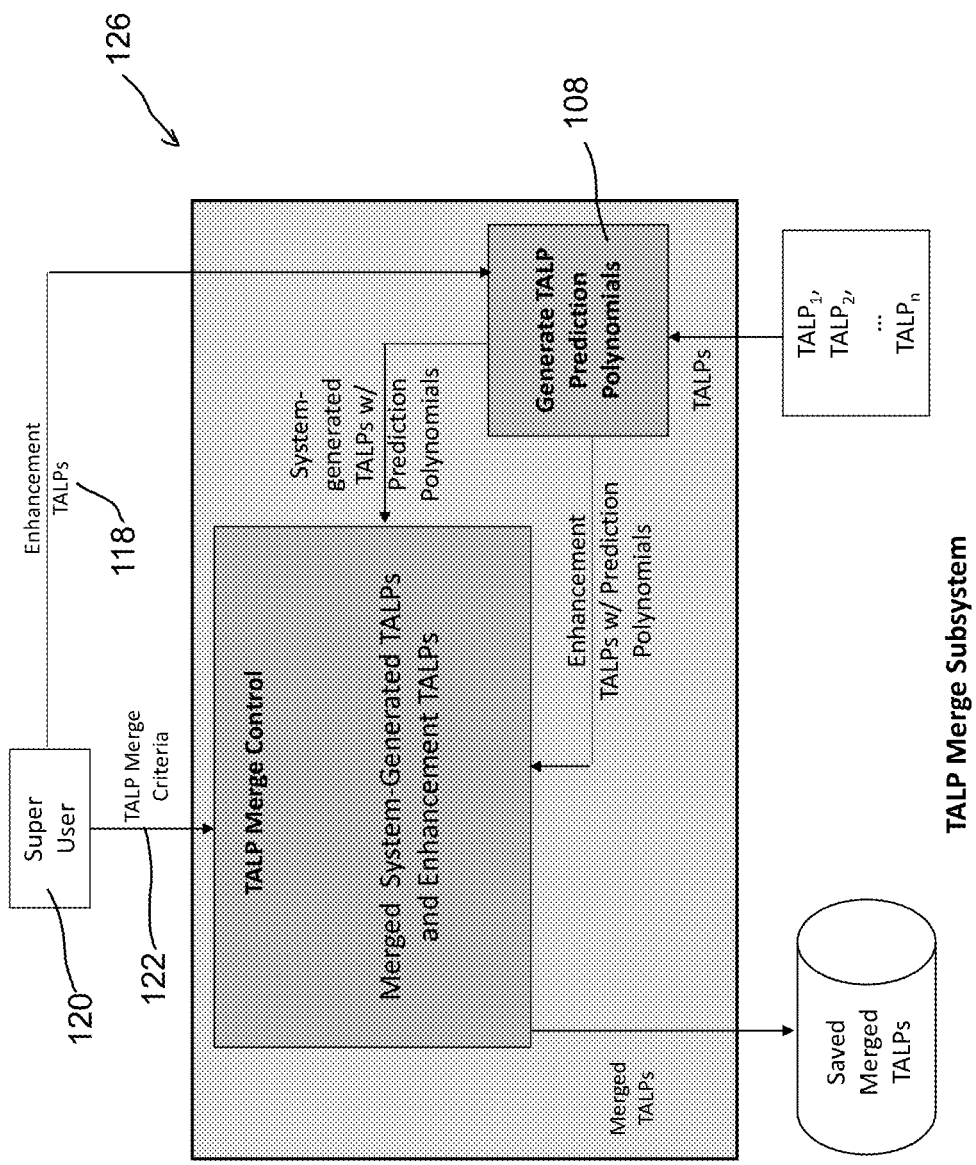
FIG. 2 shows a diagram where system-generated TALPs with their prediction polynomials are merged with externally defined enhancement TALPs from the Super User, in accordance with embodiments of the present invention.
Figure 3:
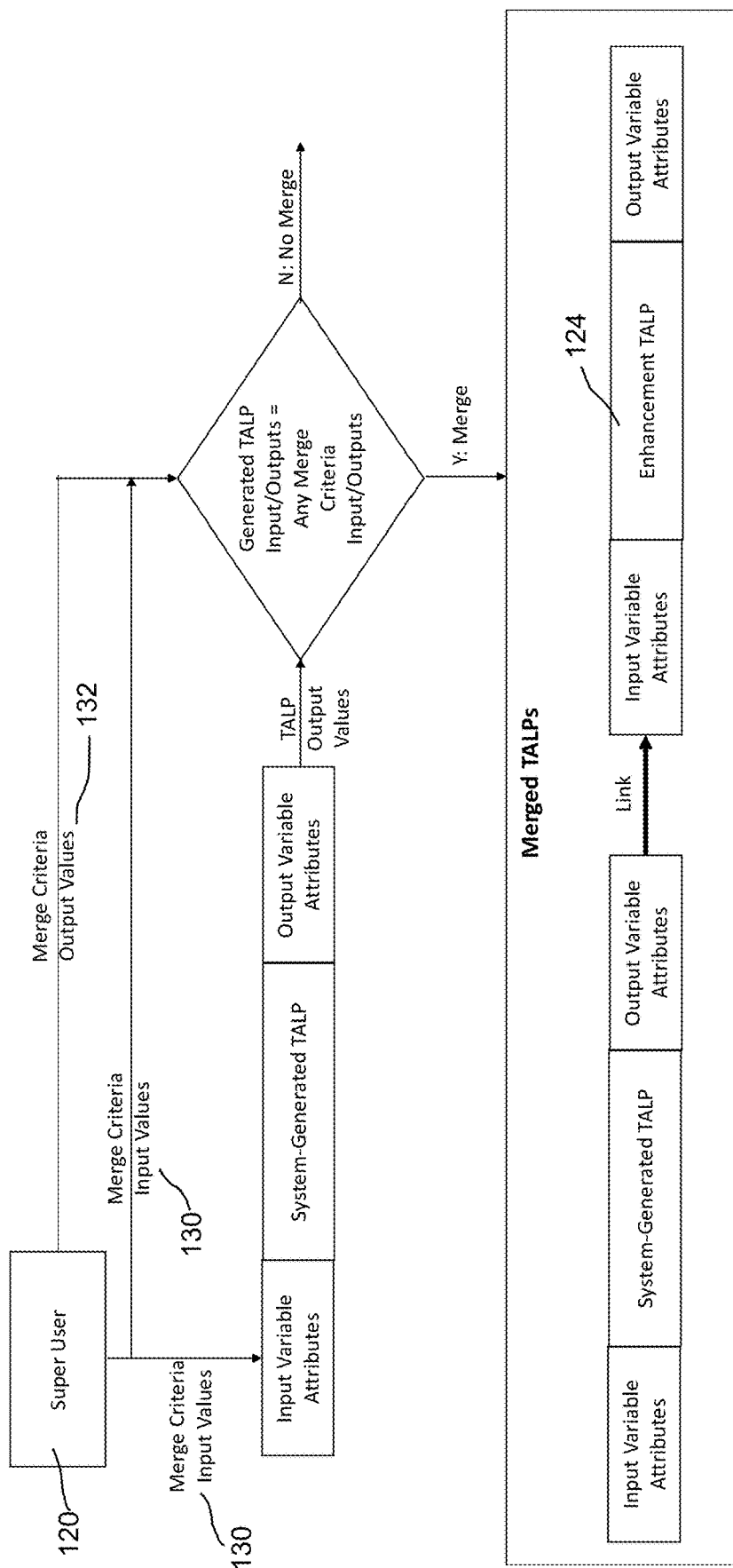
FIG. 3 shows a diagram detailing the merger of a system-generated TALP and an enhancement TALP from the Super User, in accordance with embodiments of the present invention.

Referring to FIGS. 2-3, the present invention comprises software systems and methods that use TALPs that are generated from detected paired I/O dataset values (automatic conversion to TALP form), algorithms, and/or software codes. The generated TALPs, regardless of their origin, can be used to create a set of executable prediction polynomials 112, as shown for FIG. 3 and FIG. 4. These prediction polynomials are generated in the TALP and TALP Prediction Polynomial Generation component 108 of the MTF E&M system 100, and General embodiment, by varying input data values 114 from the Test Data Makers 116, giving associated output values, timings, and memory allocation. These output values, timings, and memory allocation values are used in an extended source values table, from which the prediction polynomials are constructed. Once a TALP with its associated prediction polynomials has been generated, then it is possible for that TALP's performance to be enhanced by merging the system-generated TALP with another TALP called an enhancement TALP 118 that originates from the Super User 120. This merging is shown in FIG. 2 and FIG. 3.

FIG. 2 shows a diagram whereby the Super User 120 sends both merge criteria 122 and enhancement TALPs 118 with their associated prediction polynomials to the TALP Merge subcomponent 126 of the system's TALP and TALP Prediction Polynomial Generation component 108. The TALP Merge subcomponent uses the merge criteria and the enhancement TALPs to determine if an enhancement TALP is to be merged with some system-generated TALP. Merging for the system 100 means linking the output of one TALP to the input of another TALP. There are two possible ways for a single system-generated TALP to be merged with a single enhancement TALP: (1) the output of the system-generated TALP can be the input to the enhancement TALP, or (2) the output of the enhancement TALP can be the input of the system-generated TALP. More than one enhancement TALP can be linked to a single system-generated TALP.

FIG. 3 shows a workflow of a system-generated TALP receiving the merge criteria input values 130 from the Super User 120. The system-generated TALP's prediction polynomials execute using the input values to generate associated output values. The output values are then compared to the merge criteria output values 132 to determine a match. System-generated TALP prediction polynomials whose output match the merge criteria are shown to be linked to an associated enhancement TALP 124.

After TALP generation, the prediction polynomials of the system-generated and enhanced TALPs are used in simulation 184. These prediction polynomials are executed using input data from acceptance criteria 128, giving associated outputs. Comparing the simulated output values with the associated set of acceptance criteria output values allows for the automatic selection 186 of TALPs. Once the TALP is simulated and selected, it is then either modeled in the Data Discretization Optimization Engine (DD) 105 using actual input data values from external platforms and made available for use by, or distribution directly to, a TALP user 122 or matched to criteria for placement into a TALP Family 124 or TALP Cross-Family 126. Selected TALPs are added to TALP families based on the TALP Family Selection criteria. TALPs from more than one TALP family can be combined into TALP Cross-Families using proposed TALP Cross-Family structures. The behavior of each TALP in a TALP Families 124 or TALP Cross-Families 126 can be modeled in the Data Discretization Optimization Engine 105 using actual input data values from external platforms, and their output data values pooled, discretized, and optimized for use by, or distribution to, system users.

Figure 4:
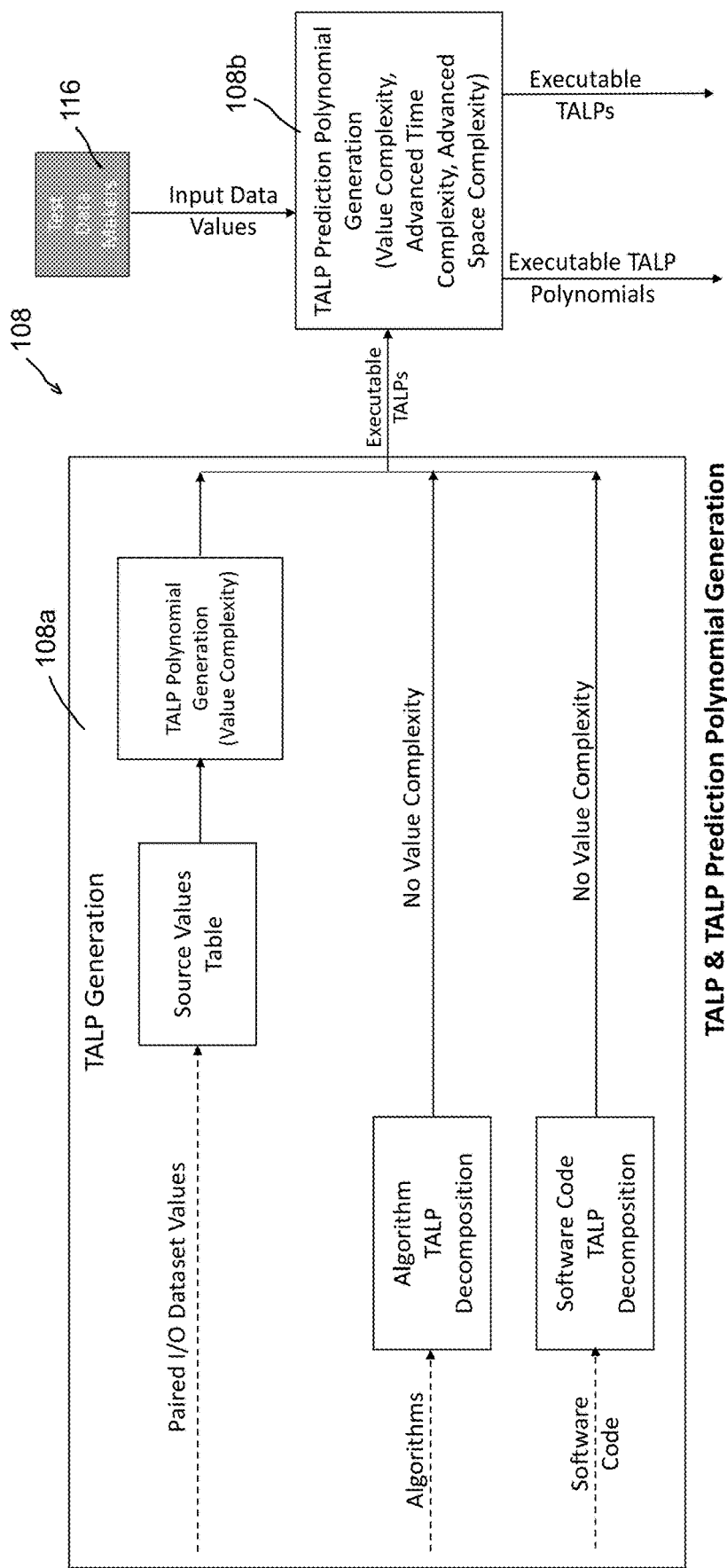
FIG. 4 is a diagram showing multiple types of inputs converted into TALPs that are used to generate TALP prediction polynomials, in accordance with embodiments of the present invention.

FIG. 4 shows various embodiments of the systems and methods of the present invention perform the following communication and processing:
1) In order to generate TALPs and TALP prediction polynomials 112, the "TALP and TALP Prediction Polynomial Generation" component 108 of the MTF E&M system 100 receives paired I/O Datasets (called Datasets) from Dataset Sources 140, algorithms from Algorithm Sources 142, software codes from Software Sources 144, and input data values from the Test Data Makers 116. For paired I/O Datasets, there is no algorithm or software code to decompose into TALPs; instead, a Value Complexity polynomial that represents a TALP is generated. Once a TALP has been generated, its behavior can be enhanced by merging enhancement TALPs, from the Super User, with the system-generated TALPs.

2) The "TALP Simulation and Selection" component 102 of the MTF E&M system 100 receives the generated TALPs with their associated prediction polynomials and the acceptance criteria (comprised of a set of acceptable input values with associated acceptable output values).

a. The "TALP Simulation and Selection" component 102 activates its "TALP Simulation" subcomponent 184 using the list of generated TALPs with their associated prediction polynomials from the "TALP and TALP Prediction Polynomial Generation" component 108 and the acceptable input values of the acceptance criteria from the Super User 120. The various TALP prediction polynomials are executed using these acceptable input values, generating a set of associated predicted output values for each TALP.

b. The "TALP Simulation and Selection" component 102 activates its "TALP Selection" subcomponent 186 using these acceptable input values with their generated associated predicted output values from the TALP simulation. These predicted output values are compared to the acceptable output values of the Acceptance Criteria 128, creating a set of selected TALPs when the generated predicted output values match the acceptable output values. Selected TALPs are either modeled using actual input data values from external platforms for direct use by system users or executed using the input values from the TALP Family Selection criteria for inclusion in TALP Families.

3) The "TALP Family Generation" component 104 of the MTF E&M system 100 receives the selected TALPs with their associated prediction polynomials from the "TALP Simulation and Selection" component 102 and the TALP Family Selection Criteria 150 (comprised of a set of acceptable input values with associated output values for each family type) from the System Operator 121. The prediction polynomials associated with each selected TALP executed using the acceptable family input values generating a set of output values that are compared to the acceptable family output values for inclusion into the matching family.

a. After inclusion in a TALP Family, the prediction polynomials of each TALP in each Family are executed using input data from external platform TALP input data sources 151, generating a pool of output values 152 made available to TALP User Categories.

b. Alternately, after inclusion in a TALP Family, the prediction polynomials of each TALP in each Family are modeled in the DDO Engine 105 then pooled, discretized and optimized for use by, or distribution to, the various TALP User Categories.

4) The "TALP Cross-Family Generator" component 107 of the MTF E&M system 100 receives the TALPs with their associated prediction polynomials from the families of the "TALP Family Generation" component 104 and the Proposed TALP Cross-Family Structure 154 (comprised of a set of cross-family acceptable input values with associated output values for each cross-family type) from the TALP Cross-Family Designer 156. The prediction polynomials associated with each TALP of each TALP Family are executed using the acceptable cross-family input values generating a set of output values that are compared to the acceptable cross-family output values, for inclusion into the matching cross-family.

a. After inclusion in a TALP Cross-Family, prediction polynomials of each TALP in each cross-family are executed using external platform input data from actual TALP input data sources, generating a pool of output values 158 made available to TALP User Categories.

b. Alternately, after inclusion in a TALP Cross-Family, the prediction polynomials of each TALP in each Family are modeled in the DDO Engine 105 then pooled, discretized and optimized for use by, or distribution to, the various TALP User Categories.

FIG. 4 is a diagram showing the details of the TALP and TALP Polynomial Generation component 108 of the MTF E&M system 110: general embodiment, including TALP generation 108a and TALP Prediction Polynomial Generation 108b. The polynomial form of an algorithm occurs when a set of input variable attribute values can be used to generate a set of output variable attribute values and that those values approximate the original algorithm behavior to within some epsilon. This means that a predictive, executable polynomial (Value Complexity) that is formed from data detection represents an algorithm in polynomial form. That is, it is possible to automatically generate TALPs from sets of detected data. TALPs can also be generated from the decomposition of algorithms and software code.

Executing the generated TALPs using test data from the Test Data Maker 116 allows the system to generate both advanced time complexity and advanced space complexity polynomials. Advanced time complexity uses input variable attribute values to predict the processing time. Descaling the Advanced Time Complexity polynomial gives the Advanced Speedup polynomial. Speedup describes the processing speed from a given input variable attribute value. Advanced space complexity uses input variable attribute values to predict memory allocation. Descaling the Advanced Space-Complexity polynomials gives the Freeup polynomials. Freeup describes the memory requirement for a given input variable attribute value. There are three Advanced Space Complexity polynomials for the following: Random Access Memory Allocation, Cache Memory Allocation, and Output Memory Allocation. Because there are three Advanced Space Complexity polynomials, there are also three Freeup polynomials.

Figure 5:
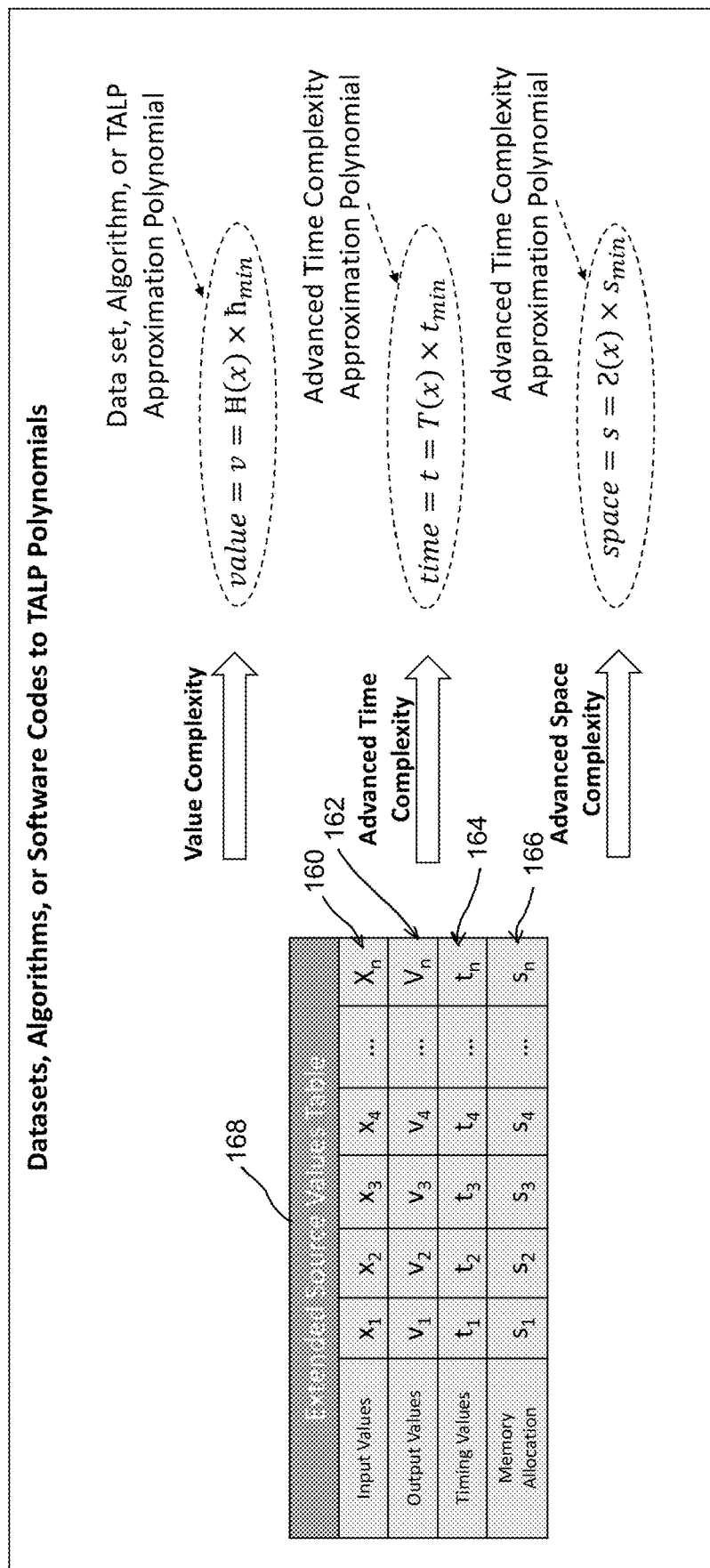
FIG. 5 is a diagram showing an input variable attribute vector, an associated output variable attribute vector, an associated timing vector, and an associated memory allocation vector converted into predictive polynomials for Value Complexity, Advanced Time Complexity, and Advanced Space Complexity, in accordance with embodiments of the present invention.

FIG. 5 is a diagram showing an input variable attribute vector 160 ($x_1$ through $x_n$), an associated output variable attribute vector 162 ($v_1$ through $v_n$), an associating timing variable attribute vector 164 ($t_1$ through $t_n$) and an associated memory allocation variable attribute vector 166 ($s_1$ through $s_n$) in an extended source values table.

The vectors are accessed pairwise: Input Values and Output Values, Input Values and Timing Values, Input Values and Memory Allocation. These pairs are used to generate respectively: Value Complexity, Advanced Time Complexity, and Advanced Space Complexity. TALP values can be generated for any valid set of input values as long as the input value is greater than the minimum value used to create the Value Complexity polynomial, the Advanced Time Complexity polynomial, or Advanced Space Complexity polynomial.

Below shows an example of how to construct polynomials from the various data vector parings. In this example, an advanced space complexity polynomial is generated from an executable software code pathway:

Example Advanced Time Complexity Polynomial Generation

A table called the Source Values table containing ordered, scaled input dataset sizes and associated scaled space values is compared to a table called the Target Values table containing a set of scaled dataset sizes and associated space values generated from some pre-existing functions depicted as the column headers, following the steps below.

Figures 6D, 6E:
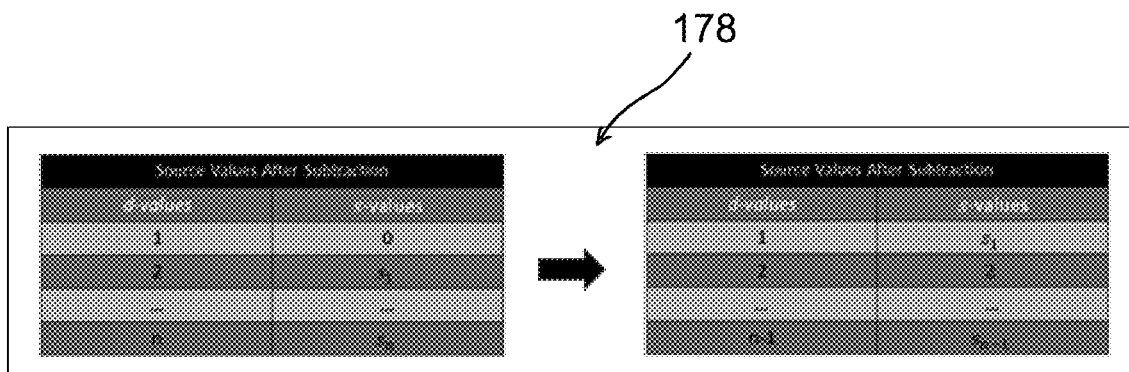
FIG. 6D is a table showing example new source values, in accordance with embodiments of the present invention.
FIG. 6E is a table showing example shifted source values, in accordance with embodiments of the present invention.

1. Referring to Table 170 of FIG. 6A, a value for an input dataset size d is divided evenly and successively (varying the input dataset size) then the TALP's associated executable code is executed by the system to find the associated space values s which are sorted and stored in the Input Dataset Size and Space table.
2. Referring to Table 172 of FIG. 6B, the input dataset size d and associated space values s are scaled by their respective smallest received values, $d_{min}$ and $s_{min}$, and saved in a Source Values table. In this example, $d_{min}=2$ and $s_{min}=3$. Scaling gives the Source Values table.
3. Referring to Table 174 of FIG. 6C, the scaled space values s of the Source Values table are compared to those found in a previously created Target Values table.
4. The functions (polynomial terms) in the headers of the columns of the Target Values table are in ascending order. Zero values in the Target Values table are not compared to the corresponding Source Values table space value, but not comparing a row does not eliminate the corresponding Target table column function header from consideration for inclusion in the final polynomial. When comparing the Source Values table space values to corresponding Target Values table space values, all Source Values table s values in a column will be at least one of the following:
   a. Greater than or equal to all associated Target Values table values in a column (plus or minus some epsilon value),
   b. Less than or equal to all associated Target Values table values in a column (plus or minus some epsilon value), or
   c. All Source Values table e values are the same value (plus or minus some epsilon value).

The function header of any Target Values table column whose rows do not meet condition a or condition b above is eliminated from consideration for inclusion in the final polynomial, and a comparison is made using a different target column. If condition c is met, the value is considered a constant and added to a Saved Term List $f_{term}$. Condition c means the polynomial is complete, and the process jumps to Step 8.
5. When Source space values are compared to the corresponding Target space values, the closest column header that meets condition a or b is saved in the $f_{term}$ list and the process continues with Step 6. If no tested columns meet condition a or b then an error condition exists, and the "Error—stop processing" message is displayed. This comparison is a binary search process.
6. Referring to Table 176 of FIG. 6D, the selected Target Values table column's values are subtracted from the corresponding Source Value table space values, and those new values are saved in a temporary Source Values table. If the temporary Source space values contain any negative values, then the following found polynomial term may be a negative term in which case two versions of the term (negative and positive) are saved with the one whose maximum error (as calculated in step 9) is the smallest becoming the selected version. The absolute values of the temporary Source space values are saved as the new Source Values table.
7. Referring to Table 178 of FIG. 6E, if there are any computed zero values in the new Source Values table, the values of the current column below the zero are shifted to the row above, replacing the zero value. Step 4 is then repeated using the new Source Values table.
8. All saved terms in the $f_{term}$ list are summed, creating the predictive, monotonic polynomial $?_v(d)$ for input variable attribute d. To de-scale this polynomial with its resulting scaled space value s, it is multiplied by the smallest original s value, called $s_{min}$, within the original Source Values table.

Equation 1 Variable Space Complexity as Monotonic Polynomial $$?_v(d) = s_{min} \times \sum_{i=1}^{n} f_{term_i}$$

Coefficients are automatically calculated from this step. Two or more like terms are summed to produce the coefficient of the term. For example, summing $s^2$ and $s^2$ gives $2s^2$.

Figure 7:
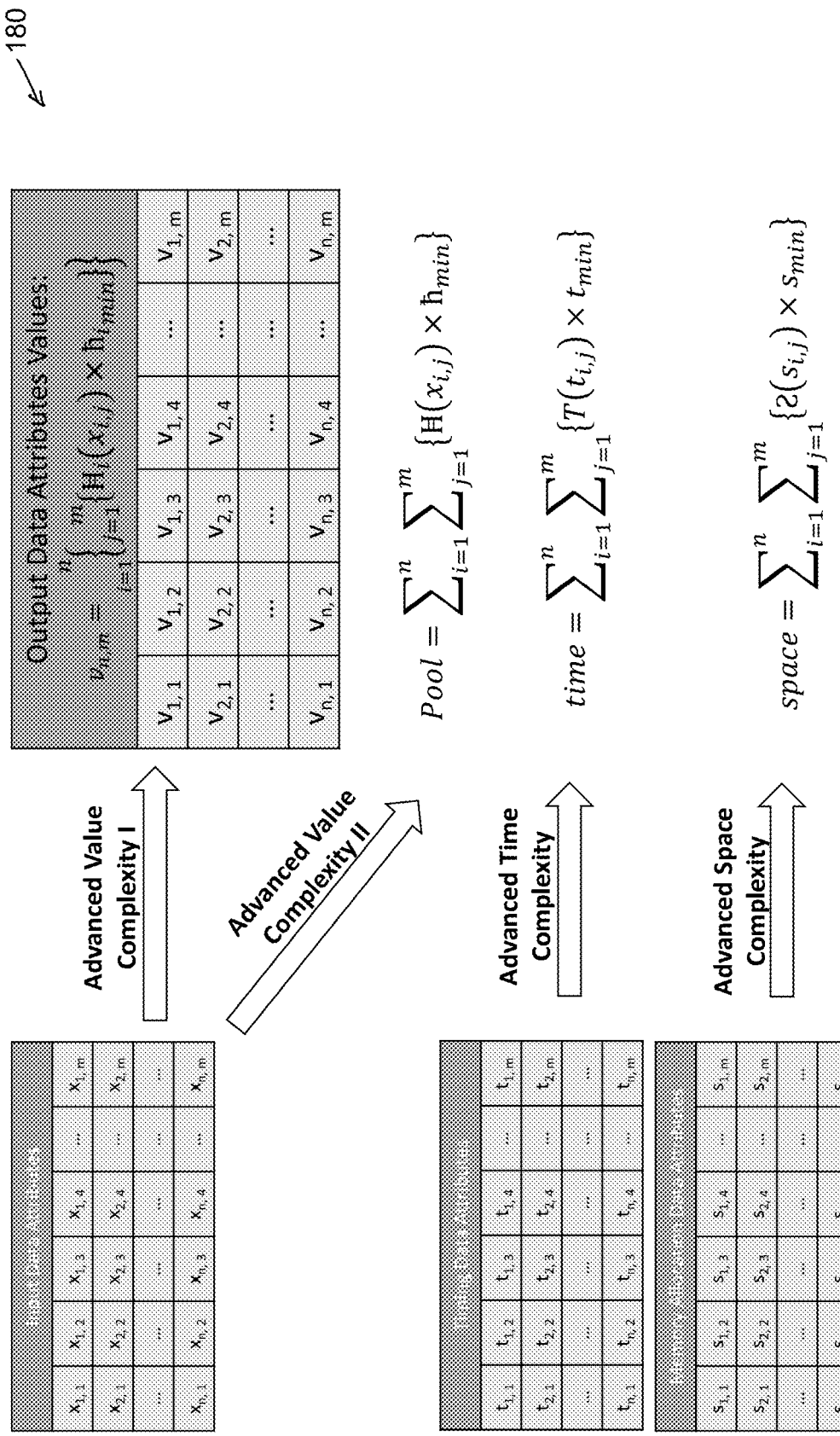
FIG. 7 is a diagram showing an array of input variable attribute values converted into an array of Value Complexity I values, a single Value Complexity II value, an Advanced Time Complexity value, and an Advanced Space Complexity value, in accordance with embodiments of the present invention.

FIG. 7 is a diagram 180 showing that multiple TALPs can be processed simultaneously using their associated prediction polynomials. An array of input values is constructed and used to generate either an array of output values from Value Complexity I or a single pooled value from Value Complexity II. The input variable attribute array is also used to generate an Advanced Time Complexity value via the use of an Advanced Time Complexity polynomial and an Advanced Space Complexity value via the use of an Advanced Space Complexity polynomial.

Figure 8:
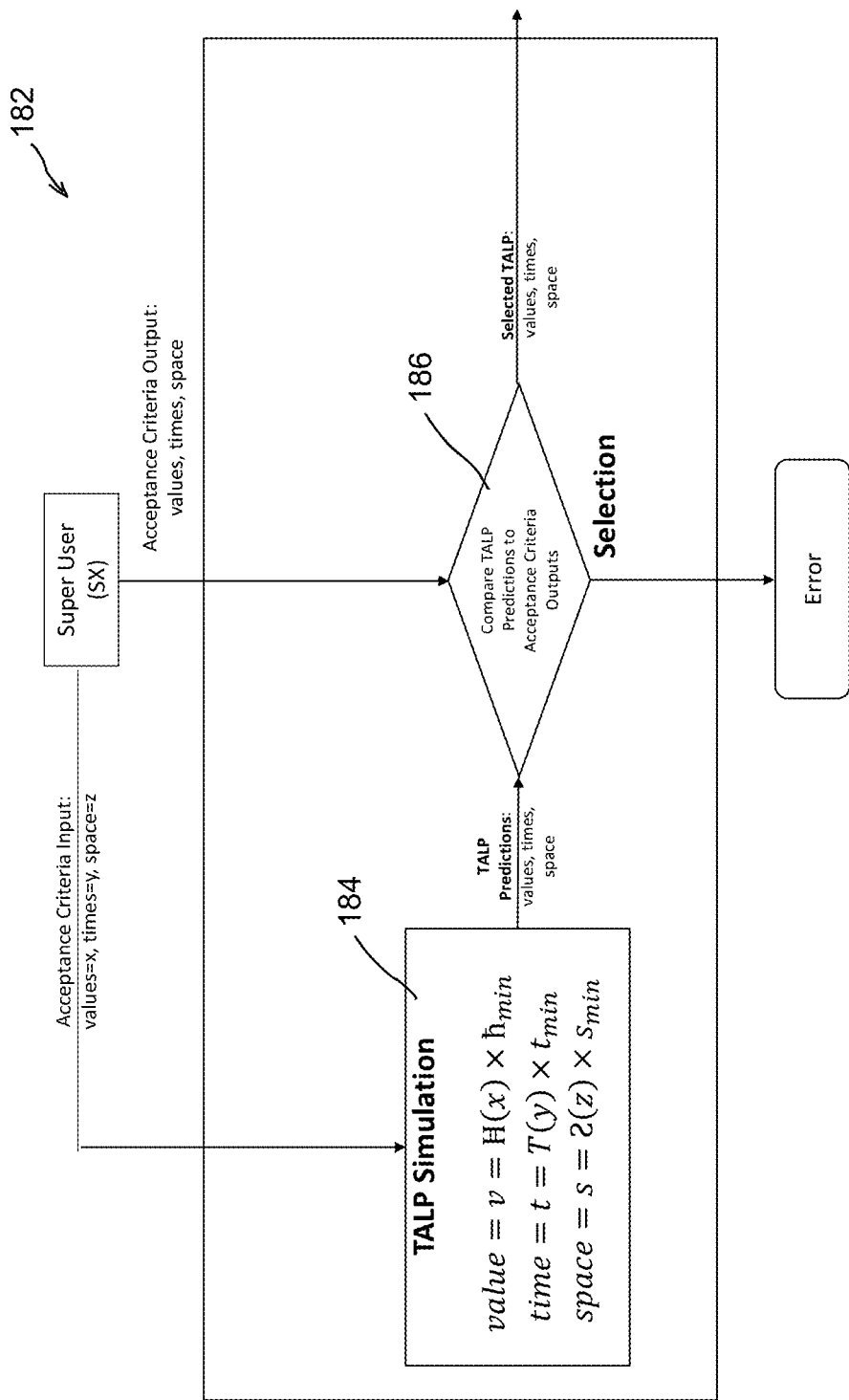
FIG. 8 shows a work flow of the TALP Simulation and Selection component of the MTF E&M system, in accordance with embodiments of the present invention.

FIG. 8 shows a work flow 182 of TALP polynomials used in the simulation and selection of TALPs, which is the first of the three primary components (e.g., 102) of the MFT E&M system 100. TALP simulation and selection is performed as follows:

TALP Simulation 184
1) The system receives Asset Acceptance Criteria input values, times, and memory allocation from the Super User.
2) The TALP polynomials are executed using the received Acceptance Criteria values.
3) The output values from the executed TALP polynomials are saved for selection comparison.

Selection 186
1) The system receives output acceptance criteria for values, timings, and memory allocation from the Super User.
2) The TALP polynomial's saved output data (values, timing, and memory allocation) from the simulation is compared to the received acceptance criteria output values, timings, and memory allocation.
3) The TALP polynomials whose saved output values match the received acceptance criteria output values are selected.

Figure 9:
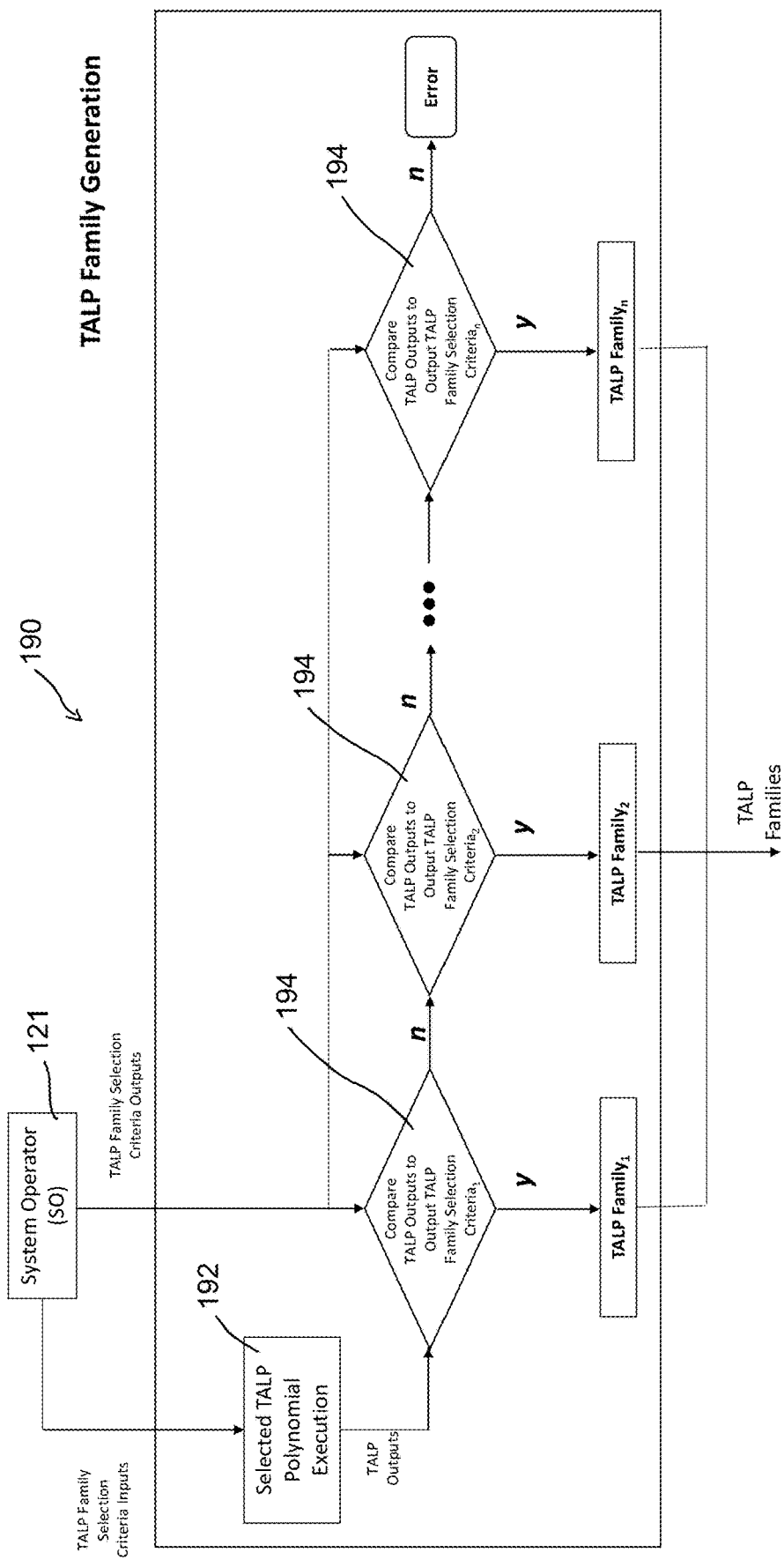
FIG. 9 shows a work flow of the TALP Family Generation component of the MTF E&M system, in accordance with embodiments of the present invention.

FIG. 9 shows a work flow 190 showing TALP Family generation as follows:
1) The system receives TALP Family Selection Criteria from the System Operator 121.
2) Selected TALP Family Selection Criteria Inputs are used in the execution of the selected TALP polynomials, at process 192.
3) The TALP outputs are compared to the TALP Family Selection Criteria outputs (values, timings, memory allocations) for inclusion in the associated TALP Family, at process(es) 194.

Figure 10:
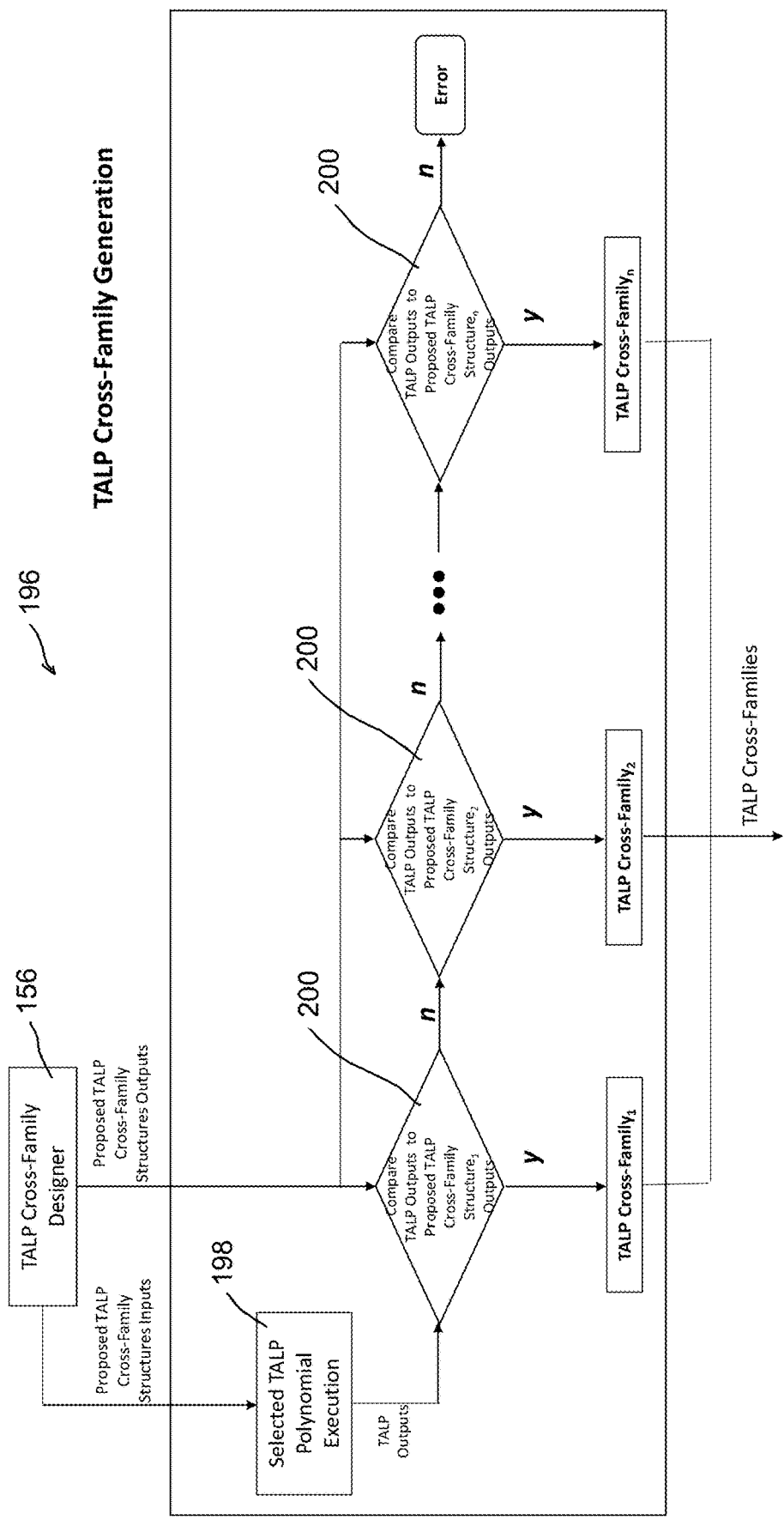
FIG. 10 shows a work flow of the Cross-Family TALP Generation component of the MTF E&M system, in accordance with embodiments of the present invention.

FIG. 10 is a work flow 196 showing the TALP Cross-Family generation as follows:
1) The system receives Proposed TALP Cross-Family Structures from the TALP Cross-Family Designer.
2) Proposed TALP Cross-Family Structure Inputs are used in the execution of the TALP polynomials of the TALPs in families, at process 198.
3) The outputs of the executed TALP polynomial outputs are compared to the Proposed TALP Cross-Family Structure output values (values, timings, memory allocations) for inclusion in the associated TALP Cross-Family, at process(es) 200.

Figure 11:
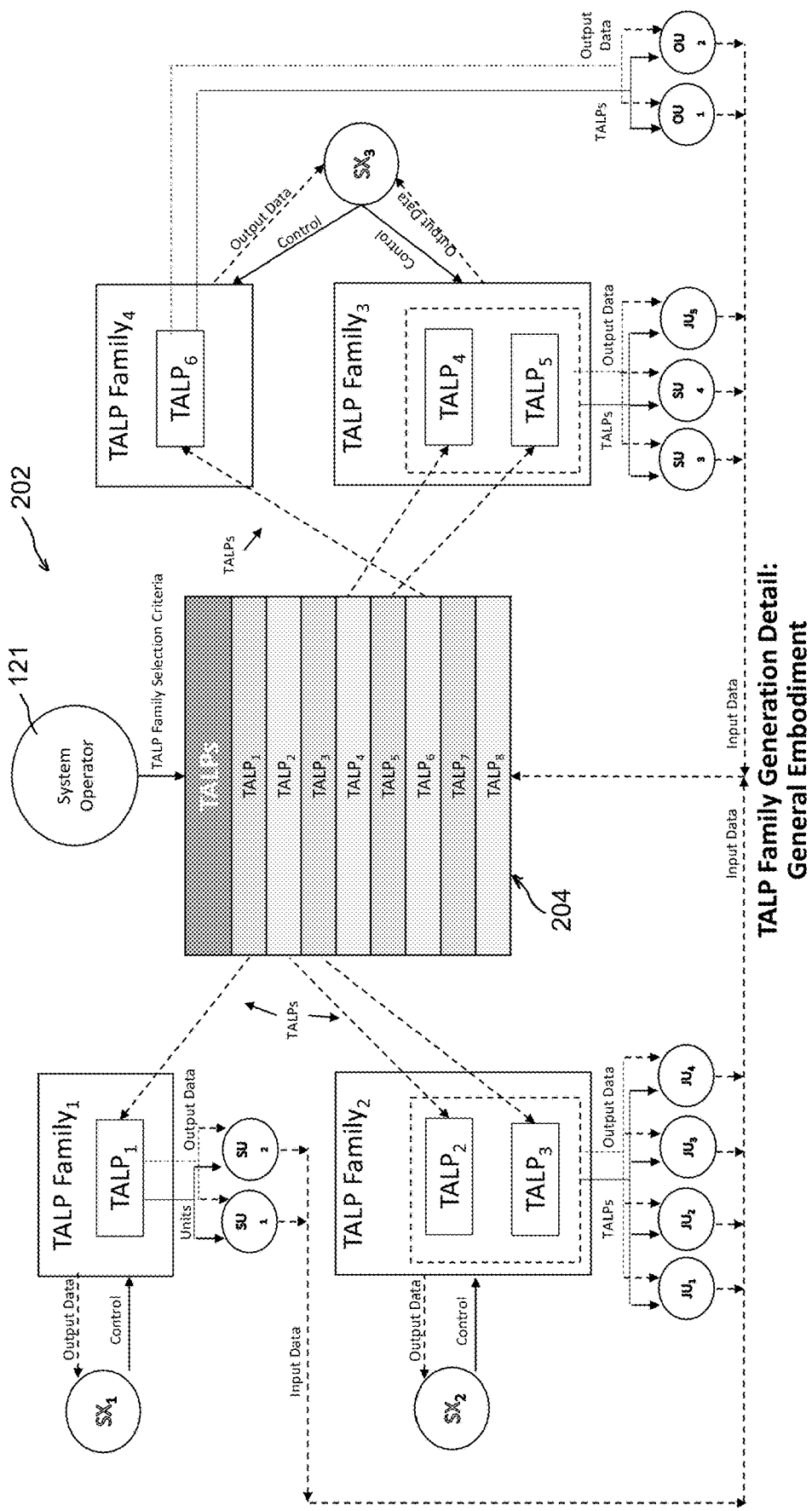
FIG. 11 shows a diagram of the details of generating TALP families, in accordance with embodiments of the present invention.

FIG. 11 is a diagram 202 detailing the grouping of selected TALPs into TALP families 204 as presented in FIG. 9. TALPs in TALP Families can be accessed by various categories of TALP users or used in TALP Cross-Family structures.

Figure 12:
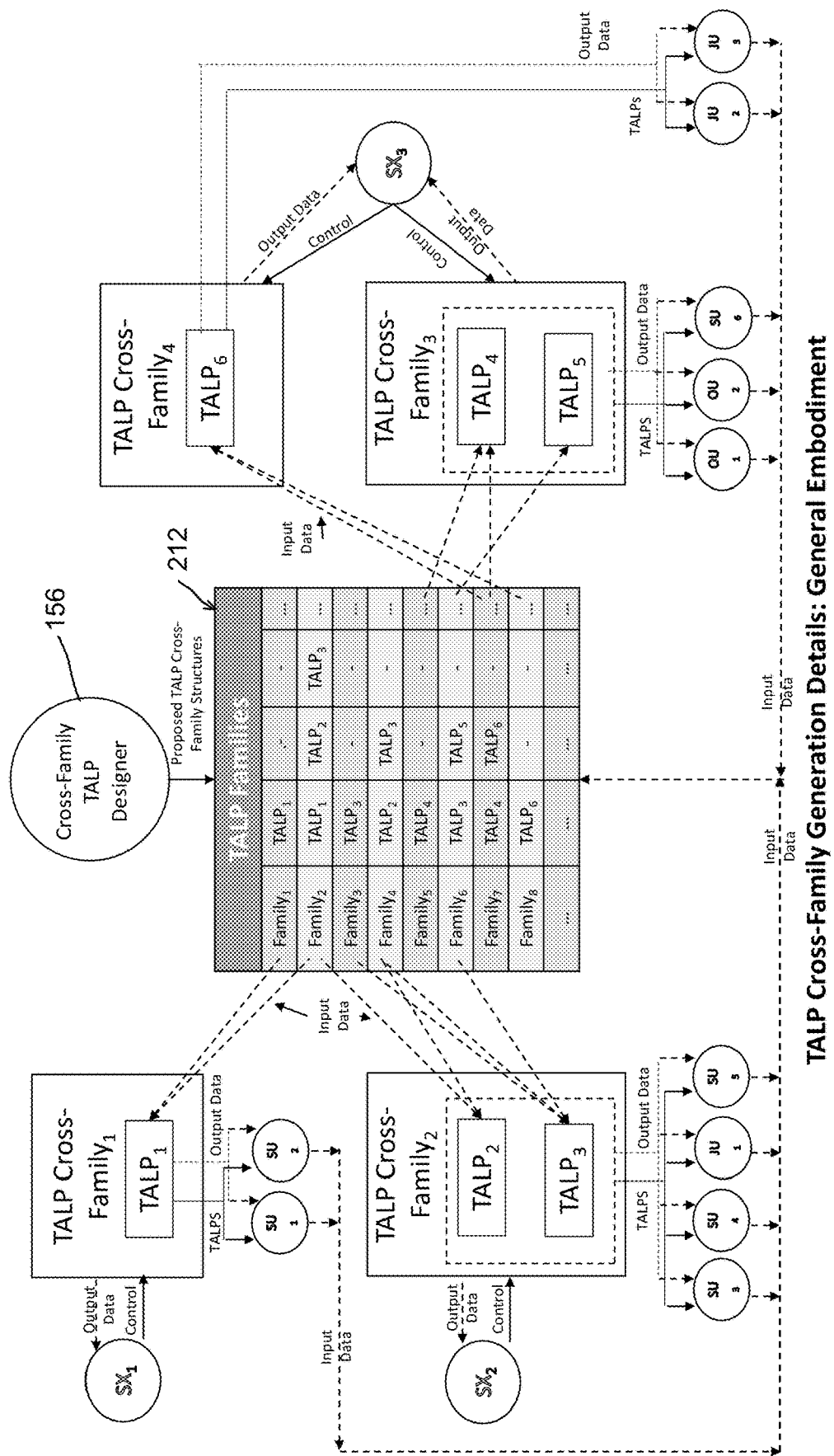
FIG. 12 shows a diagram of the details of generating TALP Cross-Families, in accordance with embodiments of the present invention.

FIG. 12 is a diagram 210 detailing the inclusion of selected TALPs from TALP families into TALP Cross Families 212 as presented in the FIG. 7 description. TALPs within TALP Cross-Families can be accessed by various categories of TALP users.

Figure 13:
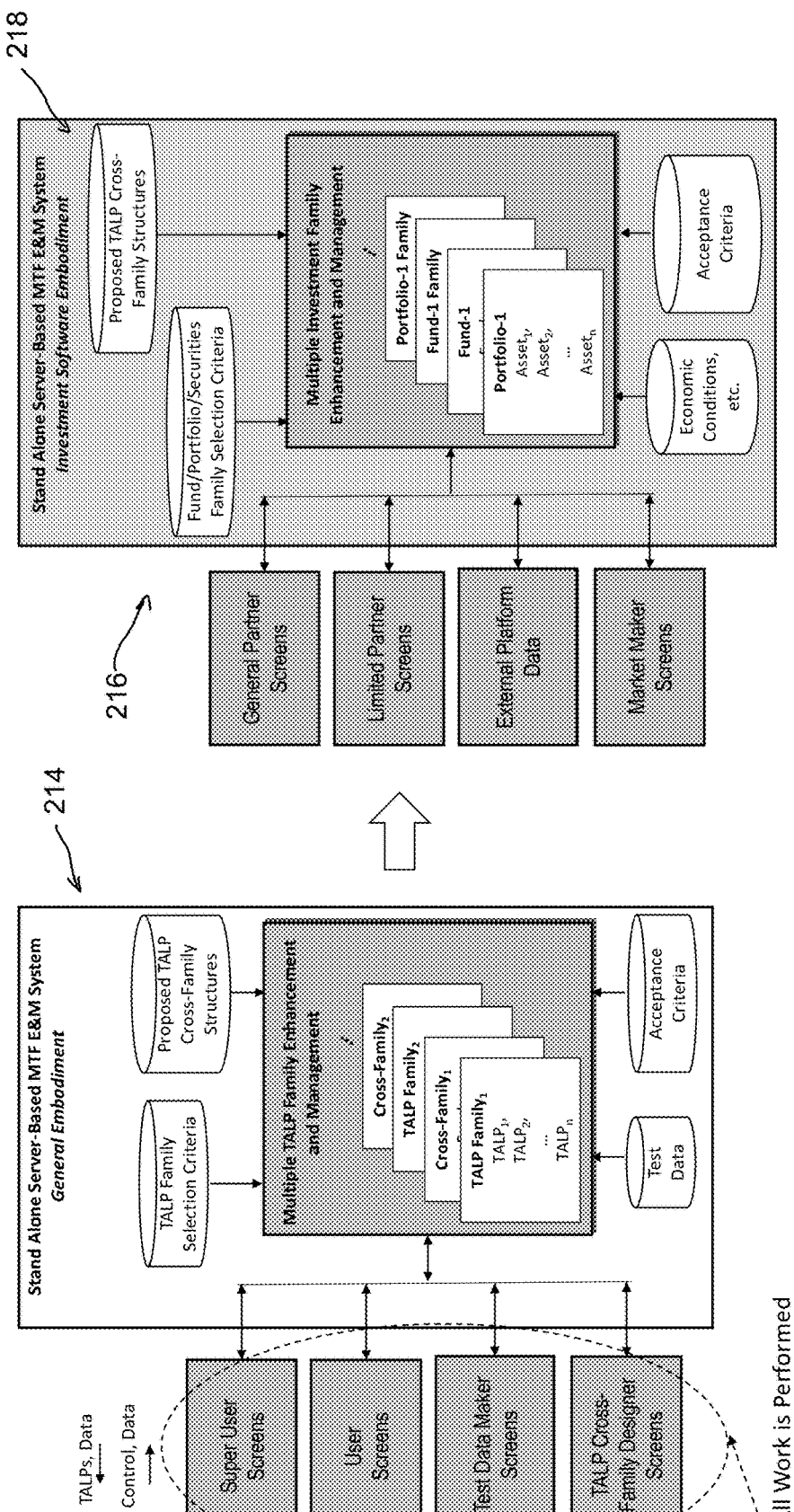
FIG. 13 shows two diagrams: the first depicts an example of a general embodiment of a stand-alone server-based MTF E&M system, and the second depicts an example of an investment software embodiment of a stand-alone server-based MTF E&M system, in accordance with embodiments of the present invention.

FIG. 13 depicts two diagrams. The first diagram 214 shows the MTF E&M system 100 contained within a stand-alone server (mobile device, desktop, laptop, rack-mounted, etc.). The second diagram 216 shows an example of a software system (Investment Management Software) put into MTF E&M form by replacing test data makers, super users, TALP cross-family designers, and users with their analogous data from external platform data, general partners, market makers, and limited partners. The second diagram 216 also shows a system 218 that is contained within a stand-alone server system.

Figure 14:
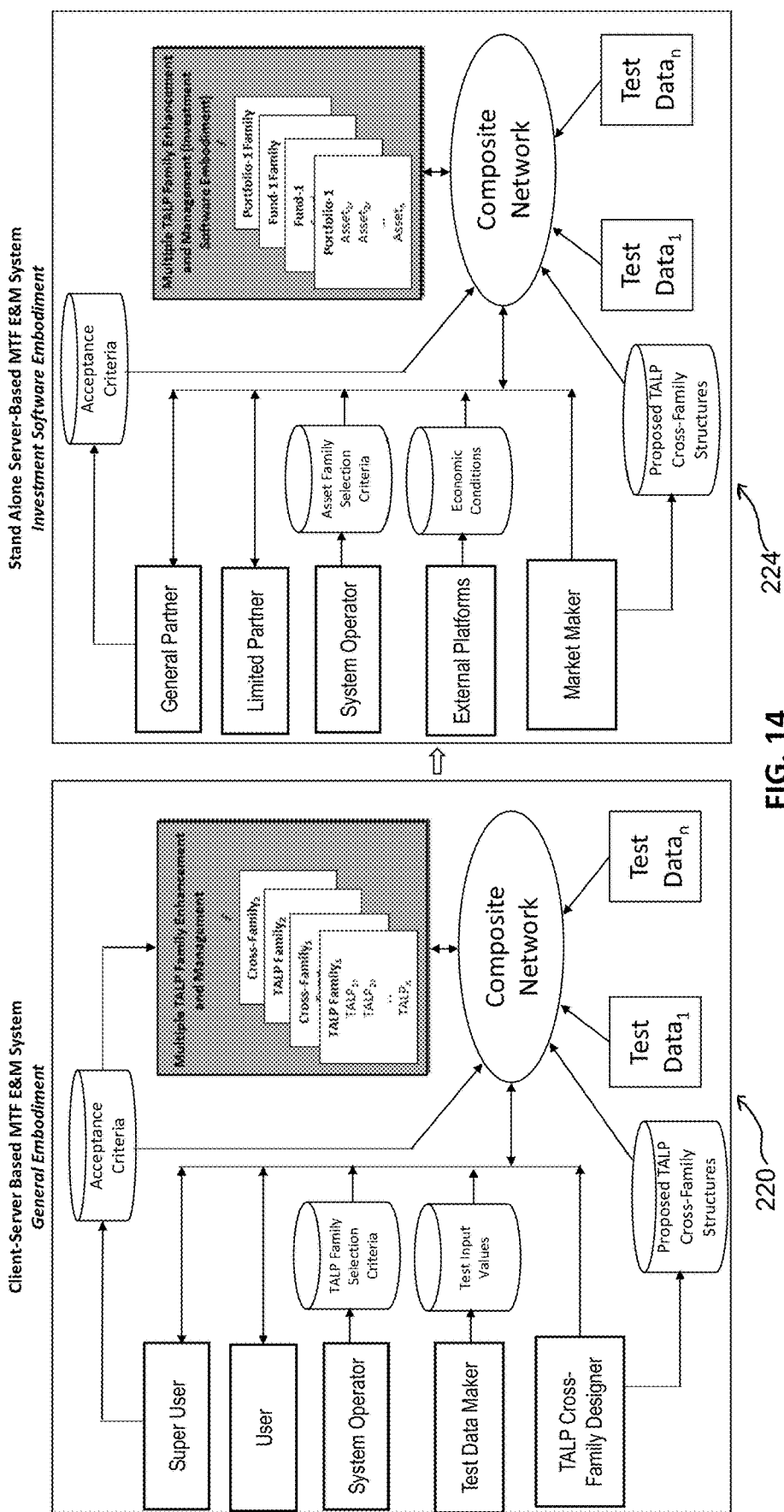
FIG. 14 shows two diagrams: the first depicts an example of a general embodiment of a client-server-based MTF E&M system, and the second depicts an example of an investment software embodiment of a client-server-based MTF E&M, in accordance with embodiments of the present invention.

FIG. 14 depicts two diagrams. The first diagram 220 shows the MTF E & M system accessible using a client-server model. The second diagram 224 shows an example of a software system (Investment Management Software) put into MTF E&M form by replacing test data makers, super users, TALP cross-family designers, and users with their analogous data from external platform data, general partners, market makers, and limited partners. The second diagram 224 also shows a system that is accessible using a Client-Server model.

Figure 15:
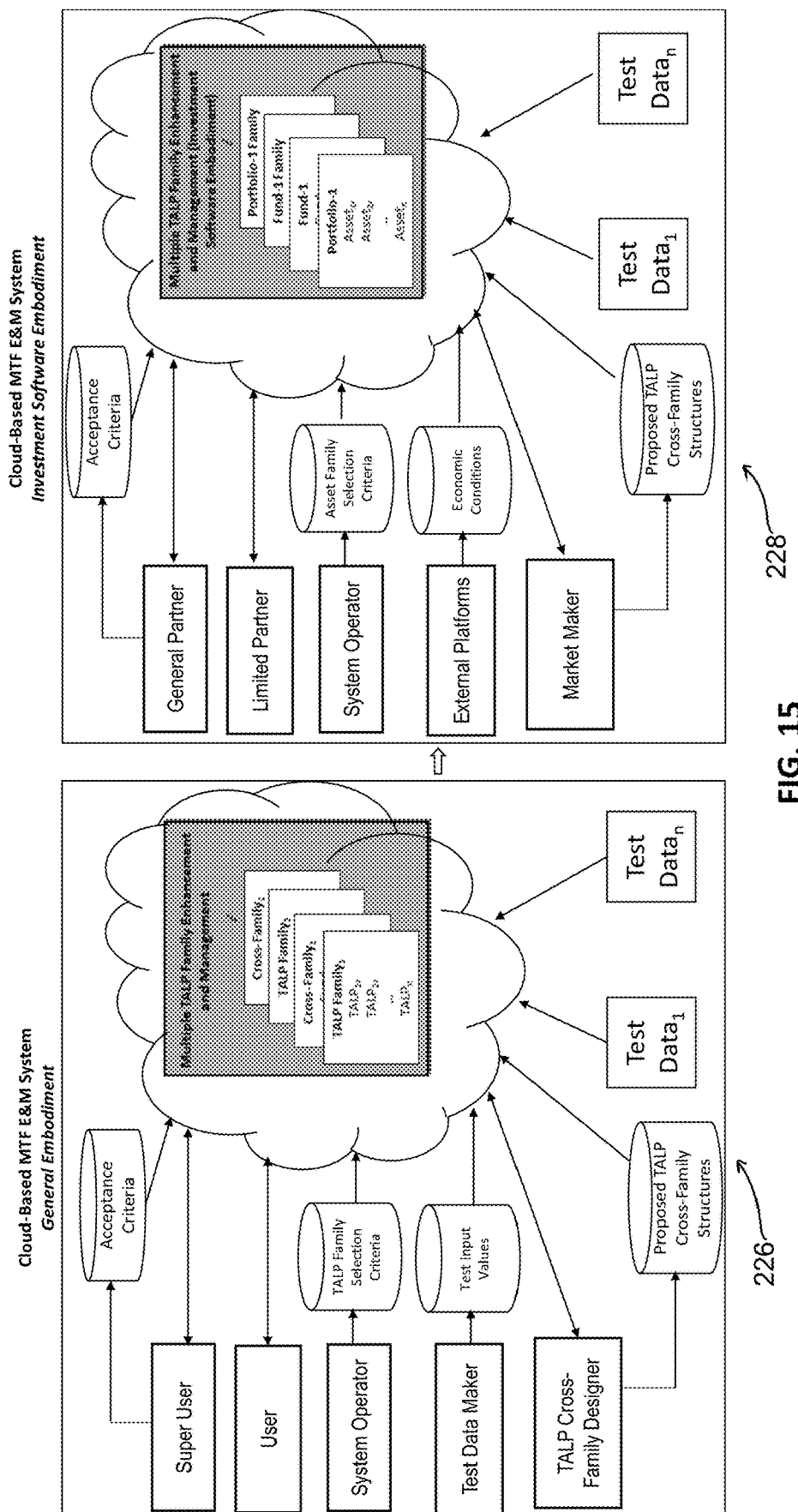
FIG. 15 shows two diagrams: the first depicts an example of a general embodiment cloud-based MTF E&M, and the second depicts an example of an investment software embodiment of a cloud-based MTF E&M system, in accordance with embodiments of the present invention.

FIG. 15 depicts two diagrams. The first diagram 226 shows the MTF E&M system accessible using a cloud-based model. The second diagram 228, which is also accessible using a cloud-based model, shows an example of a software system (Investment Management Software) put into MTF E&M form by replacing test data makers, super users, TALP cross-family designers, and users with their analogous data from external platform data, general partners, market makers, and limited partners.

Figure 16:
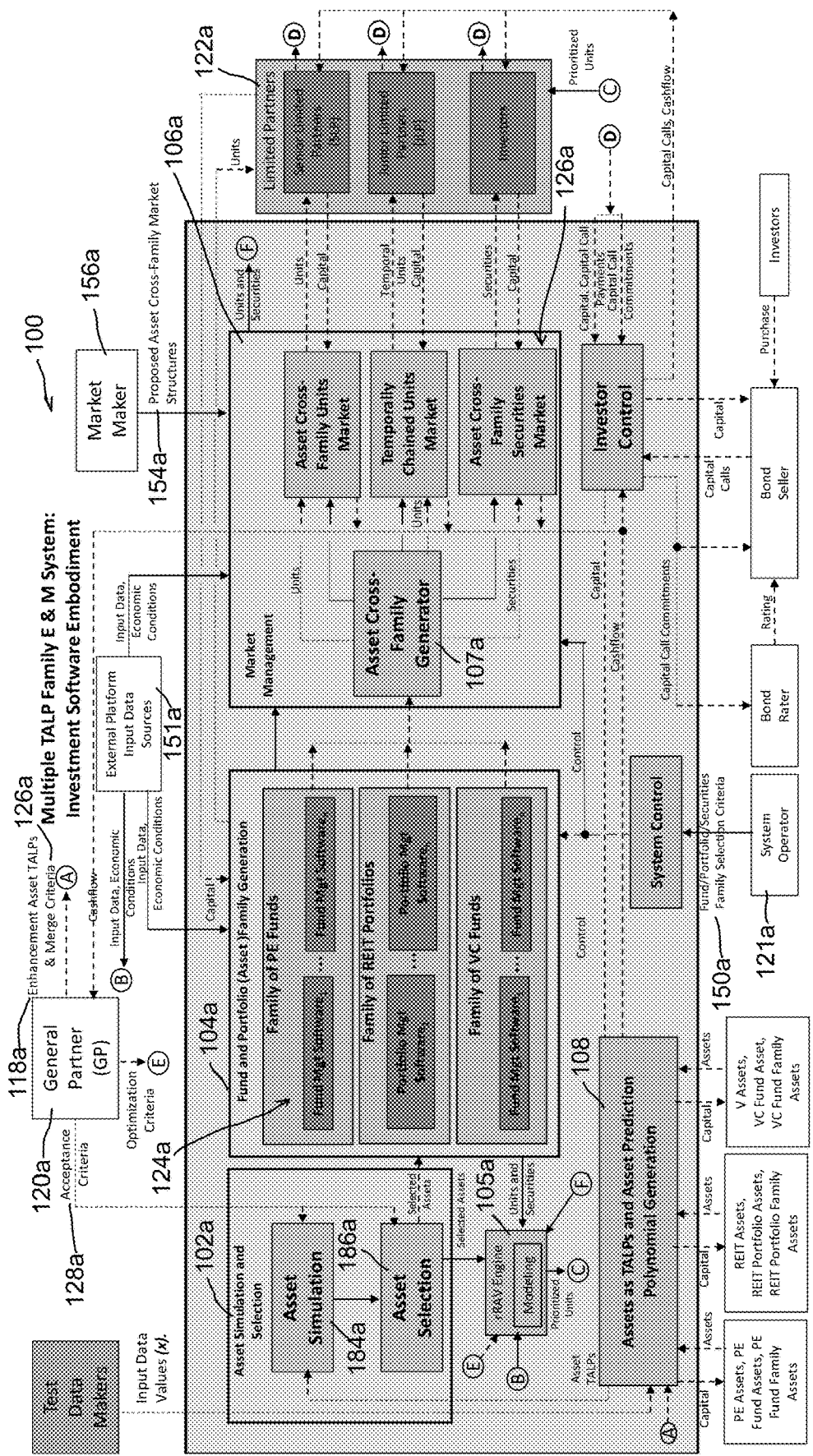
FIG. 16 is a diagram showing an example of a specific investor management software system where datasets, algorithms, and/or software codes are converted into asset TALPs to be modeled and pooled for use by, or distribution to, investors and partners or placed into families and/or cross-families of investment venture funds for use by various classes of investors and partners, in accordance with embodiments of the present invention.

FIG. 16 is a diagram showing an example of a MTF E&M system 100 constructed for investment software, algorithms, or datasets. The MTF E&M system for investment software is composed of four primary components: Asset Simulation and Selection 102a, Fund and Portfolio Family Generation 104a, Market Management 106a, and Assets as TALPs and Asset Prediction Polynomial Generation 108a. Again, the MTF E&M 100 system for investment software, algorithms, or datasets replaces test data makers, super users, TALP cross-family designers, and users with their analogous data from external platform data 151a, general partners 120a, market makers 156a, and limited partners 122a.

This embodiment of the present invention converts asset software codes and asset algorithms into TALP form using the TALP decomposition. Alternatively, detected paired I/O datasets from assets can be converted into the equivalent of TALP form by their transformation into Value Complexity polynomials. These TALPs are herein called asset TALPs.

Associated prediction polynomials for each asset TALP can be generated by executing the asset TALPs using the input values from the external platforms 151a. Asset TALP execution produces a set of input to output data pairs, input to processing time pairs, and input to memory allocation pairs. These paired I/O datasets are placed in the extended source values table shown in FIG. 14 and FIG. 15 and used to generate Value Complexity, Advanced Time Complexity, and Advanced Space Complexity prediction polynomials. Once an asset TALP with its associated prediction polynomials has been generated, then it is possible for that asset TALP's performance to be enhanced by merging the system-generated asset TALP with another asset TALP called an enhancement asset TALP that originates from the General Partner 120a. Once the asset TALP is generated, regardless of its merge status, it is available for use by, or distribution directly to, an asset TALP user or placement into an Asset TALP Family 124a or Asset TALP Cross-Family 126a.

The asset TALP-associated prediction polynomials are each given a set of input asset acceptance criteria data 128a from the General Partner 120a. This data is used in the execution of the asset TALP-associated prediction polynomials in the system's Asset Simulation 184a. The output values from asset simulation are compared to the output asset acceptance criteria 128a of the General Partners 120a. Any asset TALP whose output values match the output asset acceptance criteria associated with the current input asset acceptance criteria are selected in the system's Asset Selection 186a for further use by the system.

The selected asset TALP's prediction polynomials are each either modeled 105a using input data values from external platforms and made available for use by various partners or executed using sets of input values from the fund/portfolio/securities family selection criteria from the System Operator 121a, giving output values called asset family output values. The asset TALPs whose asset family output values match the output values of the fund/portfolio/securities family selection criteria are added to the matching fund or portfolio family in the system's Fund and Portfolio Family Generation component 104a. The output of these asset TALPs are pooled and made directly available to the various types of partners or modeled, pooled, and discretized then made available to the various types of partners.

The prediction polynomials of the selected asset TALPs in a family are each given sets of input values of the Proposed Asset Cross-Family Market Structures data 154a from the Market Maker 156a, giving output values called herein asset cross-family output values. The asset TALPs whose asset cross-family output values match the output values of the proposed asset cross-family structure data are added to the matching asset cross-family in the system's Market Management component 106a. The outputs of these asset TALPs are also pooled and made directly available to the various types of partners or modeled, pooled, and discretized then made available to the various types of partners.

Decreased financial risks and increased financial returns are generated in families and cross-families of funds or portfolios. Standard investment criteria, such as a fund's underlying venture capital requirements, anticipated risk, native investment units (stocks), and anticipated return on investment, is used as part of the optimization criteria by the rRAV Engine for modeling, allowing for the creation of a set of risk/returns instantiated as a set of Asset TALP-derived investment units called prioritized units.

Prioritized units are associated with a set of funds, portfolios, and any bonds or derivatives that are used to leverage the return on investment or the rate of return of the prioritized units. The current invention also allows multiple prioritized units to be automatically temporally chained together, using the sale proceeds at the maturity of a prior prioritized unit to automatically acquire the assets of another prioritized unit. This allows for automatic reinvesting, as well as cashflow generation, prior to the maturity date of the chain. It is possible to construct multiple types of prioritized units and chained prioritized units, each having its own risk/return values and its own minimum and maximum investment level. Since two of the primary distinguishers for different categories of investors are risk/returns and minimum/maximum values, it is now possible to have different categories of investors.

1) In order to generate assets as TALPs and asset prediction polynomials, the "Asset as TALPs and Asset Prediction Polynomial Generation" component 108 of the MTF E&M: Investment Software Embodiment (MTF E&M: IS) 100 receives Economic Conditions from External Platforms, Private Equity (PE) assets, Real Estate Investment Trust (REIT) Assets, and VC assets as either paired I/O datasets, algorithms, or software codes from various asset sources. Once an Asset TALP has been generated, its behavior can be enhanced by merging enhancement Asset TALPs 118a, from the General Partner 120a, with the system-generated Asset TALPs.

2) The "Asset Simulation and Selection" component 102a of the MTF E&M: IS system 100 receives the generated Asset TALPs (called Assets) with their associated prediction polynomials and the acceptance criteria (comprised of a set of acceptable input values with associated acceptable output values).
   a. The "Asset Simulation and Selection" component 102a activates its "Asset Simulation" subcomponent 184a using the list of generated Assets with their associated prediction polynomials from the "Assets as TALPs and Asset Prediction Polynomial Generation" component 108 and the acceptable input values of the acceptance criteria from the General Partner 120a. The various asset prediction polynomials are executed using the acceptable input values, generating a set of output values for each asset.
   b. The "Asset Simulation and Selection" component 102a activates its "Asset Selection" subcomponent 186a using these acceptable input values paired with their generated predicted output values from the asset simulation 184a. These predicted output values are compared to the acceptable output values of the acceptance criteria 128a, creating a set of selected assets when the generated predicted output values match the acceptable output values. Selected Asset TALPs are either modeled 105a using actual input data values from external platforms 151a for direct use by limited partners 122a or executed using the input values from the Asset TALP Family Selection criteria 150a for inclusion in Asset TALP Families.

3) The "Asset Family Generation" component 104a of the MTF E&M: IS system 100 receives the selected assets with their associated prediction polynomials from the "Asset Simulation and Selection" component 102a and the Fund/Portfolio/Securities family selection criteria 150a (comprised of a set of Fund/Portfolio/Securities family acceptable input values with associated output values for each asset family type) from the System Operator 121a. The prediction polynomials associated with each selected asset are executed using the acceptable Fund/Portfolio/Securities family input values, generating a set of output values that are compared to the acceptable Fund/Portfolio/Securities family output values, for inclusion into the matching asset family.
   a. After inclusion in an Asset Family, the prediction polynomials of each asset in each Asset Family are executed using input data from external platform input data sources generating a pool of output values made available to Limited Partners Categories.
   b. Alternatively, after inclusion in an Asset Family, the prediction polynomials of each asset in each Asset Family are modeled in the rRAV Engine 105a using input data from external platform input data sources then pooled, discretized and optimized and made available to Limited Partners Categories.

4) The "Asset Cross-Family Generator" component 107a of the MTF E&M: IS system 100 receives the assets with their associated prediction polynomials from the Asset Families of the "Asset Family Generation" component 104a and the Proposed Asset Cross-Family Market Structure 154a (comprised of a set of cross-family acceptable input values with associated output values for each cross-family type) from the Market Maker 156a. The prediction polynomials of each asset in each family are executed using the acceptable cross-family input values, generating a set of output values that are compared to the acceptable cross-family output values, for inclusion into the matching cross-family.
   a. After inclusion in an asset cross-family, the prediction polynomials each Asset in each Asset Cross-Family are executed using input data from external platform input data sources, generating a pool of output values made available to Limited Partners Categories.
   b. Alternatively, after inclusion in an Asset Cross-Family, the prediction polynomials of each asset in each Asset Family are modeled in the rRAV Engine 105a using input data from external platform input data sources then pooled, discretized and optimized and made available to Limited Partners Categories.

Figure 17:
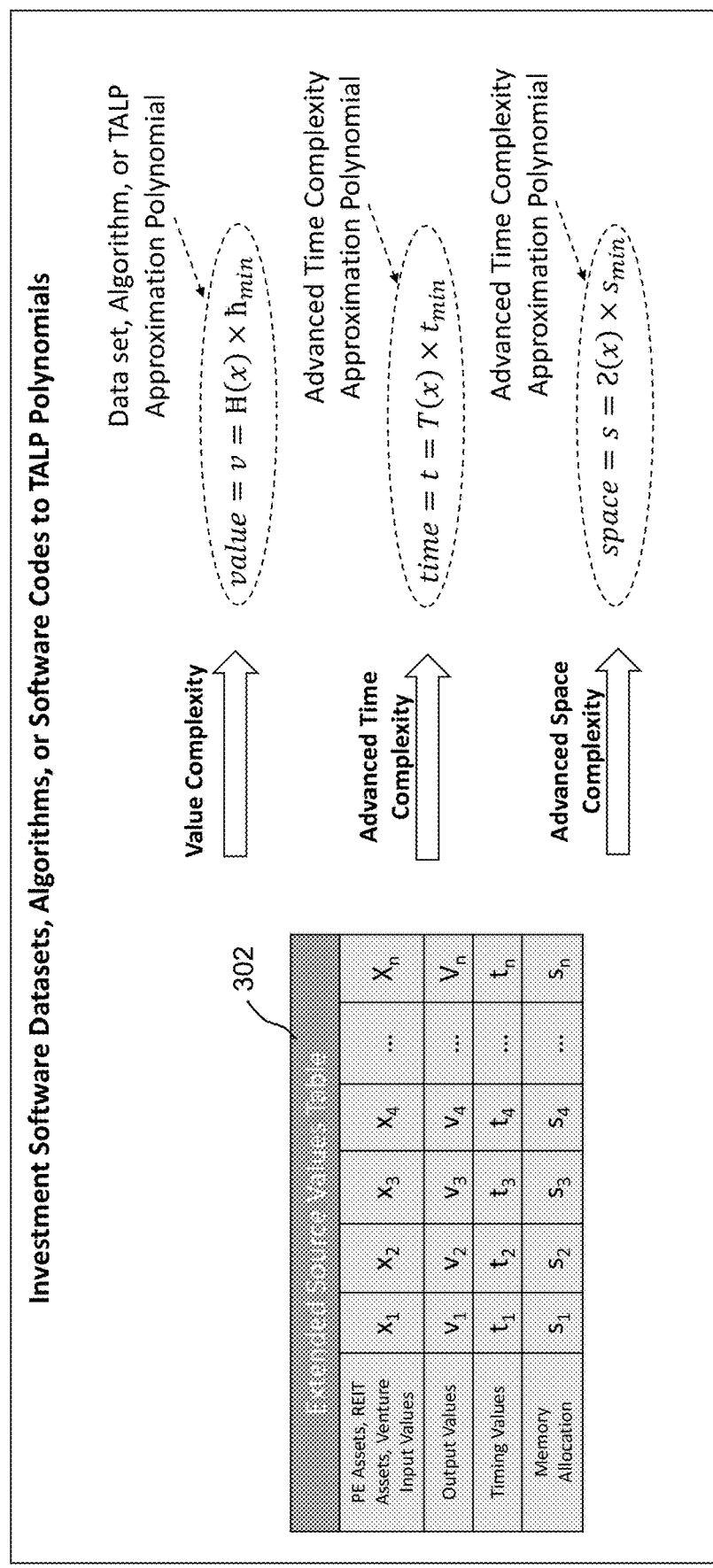
FIG. 17 is a diagram showing an input variable attribute vector (from investment software), an associated output variable attribute vector, an associated timing vector, and an associated memory allocation vector converted into predictive polynomials for Value Complexity, Advanced Time Complexity, and Advanced Space Complexity, in accordance with embodiments of the present invention.

FIG. 17 is a diagram 300 showing the creation of an extended source values table 302 from PE/REIT/Venture assets treated as TALPs. The sets of monotonic input values of the PE/REIT/Venture assets as TALPs form an input variable attribute vector ($x_1$ through $x_n$) while the sets of associated output values form an output variable attribute vector ($v_1$ through $v_n$). The completion time for the associated input to output transformation of PE/REIT/Venture assets form the timing variable attribute vector ($t_1$ through $t_n$), and an associated memory allocation required to process and store values that are transformed by PE/REIT/Venture assets form the memory allocation variable attribute vector ($s_1$ through $s_n$). These vectors are shown combined into the extended source values table 302.

The vectors are accessed pairwise: Input values and output values, input values and timing values, input values and memory allocation. These pairs are used to generate, respectively: Value Complexity, Advanced Time Complexity, and Advanced Space Complexity. The predicted processing time of the current asset can be generated for any valid set of input values so long as the input value is greater than the minimum value used to create the Advanced Time Complexity polynomial. The predicted required memory allocation needed to process the current asset can be generated for any valid set of input values so long as the input value is greater than the minimum value used to create the Advanced Space Complexity polynomial.

Figure 18:
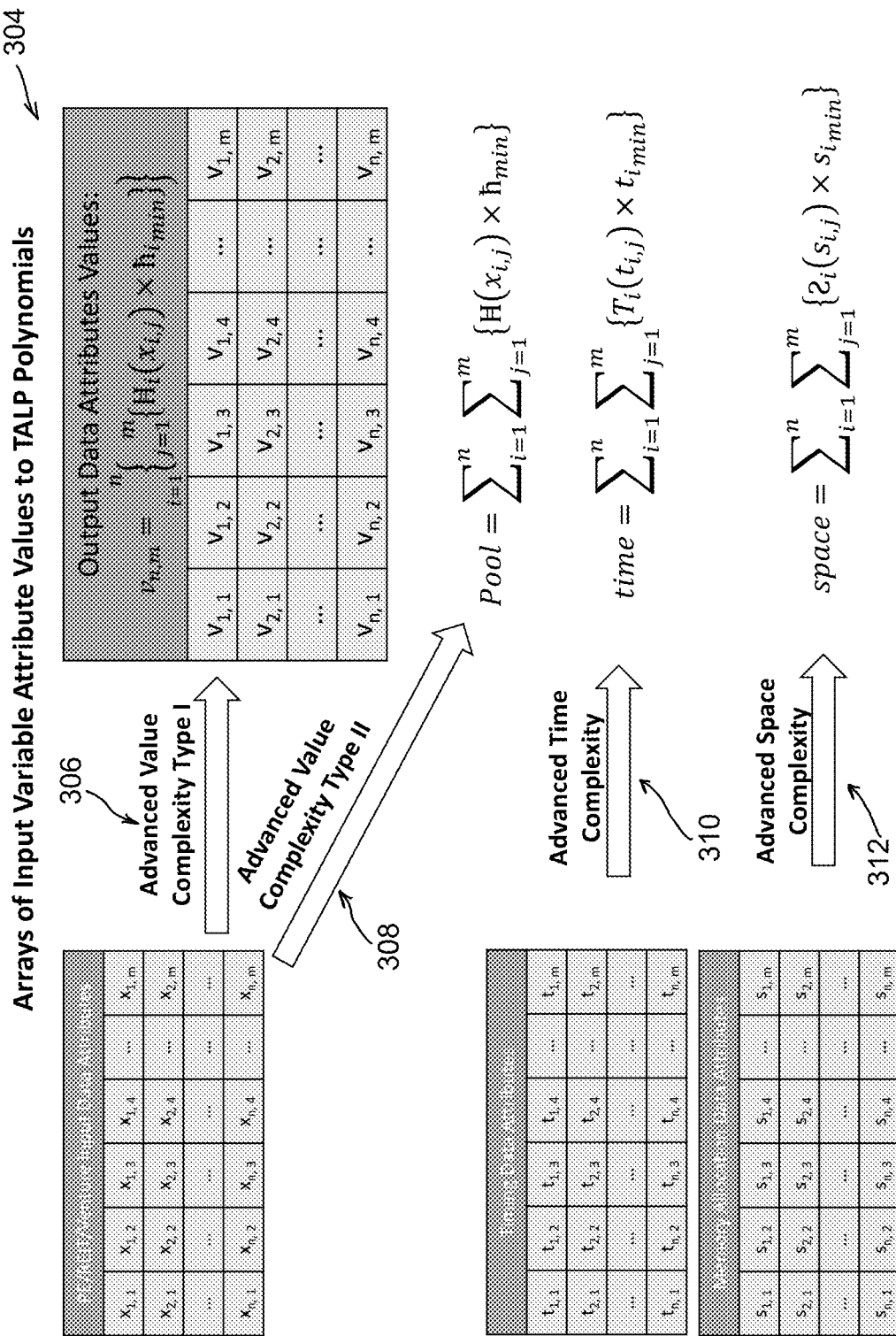
FIG. 18 is a diagram showing an array of input variable attribute values converted into an array (from investment software) of Value Complexity I values, a single Value Complexity II value, an Advanced Time Complexity value, and an Advanced Space Complexity value, in accordance with embodiments of the present invention.

FIG. 18 is a diagram 304 showing that multiple assets of a family or cross-family can be processed simultaneously using their associated prediction polynomials. An array of input values is constructed and used to generate either an array of output values from Value Complexity I 306 or a single pooled value from Value Complexity II 308. The input variable attribute array is also used to generate an Advanced Time Complexity value 310 via the use of an Advanced Time Complexity polynomial and an Advanced Space Complexity value 312 via the use of an Advanced Space Complexity polynomial.

Figure 19:
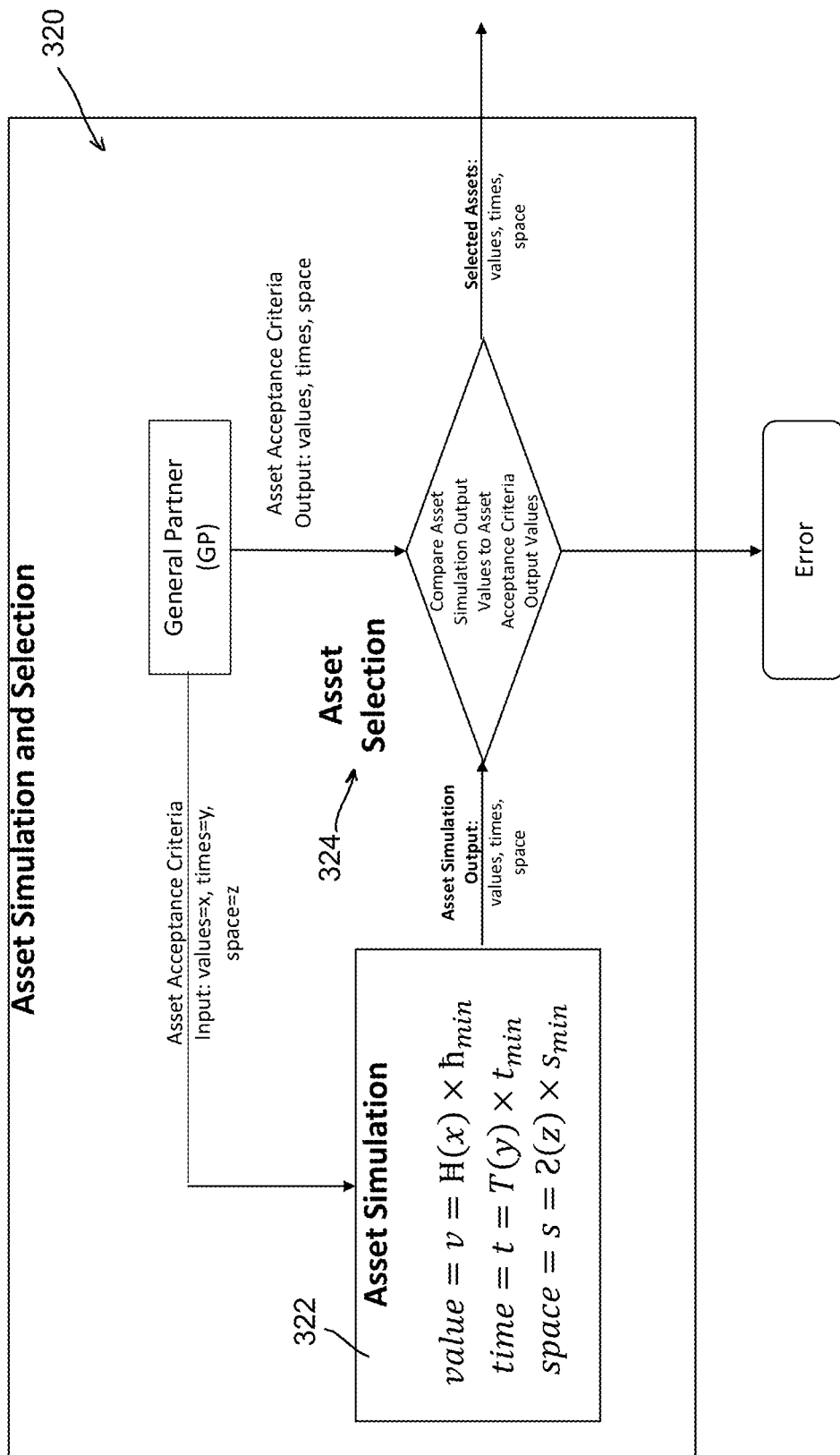
FIG. 19 shows a work flow of the Asset Simulation and Selection component of the MTF E&M system, the Investment Software Embodiment of FIG. 16.

FIG. 19 shows a more detailed diagram of Investment Asset polynomials (treated as TALPs) 320 used in asset simulation and asset selection. Asset Simulation and Asset Selection is performed as follows:

Asset Simulation 322
1) The system receives Asset Acceptance Criteria input values, times, and memory allocation from the General Partner.
2) The Asset polynomials (treated as TALPs) are executed using the received Asset Acceptance Criteria values.
3) The output values from the executed Asset polynomials are saved for selection comparison.

Asset Selection 324
1) The system receives Asset Acceptance Criteria output values, timings, and memory allocation from the General Partner.
2) The Asset polynomial's saved output data (values, timing, and memory allocation) from the simulation is compared to the received Asset Acceptance Criteria output values, timings, and memory allocation.
3) The Asset polynomials whose saved simulation output values match the received Asset Acceptance Criteria output values are selected for use in a fund or portfolio.

Figure 20:
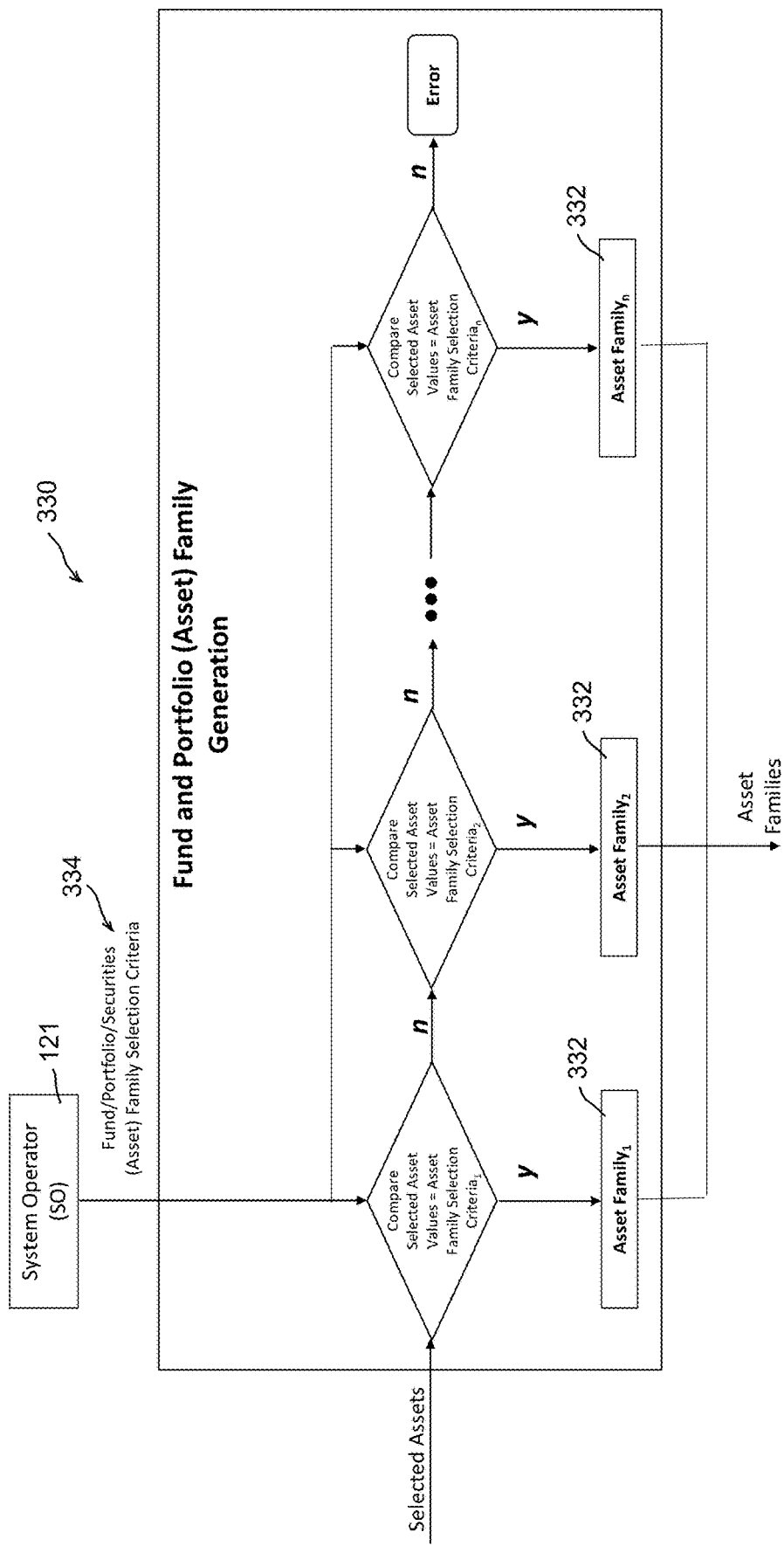
FIG. 20 shows a work flow of the Fund (Asset) Family generation component of the MTF E&M system, the Investment Software Embodiment of FIG. 16.

FIG. 20 shows a detailed diagram 330 using selected asset polynomial output values in the selection of assets for inclusion in an Asset Family 332 when such values are compared against the Asset Family Selection Criteria 334 from the System Operator 121.
1) The system receives the Asset Family Selection Criteria from the System Operator.
2) Selected Asset Family Selection Criteria inputs are used in the execution of the selected Asset polynomials.
3) The output values from the execution of the asset polynomials are compared to the Asset Family Selection Criteria outputs (values, timings, memory allocations) for inclusion in the associated Asset Family.

Figure 21:
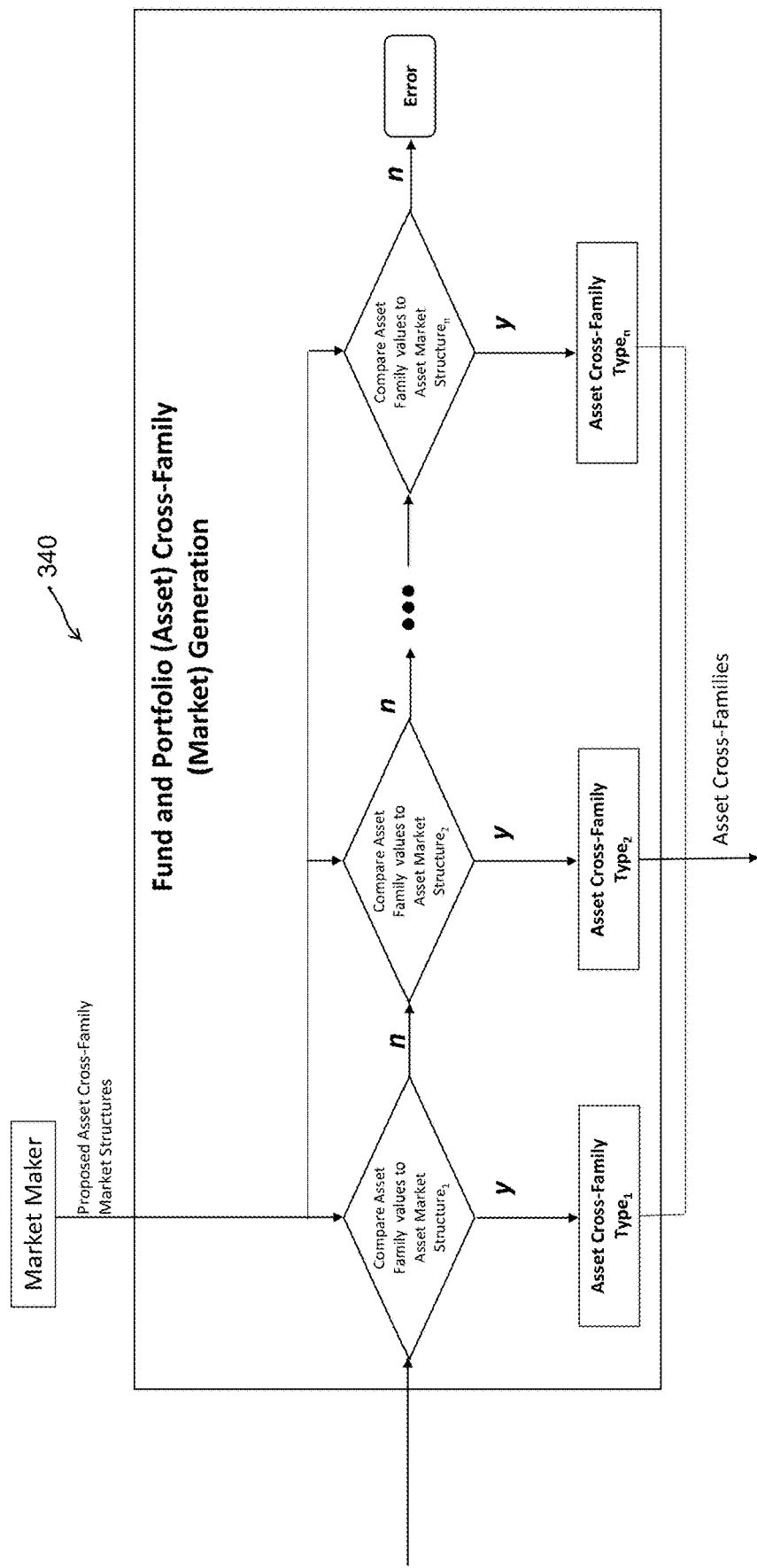
FIG. 21 shows a work flow of the Asset Cross-Family generation component of the MTF E&M system, the Investment Software Embodiment of FIG. 16.

FIG. 21 is a diagram 340 showing the details of Asset Cross-Family generation from FIG. 13 as follows:
1) The system receives Proposed Asset Market Structures from the Market Maker.
2) Proposed Asset Market Structure Inputs are used in the execution of the Asset polynomials of Assets that are within families.
3) The outputs of the executed Asset polynomial outputs are compared to the Proposed Market Structure output values (values, timings, memory allocations) for inclusion in the associated Asset Cross-Family.

Figure 22:
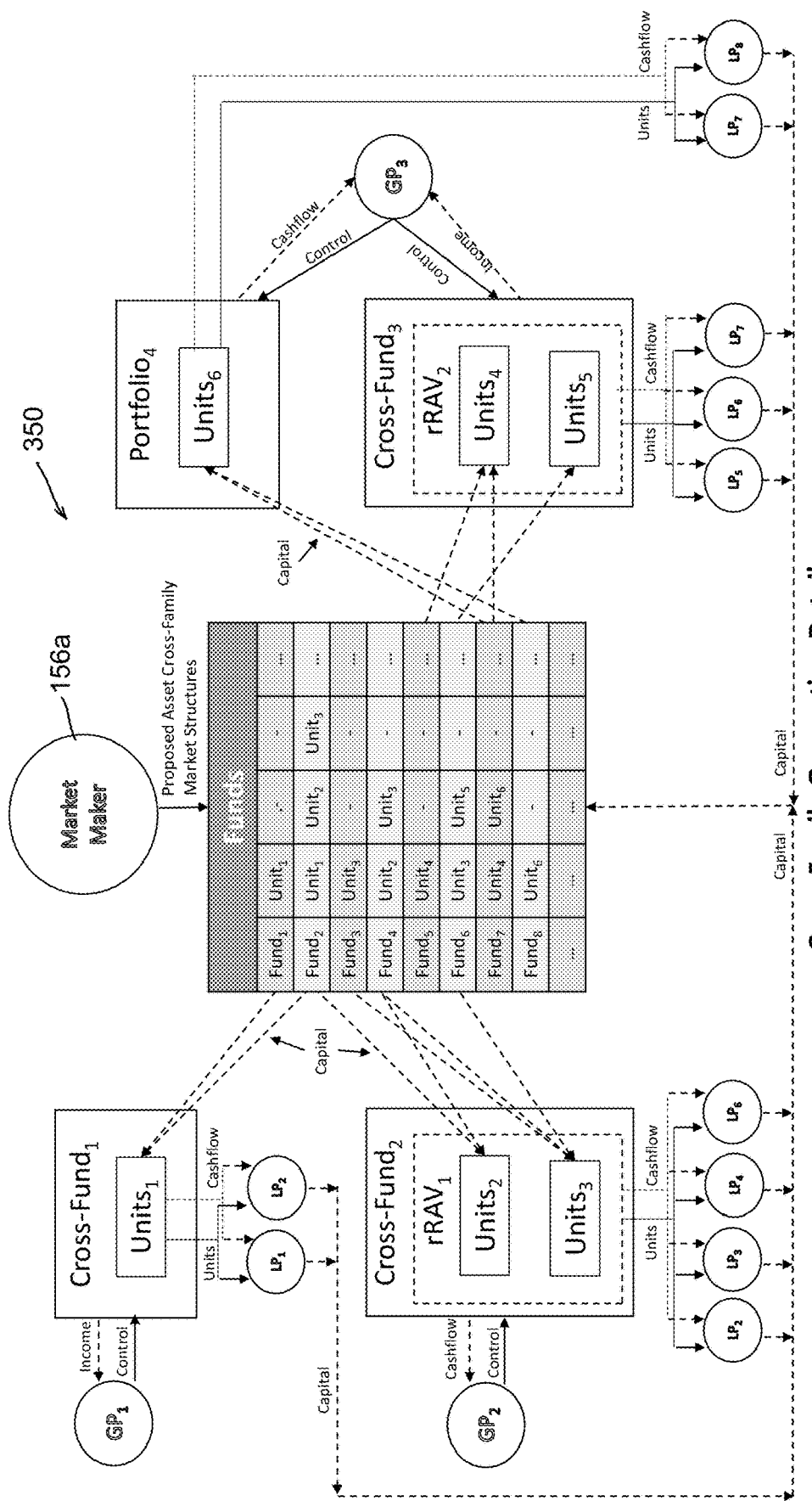
FIG. 22 shows a diagram of the details of Asset Cross-Family generation, the Investment Software Embodiment of FIG. 16.

FIG. 22 is a diagram 350 detailing the inclusion of selected Asset Family assets into Asset Cross-Families as presented in the FIG. 18 discussion. Assets within Asset Cross-Families can be accessed by various categories of partners.

Figure 23:
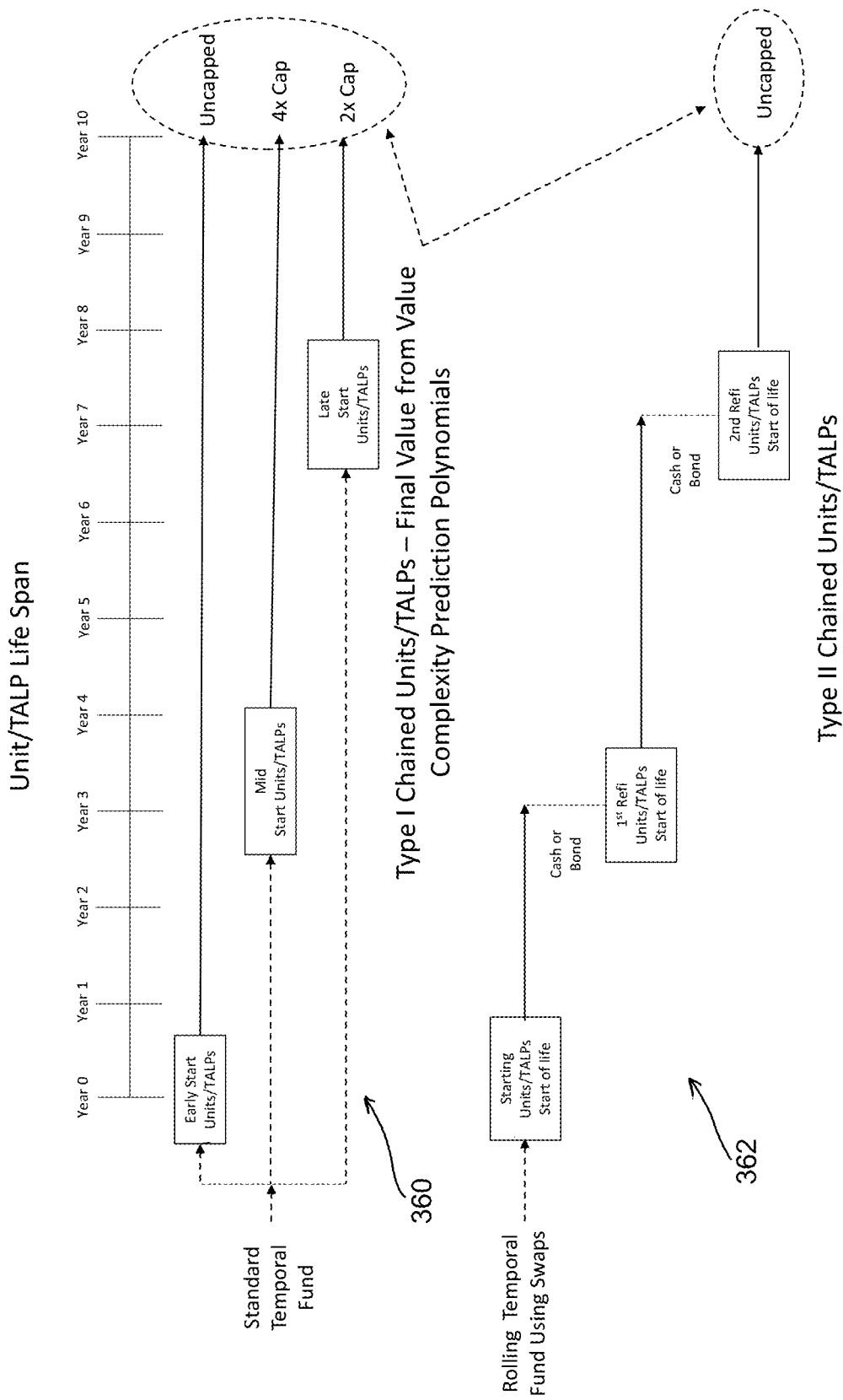
FIG. 23 shows two diagrams: the first depicts type I chained TALPs or alternatively, type I chained investment units, and the second depicts type II chained TALPs or, alternatively, type II chained investment units, in accordance with embodiments of the present invention. The chained TALPs and/or chained investment units all end at the same time.

FIG. 23 shows a diagram with two graphs. The first graph 360 shows the use of advanced time complexity to determine when the execution of a group of type I chained TALPs, each with different starting times, will complete. Using the Value Complexity polynomial allows the output values of the TALPs to be known for any given time period. The TALPs are chained together in such that regardless of the TALP starting times, all of their ending times are linked. If the TALPs represent investment units then the output values could be cash flows. In order to ensure that all units complete at the same time, the associated Advanced Time Complexity polynomial is used. To understand how much time needs to be added or subtracted from the chain of linked units requires the use of the associated Advanced Speedup polynomial on an array comprised of all chained assets associated with the chained units. Consider that how much memory to allocate for the units is directly proportional to the number of units currently activated. If at some point in time the number of predicted active units is not what is expected, this indicates a problem with the chain of units. To chained unit problems requires the use of both Advanced Time Complexity and Freeup prediction. It should be noted that Freeup prediction requires the use of Advanced Space Complexity.

The second graph 362 shows the use of linked units combined with Value Complexity polynomials to determine the output of the type II chain of linked units at any given time period. The linkage of software codes (for example investment units converted to TALP form) allows for the prediction of software output values (for example cash flow values). As with the first graph, chained unit error prediction requires the use of Advanced Time Complexity, Advanced Space Complexity, and Freeup.

Figure 24:
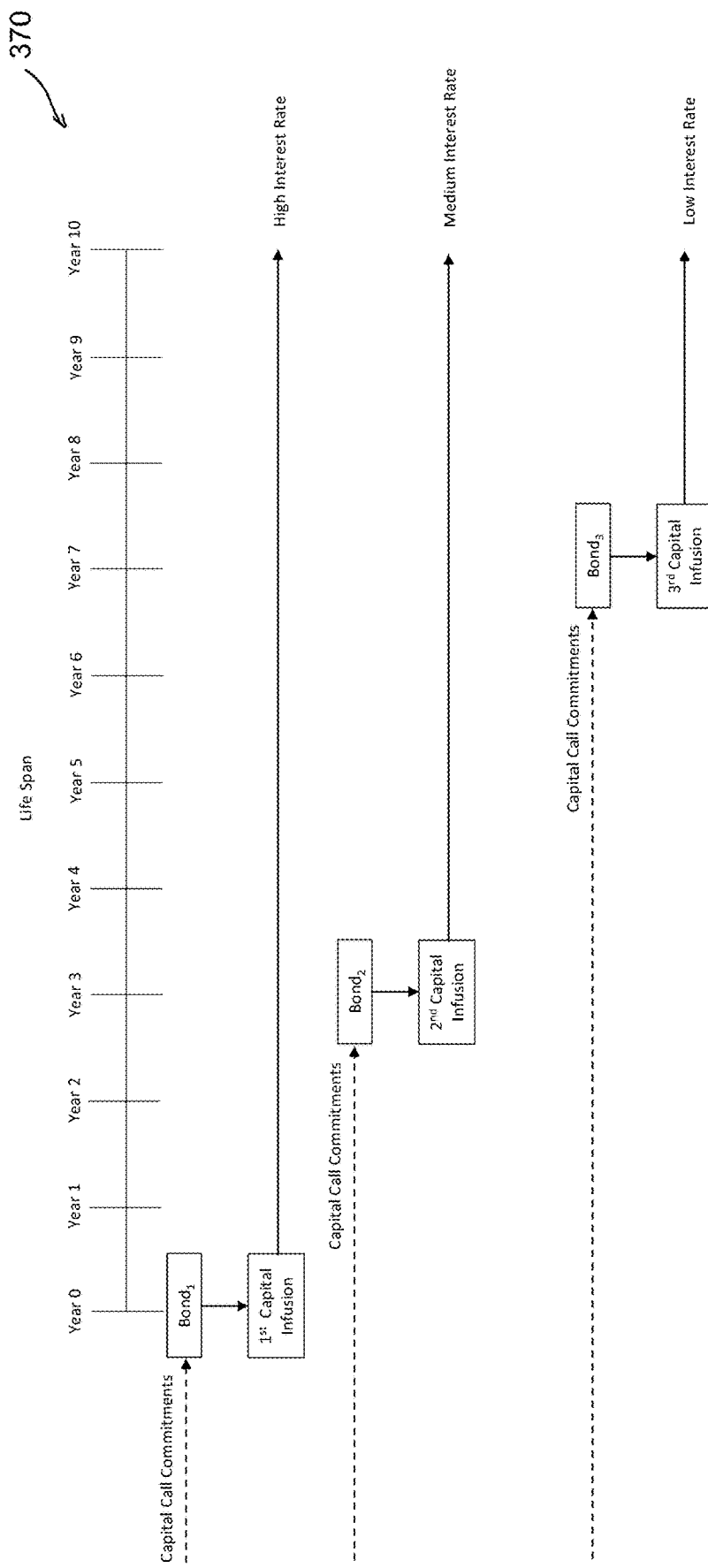
FIG. 24 shows a diagram depicting three type III chained TALPs or alternatively, type III chained investment units, in accordance with embodiments of the present invention. Each type III chained TALP or type III chained investment unit starts at a different time, but all chains end at the same time.

FIG. 24 shows a graph 370 of three unit type III chains (from bond analysis software linked with investment unit software). Each linked unit chain completes execution at the same time. In a sense, Type Ill chained units function like a combination of Type I and Type II unit chains but with bonds converted into algorithmic form. As shown for FIG. 20, chained unit error prediction requires the use of Advanced Time Complexity, Advanced Space Complexity, and Freeup.

Figure 25:
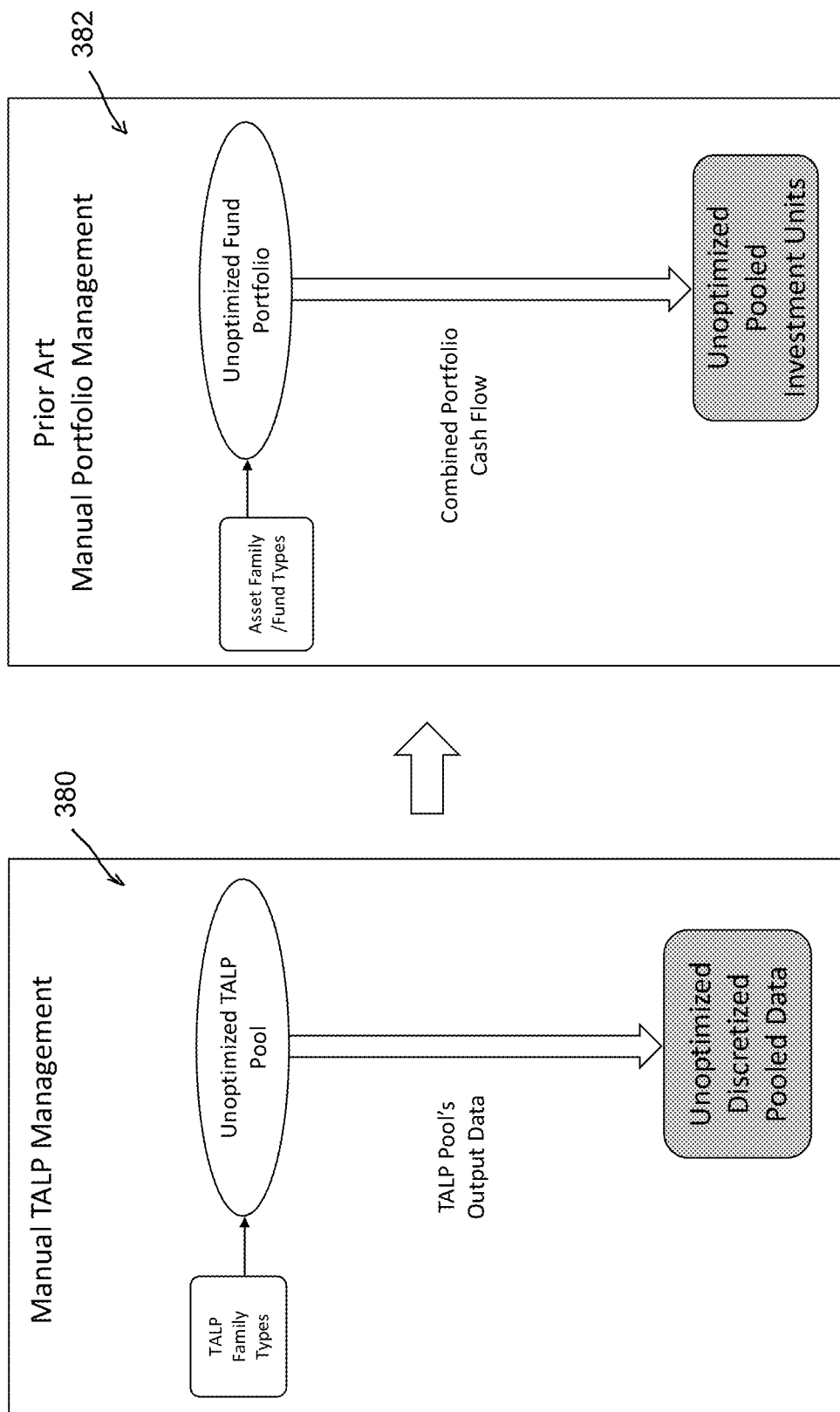
FIG. 25 shows two diagrams: the first depicts an example of an unoptimized set of pooled TALPs from a family or cross-family whose combined output data is discretized for later use, and the second diagram shows the same example using an unoptimized set of pooled investment fund algorithms whose outputs are cash flows that are discretized for later use, in accordance with embodiments of the present invention.

FIG. 25 shows two diagrams. The first diagram 380 shows a set of TALP Families used to generate a pooled but unoptimized output dataset. This pooled output dataset is then discretized. The unoptimized, discretized pooled data can now be made available to different user categories. The second diagram 382 shows the same diagram using a set of funds used to generate a pooled but unoptimized output data. The unoptimized, pooled data is then discretized for use by different partner categories (general, senior limited, junior limited, etc.)

Figure 26:
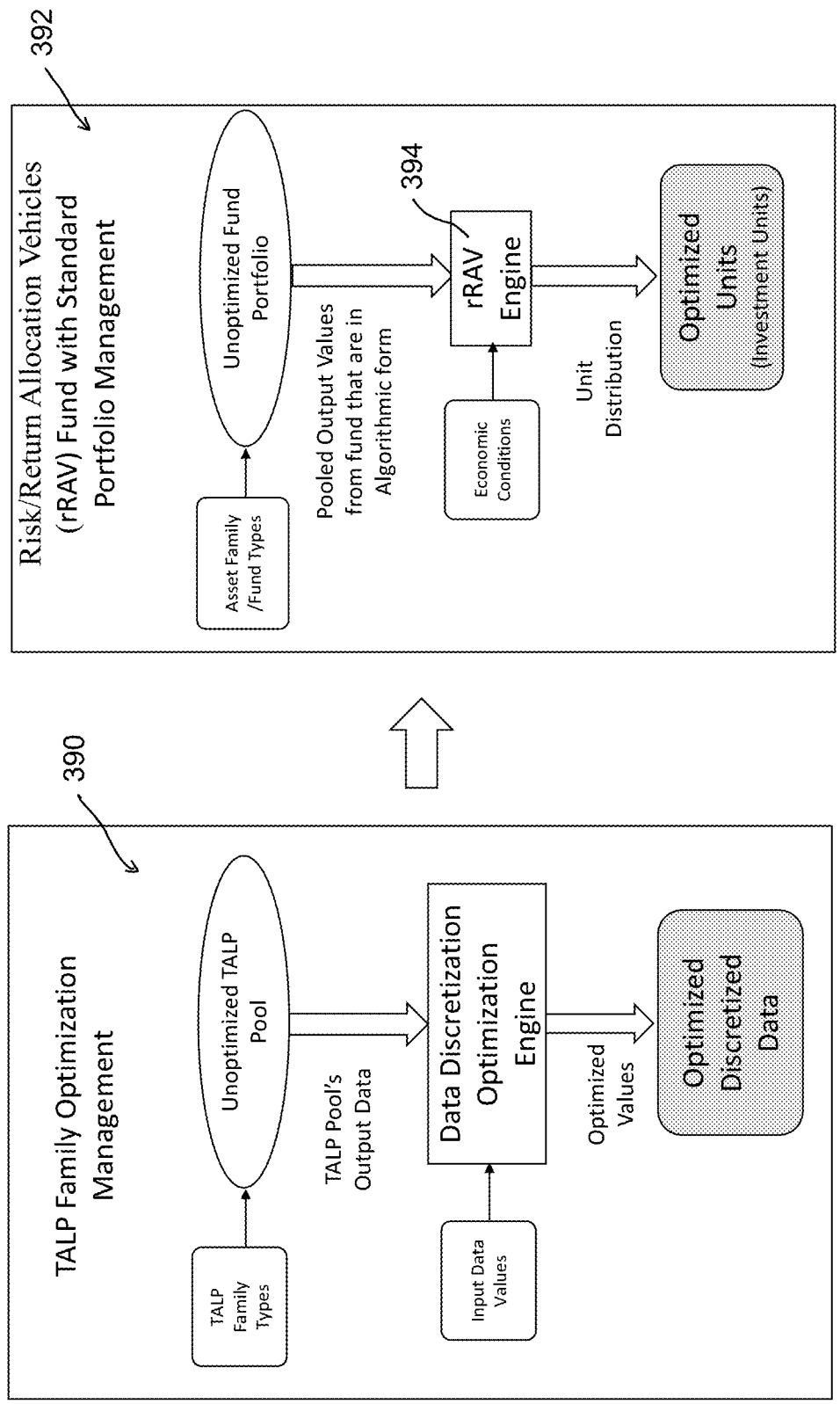
FIG. 26 shows two diagrams: the first depicts an example of an unoptimized set of pooled TALPs from a family or cross-family whose combined outputs are first discretized and then optimized for later use, and the second diagram shows the same example using unoptimized pooled investment fund algorithms whose cash flow outputs are combined, discretized then optimized for later use, in accordance with embodiments of the present invention.

FIG. 26 shows two diagrams. The first diagram 390 shows a set of TALP Families used to generate a pooled, but unoptimized output dataset that is then sent to the Data Discretization Optimization engine. This engine breaks up the pooled dataset, using input dataset values, into groups that are optimized to minimize some values and maximize other values. The optimized discretized data is then ready for distribution to different categories of users (super user, senior, junior, etc.).

The second diagram 392 shows a set of asset Families used to generate a pooled unoptimized investment fund output dataset (returns, risk, interest rates, etc.) that is then sent to the rRAV engine 394. This engine breaks up the pooled dataset, using economic conditions, into groups that are optimized to minimize some values and maximize other values. The optimized discretized pooled data is then ready for distribution to different categories of partners (general partner, senior limited partner, junior limited partner, etc.).

The rRAV engine 394 is used by both the Fund and Portfolio Generation and the Market Management components as shown in FIG. 13.

Figure 27:
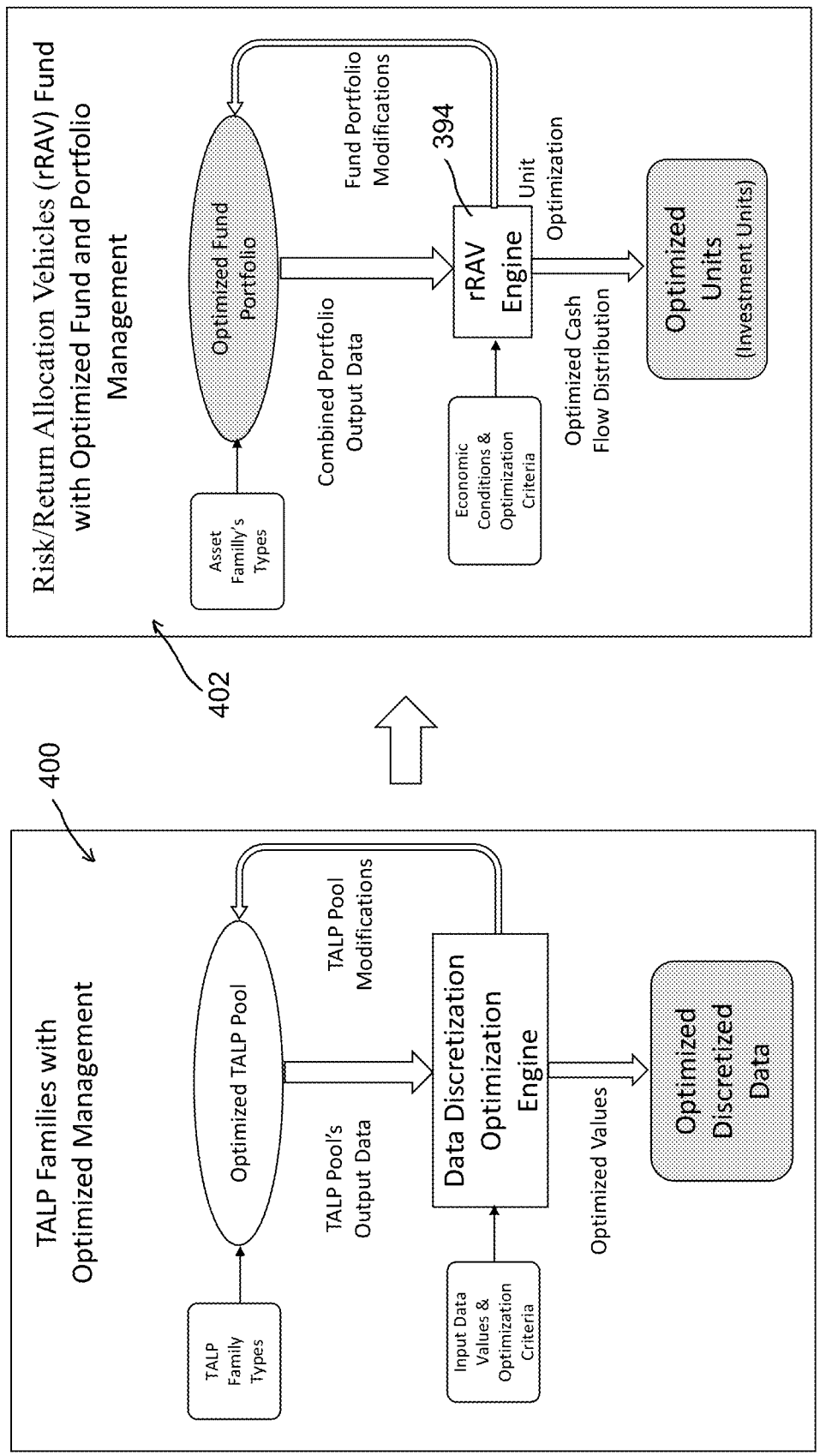
FIG. 27 shows two diagrams: the first depicts an example of a set of optimized pooled TALPs from a family or cross-family whose outputs are discretized then further optimized (using optimization criteria) via a feedback loop using the Data Discretization Optimization engine, and the second diagram shows the same example only using optimized pooled investment fund algorithms whose cash flow outputs are discretized then further optimized via a feedback loop for later use, in accordance with embodiments of the present invention.

FIG. 27 shows two diagrams. The first diagram 400 shows a TALP Family's pooled, optimized output data re-sent to the Data Discretization Optimization engine. The TALP's pooled output data is re-optimized based on new input data values by comparing the TALP output values to the required output values, eliminating any TALP whose output values decrease values that are to be maximized or increase those values that are to be minimized until either the minimum number of TALP Family types are present and/or the best-valued TALPs are included. The continuously optimized discretized data groups are available for distribution to different categories of users (super user, senior, junior, etc.)

The second diagram 402 shows an Asset Family's pooled, optimized output data sent to the Risk/Return Allocation Vehicle (rRAV) engine 394. The Asset Family's pooled output data is re-optimized based on new input data values by comparing the Asset output values to the required output values, eliminating any Asset whose output values decrease values that are to be maximized or increase those values that are to be minimized until either the minimum number of Asset Family types are present and/or the best-valued Assets are included. The pooled output data is composed of investment units or securities (see FIG. 13). Some units or securities maximize certain output values such as returns while others minimize output values like risk. The continuously optimized units are available for distribution to different categories of partners (general partner, senior limited partner, junior limited partner, etc.).

Figure 28:
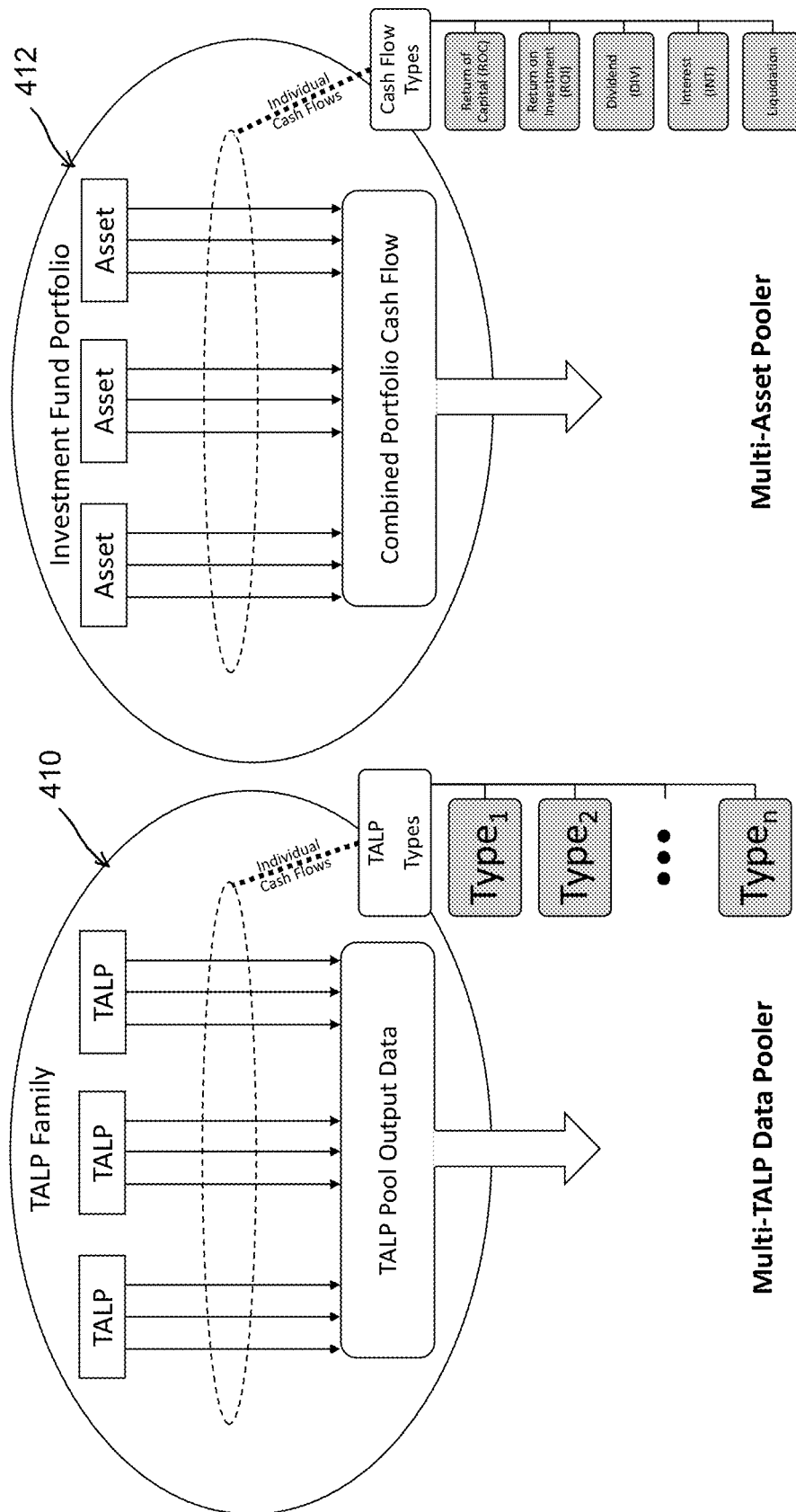
FIG. 28 shows two diagrams: the first depicts an example of various TALP and TALP types within a TALP Family with their output data combined into a single pool of data, and the second diagram shows the same example only using investment fund algorithms within an Asset Family whose output values are pooled, in accordance with embodiments of the present invention.

FIG. 28 shows two diagrams. The first diagram 410 shows the outputs of each TALP within a TALP Family pooled according to the TALP type. The second diagram 412 shows this pooling using the outputs of each asset of an investment fund or portfolio. The output of all assets in a fund are pooled using information from the various asset types within the fund or portfolio.

Figure 29:
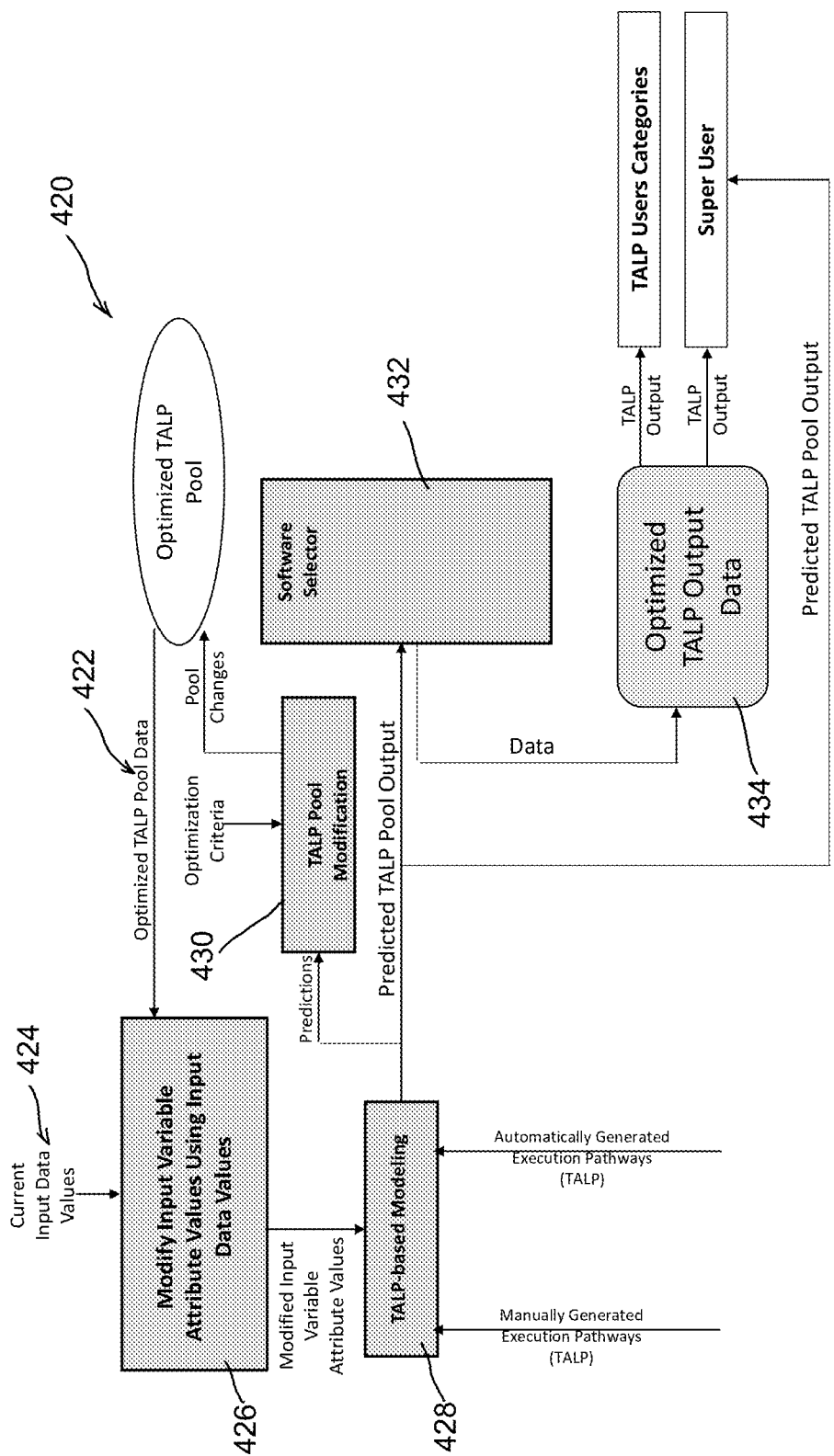
FIG. 29 shows a diagram of the Data Discretization Optimization (DDO) engine that uses the optimized pooled TALP output data generated using the associated TALP prediction polynomials from a family or cross-family, in accordance with embodiments of the present invention.

FIG. 29 shows a diagram 420 of a detailed example of a Data Discretization Optimization (DDO) engine. Optimized TALP pool data 422 and the current input data values 424 are received by the Modify Input Variable Attribute Values Using Input Data Values software component 426. This data uses the TALP polynomials with their associated prediction polynomials to predict future TALP pool values in the TALP-based Modeling software component 428. These predicted output values are compared to the optimization criteria in the TALP Pool Modification software component 430 to determine if the TALPs are applicable in the future. The predicted TALP values are also used to select software that are in algorithmic form in the Software Selector component 432 then sent to the Optimized TALP Output Data component 434 for further use.

Figure 30:
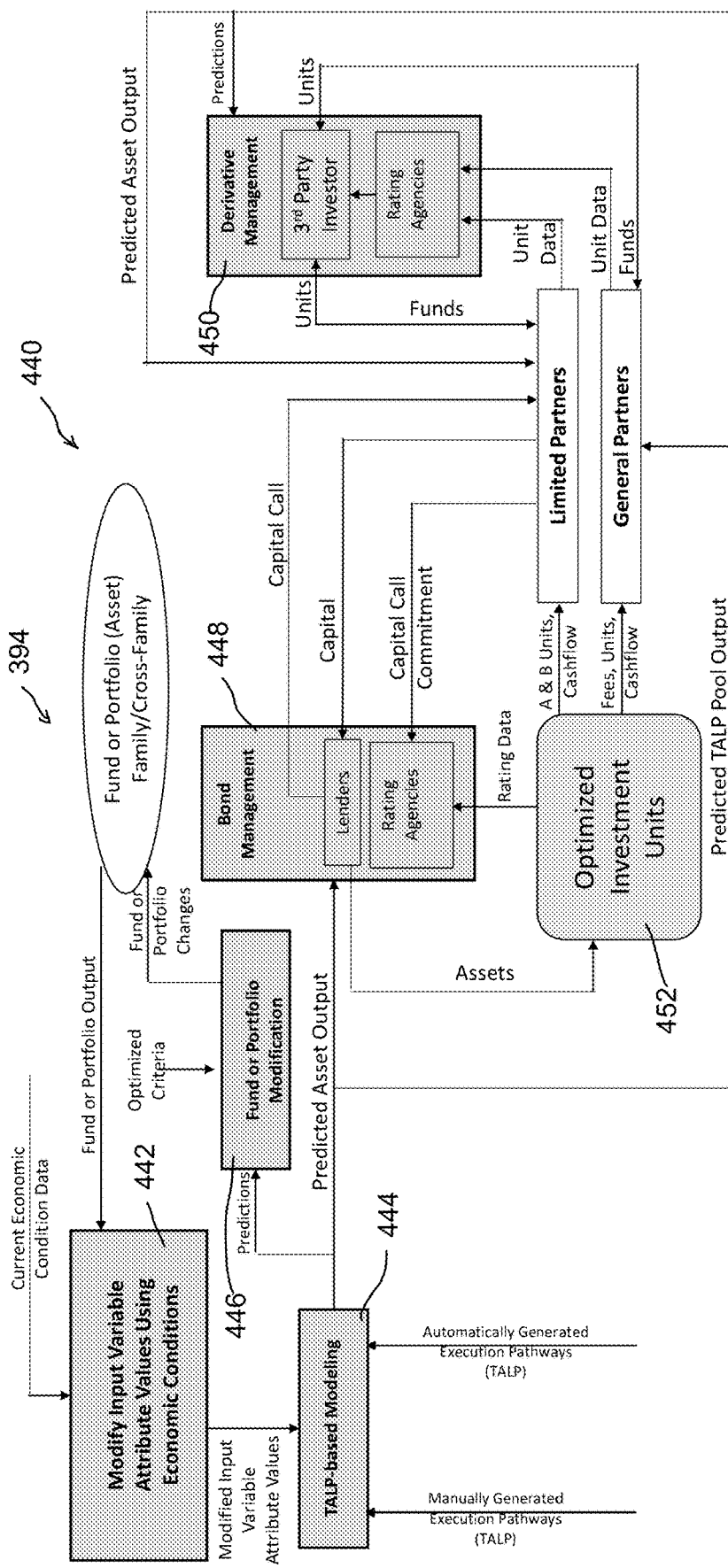
FIG. 30 shows a diagram of a Risk/Return Allocation Vehicle (rRAV) Engine that uses optimized pooled Fund Portfolio (Asset Family) output data generated using associated investment algorithm prediction polynomials, in accordance with embodiments of the present invention.

FIG. 30 shows a diagram 440 of a detailed example of a risk/Return Allocation Vehicle (rRAV) engine 394. Optimized Fund or portfolio pooled data and the current economic conditions are received by the Modify Input Variable Attribute Values Using Economic Conditions software component 442. This data uses the TALP polynomials, with associated prediction polynomials created for the Fund assets to predict future fund or portfolio values in the TALP-based Modeling software component 444. These predicted values are compared to the optimization criteria in the Fund or Portfolio Modification Software component 446 to determine if Fund or Portfolio asset values are applicable in the future. Unlike the DDO engine shown in FIG. 26, the rRAV engine 394 shows the Software Selection component as Bond Management 448 and Derivative Management components 450 where the predicted asset output values are used to select assets sent to the Optimized Investment Units 452 component for further use.

Figure 31:
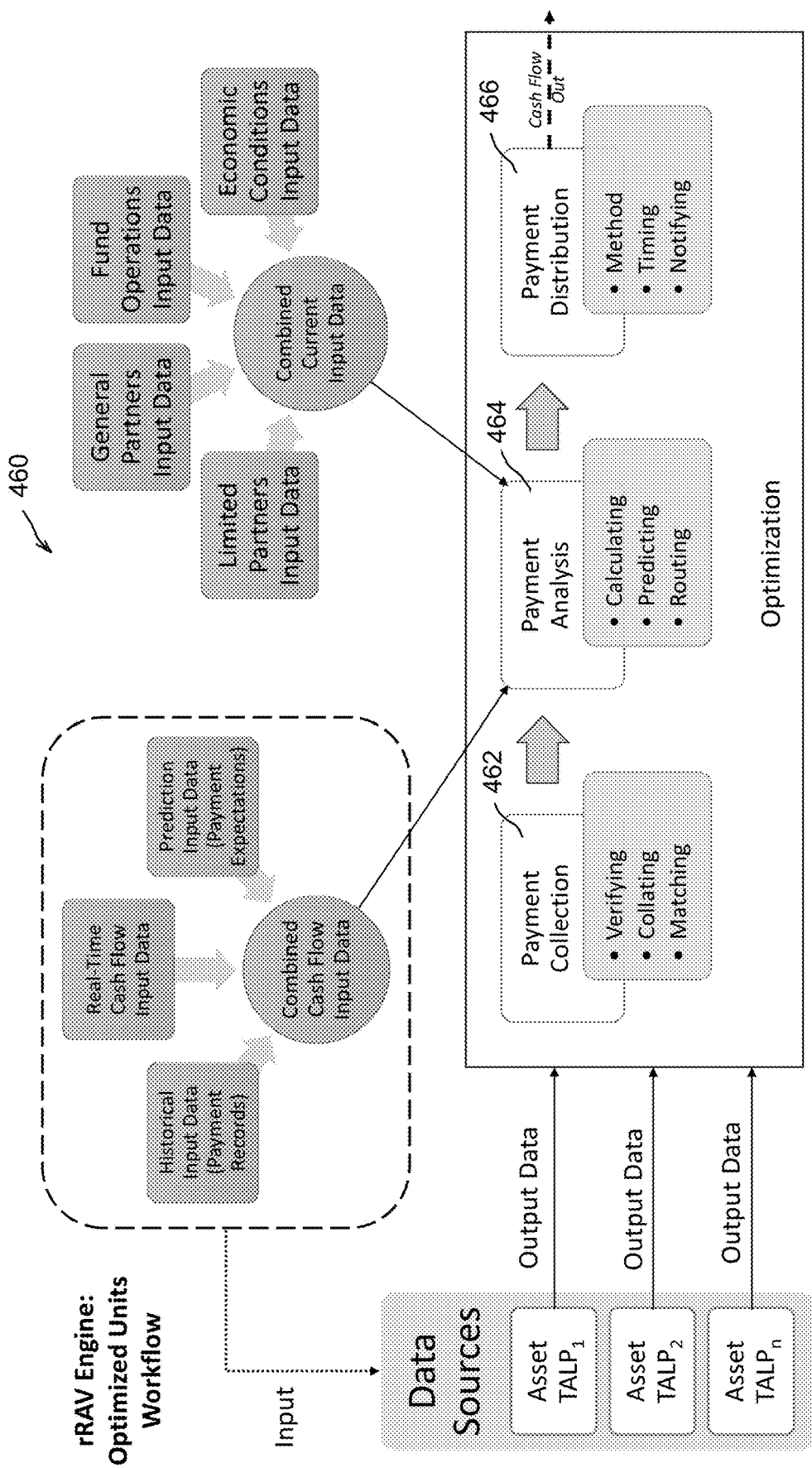
FIG. 31 shows the rRAV engine-optimized unit work flow wherein Investment Software has been converted into Asset TALPs with associated prediction polynomials whose output data; historical, real-time, and predicted input data; and combined data from GPS, LPs, Fund Operations, and current economic conditions are used to optimize cash flows, in accordance with embodiments of the present invention.

FIG. 31 shows an example of an rRAV engine work flow 460. Various input data sources are entered into the asset TALP that represents fund assets, generating predicted output data (payments, payment timings, principle, interest rates, capital call events, etc.). To optimize the set of pooled combined cashflow input data requires the combined current input data and the following:

1) Payment Collection 462: Verification, collation, and matching output data to required inputs to ensure that the received data is associated with the correct partner and asset.
2) Payment Analysis 464: Calculating, predicting, and routing, using the current data combined with predicted data to ensure that the future minimum and maximums for each asset in each fund remains acceptable.
3) Payment Distribution 466: Method, timing, and notifying to ensure that the associated partners are notified of any predicted deviations in the output data of any asset, either in value or timing.

Figure 32:
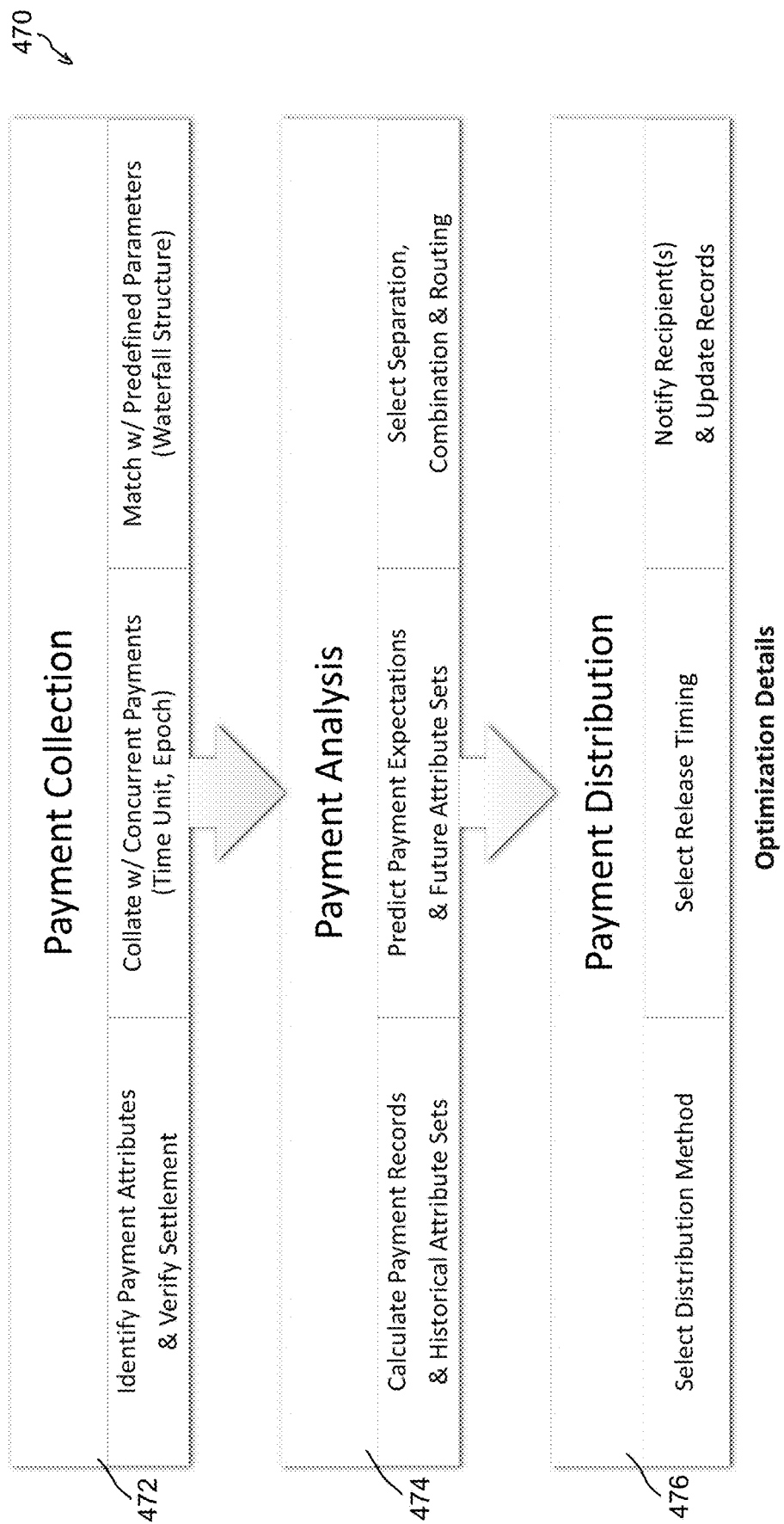
FIG. 32 shows a diagram detailing pooled Asset TALP output data optimization from investment algorithms, in accordance with embodiments of the present invention.

FIG. 32 shows a diagram 470 with additional detail for the optimization portion of the rRAV Optimized engine work flow shown in FIG. 28.

1) Payment Collection 472: Identify an asset's payment attributes then verify the settlement of the received payment; collate with concurrent asset payments including unit time and current epoch; and match with predefined parameters.
2) Payment Analysis 474: Calculate and save records and historical attributes; predict payment expectations and future asset attribute sets; and select the partners that will receive payment and other asset attribute information.
3) Payment Distribution 476: Select distribution method and distribution timing and send notifications to the correct partner.

Figure 33:
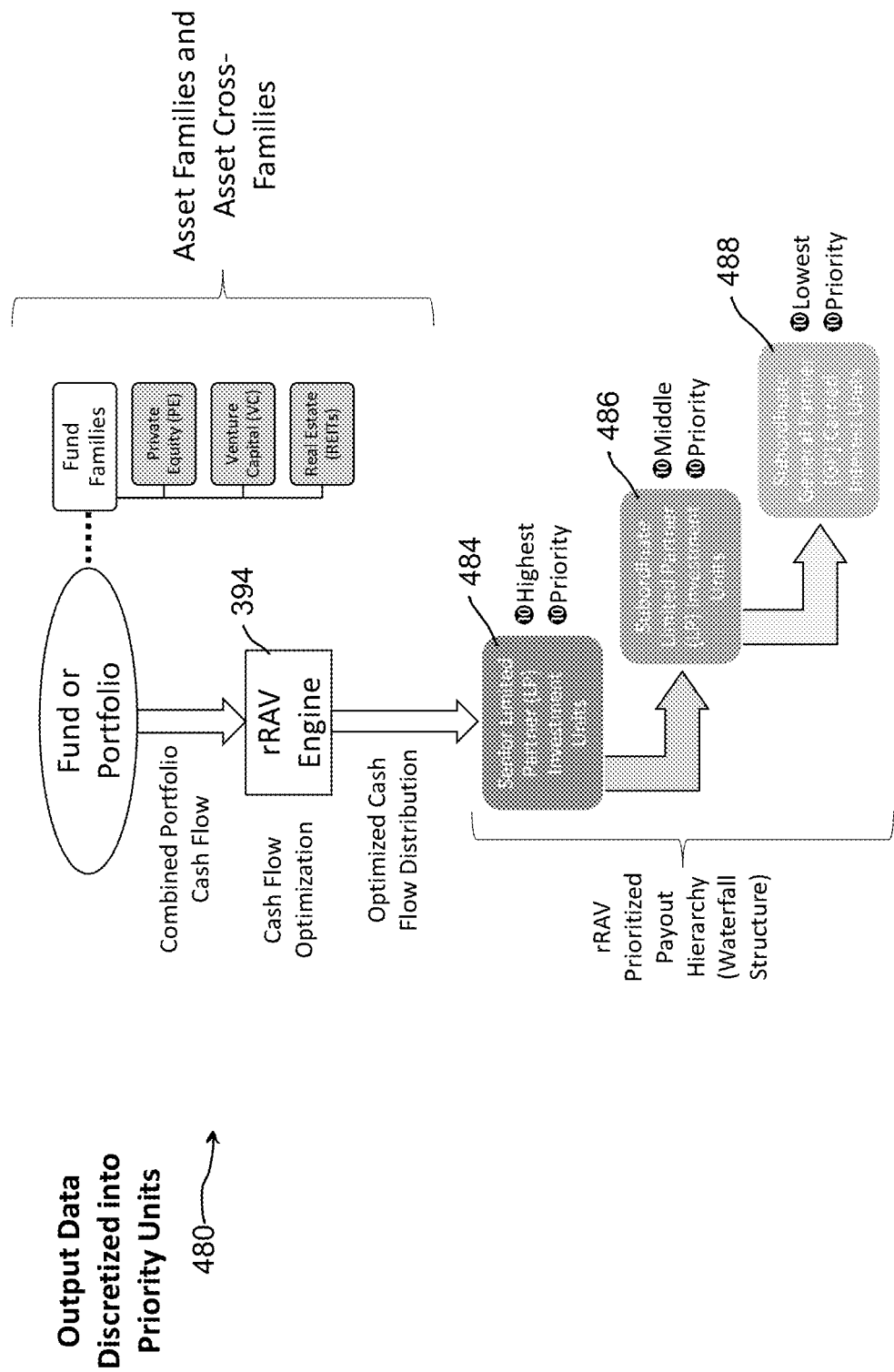
FIG. 33 shows a diagram detailing the conversion of optimized Asset TALP output data, such as cash flow from pooled investment funds, to various priority units for distribution, in accordance with embodiments of the present invention.

FIG. 33 shows an example 480 of the rRAV engine 394 discretizing the Fund or Portfolio asset output values into multiple types of Investment Units, with only the cash flow output dataset shown. These units are called prioritized payouts because distribution to a succeeding unit type only occurs after the payout to the preceding Investment Unit type. The Senior Limited Partner 484 is shown as having the highest priority, receiving the payout for these units first. The Subordinate Limited Partner 486 (sometimes called the Junior Limited Partner) is paid out next, followed by the General Partner 488.

Figure 34:
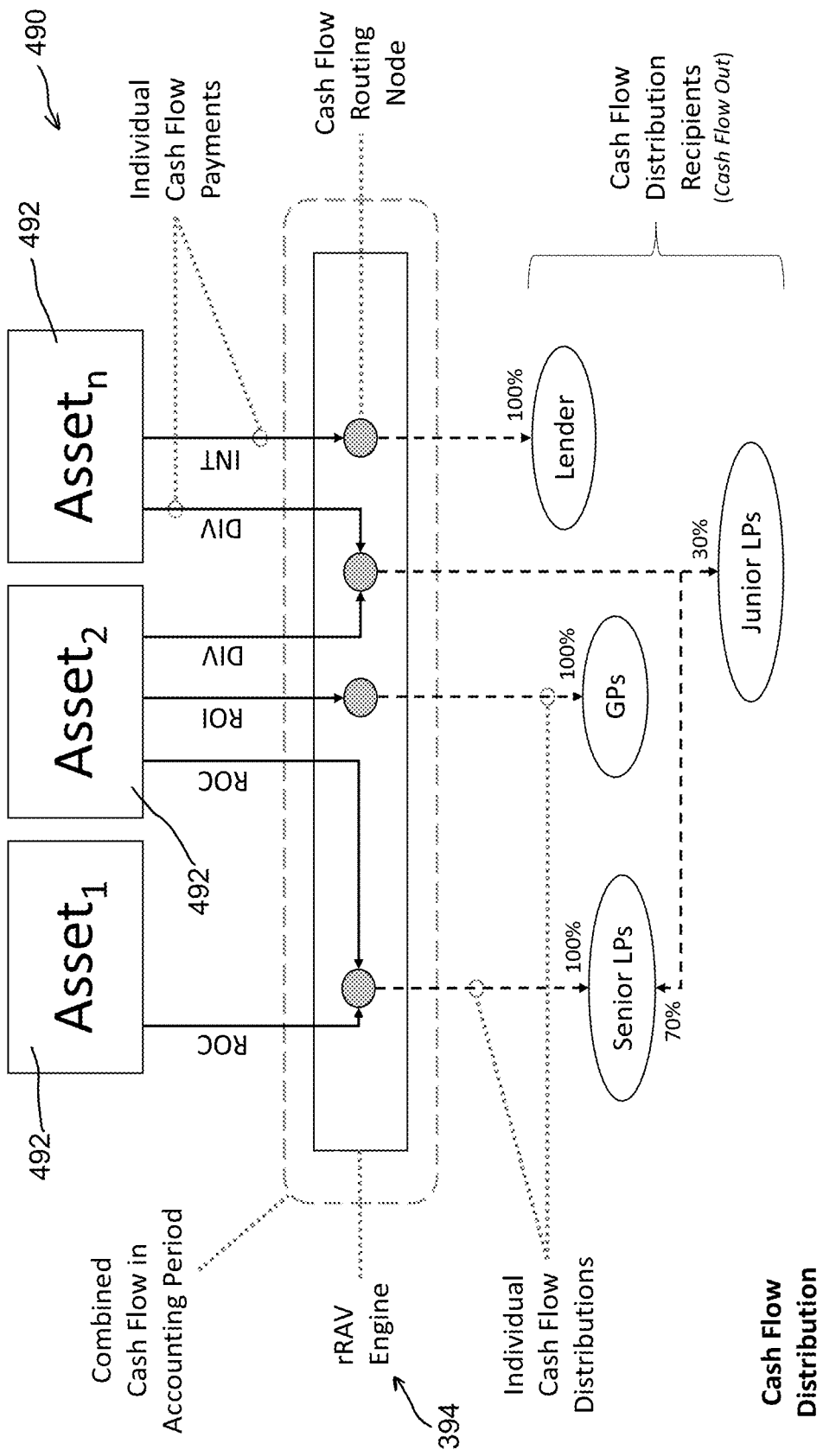
FIG. 34 shows a diagram detailing the distribution of various pooled Asset TALP output data from investment algorithms to various user classes: Senior LPs, Junior LPs, and GPs, in accordance with embodiments of the present invention.

FIG. 34 shows an example 490 of assets 492 from Asset Families or Asset Cross-Families pooled, discretized and optimized into Investment Units in the rRAV engine 394 for General Partners, Senior Limited Partners, Junior Limited Partners, and others, using various assets with different percentages allocated to different partnership categories.

Figure 35:
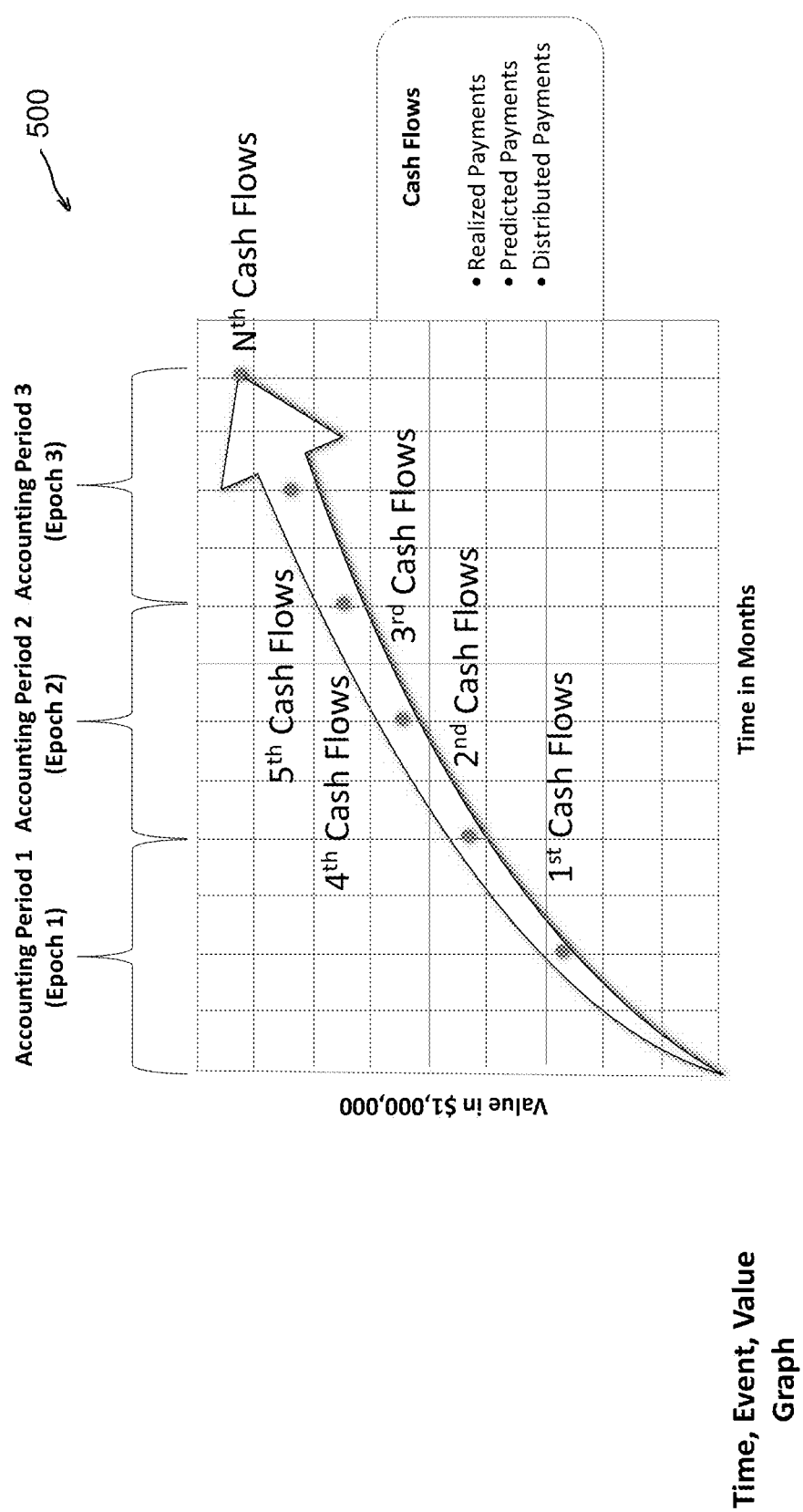
FIG. 35 shows a graph depicting the use of Advanced Time Complexity and Value Complexity to predict investment fund valuations over time, in accordance with embodiments of the present invention.

FIG. 35 shows a graph 500 of predicted asset values over time, breaking up the asset lifetime into epochs and showing multiple output events (cashflows). Predictions can be generated using the prediction polynomials associated with an asset TALP and viewed by partners for any asset TALP, asset Family, or asset Cross-Family.

Figure 36:
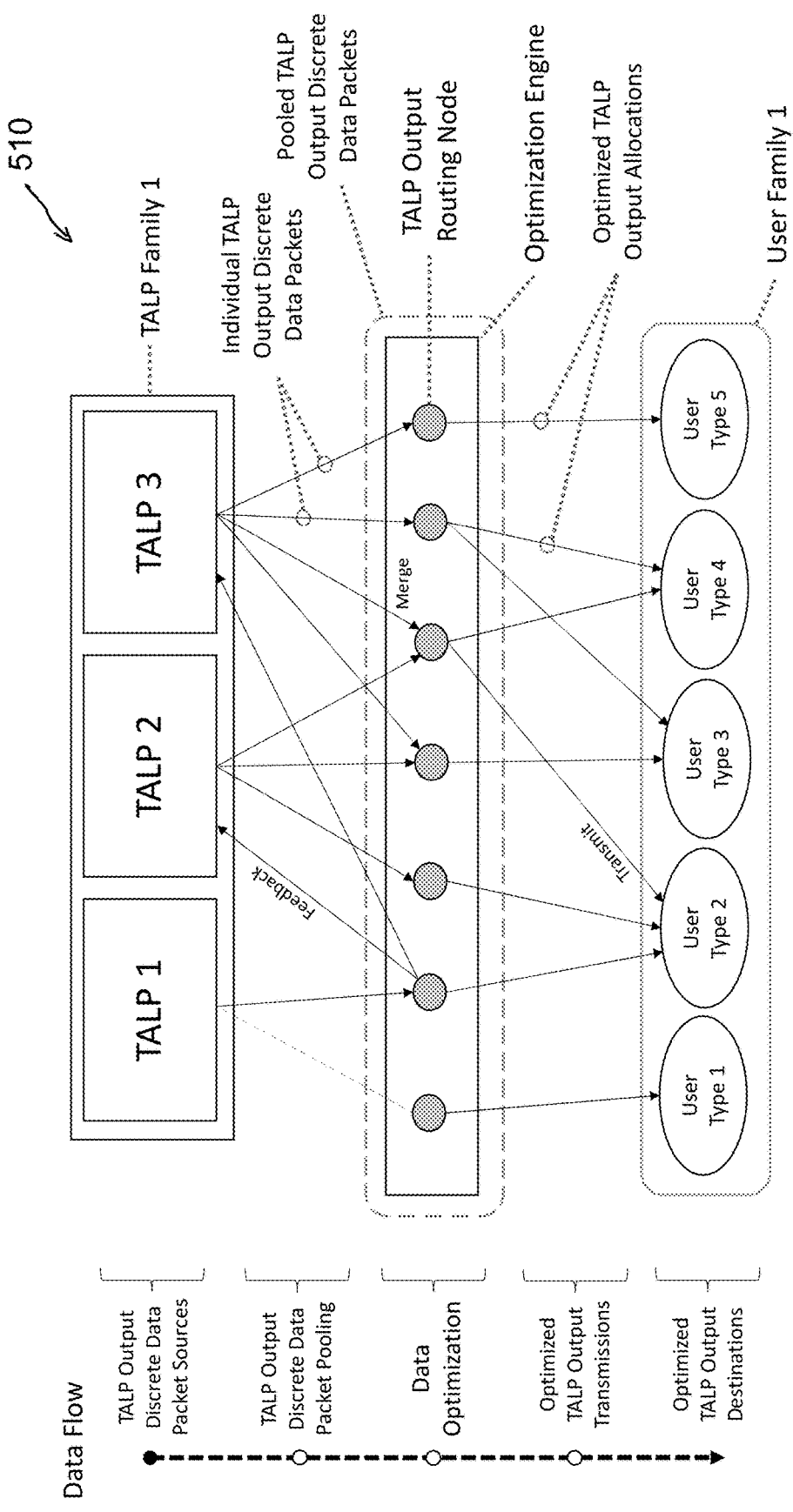
FIG. 36 shows a data flow diagram detailing the automatic conversion of unoptimized input data to TALP family output data within a single epoch in a series of data processing epochs, in accordance with embodiments of the present invention.

FIG. 36 shows a data flow diagram 510 detailing the automatic conversion of unoptimized input data to TALP family output data within a single epoch in a series of data processing epochs. The outputs (individual TALP output discrete data packets) from multiple TALPs (TALP Output Discrete Data Packet Sources) in a TALP family (TALP Family 1) are then pooled (TALP Output Discrete Data Packet Pooling) (pooled TALP output discrete data packets) and transmitted to the Optimization Engine for processing.

The Optimization Engine merges (Merge) the appropriate TALP output discrete data packets into optimized TALP output allocations and routes them via multiple TALP Output Routing Nodes (Data Optimization). The optimized TALP output allocations are then transmitted (Optimized TALP Output Transmissions) to multiple user types (Optimized TALP Output Destinations) in a user family (User Family 1). Additionally, some optimized TALP output allocations may be transmitted (Feedback) to select TALPs in the TALP family (TALP Family 1). This entire iterative process is repeated within every epoch in the data processing epoch series until there is no further data left to process.

Figure 37:
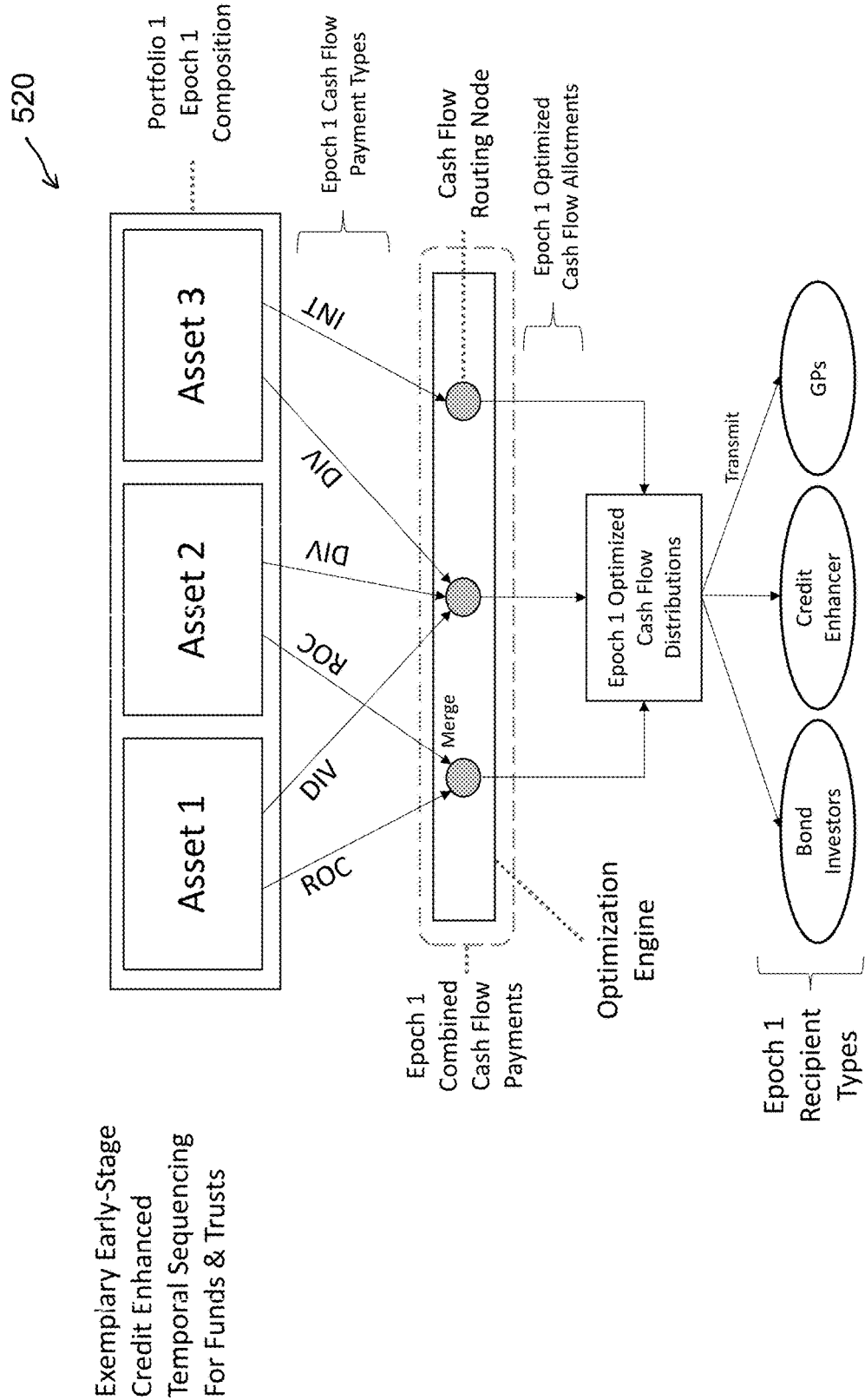
FIG. 37 shows a diagram of an embodiment of an early-stage credit enhanced temporal sequencing model for funds and trusts, in accordance with embodiments of the present invention.

FIG. 37 shows a diagram 520 of an embodiment of an early-stage credit enhanced temporal sequencing model for funds and trusts based upon the data flow diagram of FIG. 36. The model details the automatic conversion of unoptimized input data to TALP family output data within the first epoch (Data Processing Epoch 1) in a series of three sequential data processing epochs. TALP output discrete data packets (cash flow payments) from a set of multiple TALPs (Assets) that comprise a TALP family (Portfolio 1) within Epoch 1 are then pooled (Epoch 1 Combined Cash Flow Payments) and transmitted to the Optimization Engine for processing.

The Optimization Engine merges (Merge) the appropriate TALP output discrete data packets (cash flow payments) according to their respective TALP output types (Epoch 1 cash flow payment types) into optimized TALP output allocations (cash flow allotments) and routes them via multiple TALP Output Routing Nodes (Cash Flow Routing Nodes). The optimized TALP output allocations (Epoch 1 cash flow allotments) are then transmitted (Epoch 1 Optimized Cash Flow Distributions) to a set of multiple user types (Bond Investors, Credit Enhancer, and GPs) that comprise a user family (Epoch 1 Recipient Types) within Epoch 1.

Figure 38:
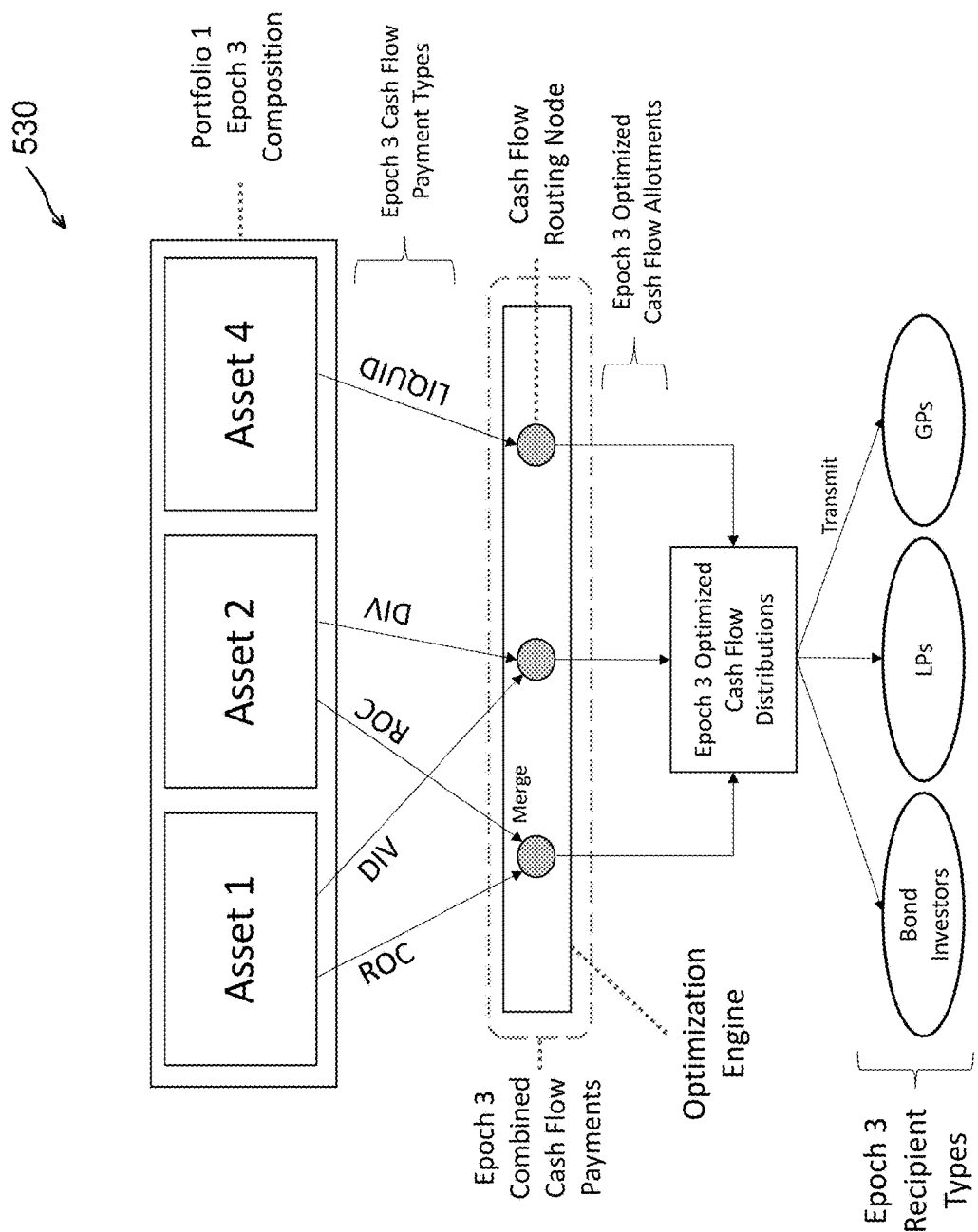
FIG. 38 shows a diagram of a late-stage version of the temporal sequencing model, in accordance with embodiments of the present invention.

FIG. 38 shows a diagram 530 of a late-stage version of the temporal sequencing model of FIG. 37 detailing the automatic conversion of unoptimized input data to TALP family output data within the third epoch (Data Processing Epoch 3) in a series of three sequential data processing epochs. TALP output discrete data packets (cash flow payments) from a set of multiple TALPs (Assets) that comprise a TALP family (Portfolio 1) within Epoch 3 are then pooled (Epoch 3 Combined Cash Flow Payments) and transmitted to the Optimization Engine for processing.

The Optimization Engine merges (Merge) the appropriate TALP output discrete data packets (cash flow payments) according to their respective TALP output types (Epoch 3 cash flow payment types) into optimized TALP output allocations (cash flow allotments) and routes them via multiple TALP Output Routing Nodes (Cash Flow Routing Nodes). The optimized TALP output allocations (Epoch 3 cash flow allotments) are then transmitted (Epoch 3 Optimized Cash Flow Distributions) to a set of multiple user types (Bond Investors, LPs, and GPs) that comprise a user family (Epoch 3 Recipient Types) within Epoch 3.

Figure 39:
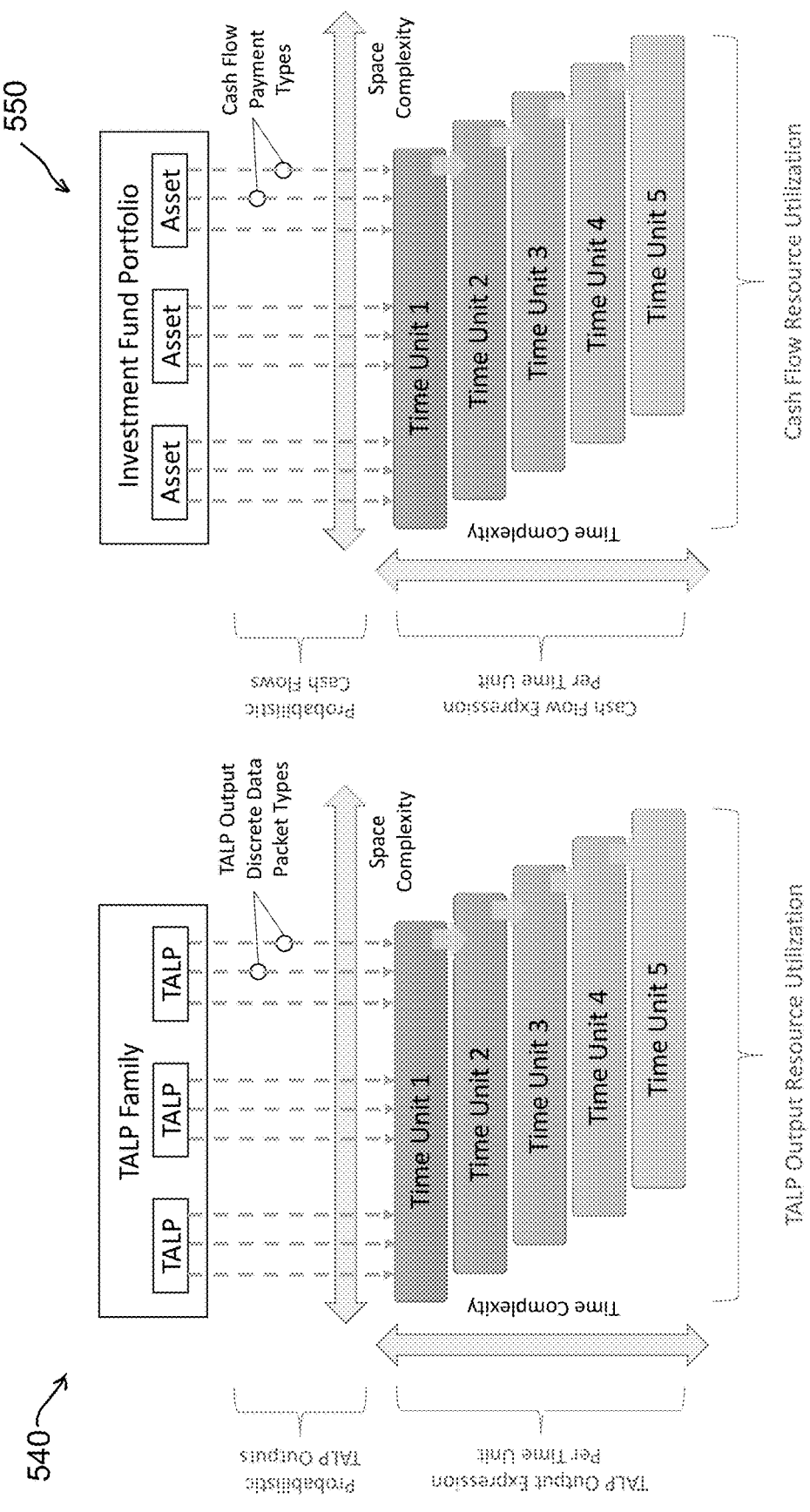
FIG. 39 shows two diagrams: the first depicts a TALP Family (Multi-TALP Data Pooler) modeled within each of the data processing epochs (Epoch (n)), and the second diagram depicts the Investment Fund Portfolio (Multi-Asset Pooler) modeled within each of the accounting periods (Accounting Period (n)), in accordance with embodiments of the present invention.

FIG. 39 shows two diagrams. The first diagram 540 (on the left side) shows the TALP Family (Multi-TALP Data Pooler) of FIG. 28 modeled within each of the data processing epochs (Epoch (n)) of FIG. 35. The pooled TALP outputs from the TALP Family contribute to predicted activity based upon probabilistic calculations of individual TALP output discrete data packets and TALP output discrete data packet types. The timing for the receipt of outputs from the various TALPs is determined using time complexity for each TALP overlayed on top of the various sequential time units within each data processing epoch. The resources required by each of the pooled TALPs to generate their outputs (space complexity) is also predicted. Thus, both time and space complexity can be used in the optimization of time-based pooled TALP predicted output values (shown as the Probabilistic TALP Outputs) per time unit.

The second diagram 550 (on the right side) shows the Investment Fund Portfolio (Multi-Asset Pooler) of FIG. 28 modeled within each of the accounting periods (Accounting Period (n)) of FIG. 35. The combined cash flows from the Investment Fund Portfolio contribute to predicted activity based upon probabilistic calculations of individual cash flow payments and cash flow payment types. The timing for the receipt of payments from the various Assets is determined using time complexity for each Asset overlayed on top of the various sequential time units within each accounting period. The resources required by each of the combined Assets to generate their payments (space complexity) is also predicted. Thus, both time and space complexity can be used in the optimization of time-based combined Asset predicted payment values (shown as the Probabilistic Cash Flows) per time unit.

Figure 40:
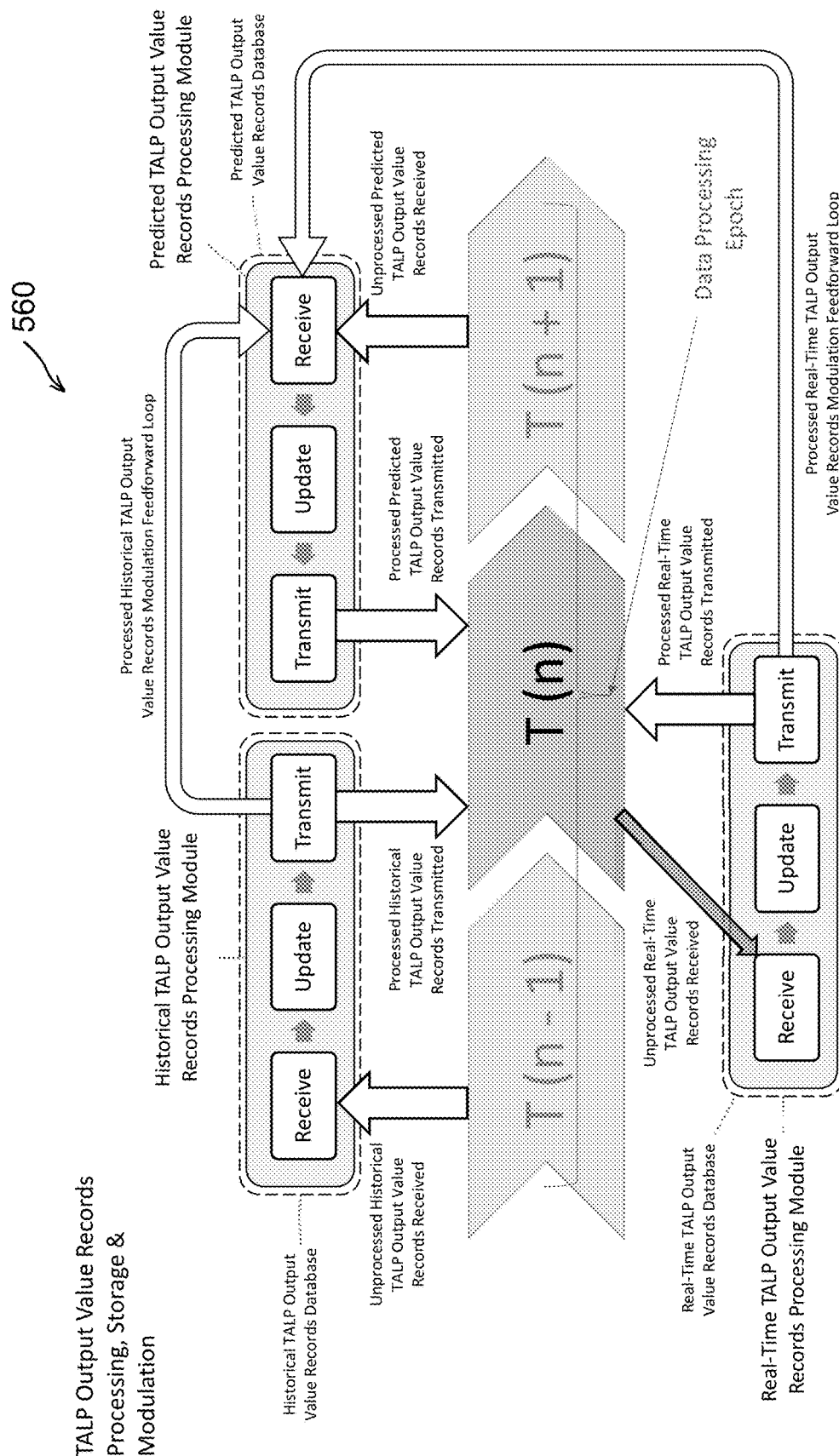
FIG. 40 shows a diagram of the details of the TALP output value records processing, storage, and modulation component of the optimization engine operating within a single data processing epoch, in accordance with embodiments of the present invention.

FIG. 40 shows a diagram 560 of the details of the TALP output value records processing, storage, and modulation component of the optimization engine of FIG. 36 operating within a single data processing epoch. This component is comprised of multiple temporal databases operating in synchronization within a data processing epoch, each containing respective TALP output value records processing modules and connected with multiple feedback and feedforward loops.

As shown, unprocessed real-time TALP output value records from the current processing time (T(n) where n=current time) are received (Receive) by the Real-Time TALP Output Value Records Processing Module within the Real-Time TALP Output Value Records Database. Those records are then processed and stored (Update), and subsequently transmitted (Transmit) as processed real-time TALP output value records in a feedback loop to the current processing time (T(n)). The processed real-time TALP output value records are also transmitted (Transmit) to the Predicted TALP Output Value Records Processing Module within the Predicted TALP Output Value Records Database via a feedforward loop. Unprocessed historical TALP output value records from the past processing time (T(n−1) where n−1=historic time) are received (Receive) by the Historical TALP Value Records Processing Module within the Historical TALP Output Value Records Database. Those records are then processed and stored (Update), and subsequently transmitted (Transmit) as processed historical TALP output value records to the current processing time (T(n)). The processed historical TALP output value records are also transmitted (Transmit) to the Predicted TALP Output Value Records Processing Module via a feedforward loop.

Unprocessed predicted TALP output value records from the future processing time (T(n+1) where n+1=predicted time) are received (Receive) by the Predicted TALP Output Value Records Processing Module. Those records are then processed and stored (Update), with the processing continuously modulated by the processed real-time and historical TALP output value records received (Receive) via the two feedforward loops. The processed predicted TALP output value records are subsequently transmitted (Transmit) to the current processing time (T(n)).

Figure 41:
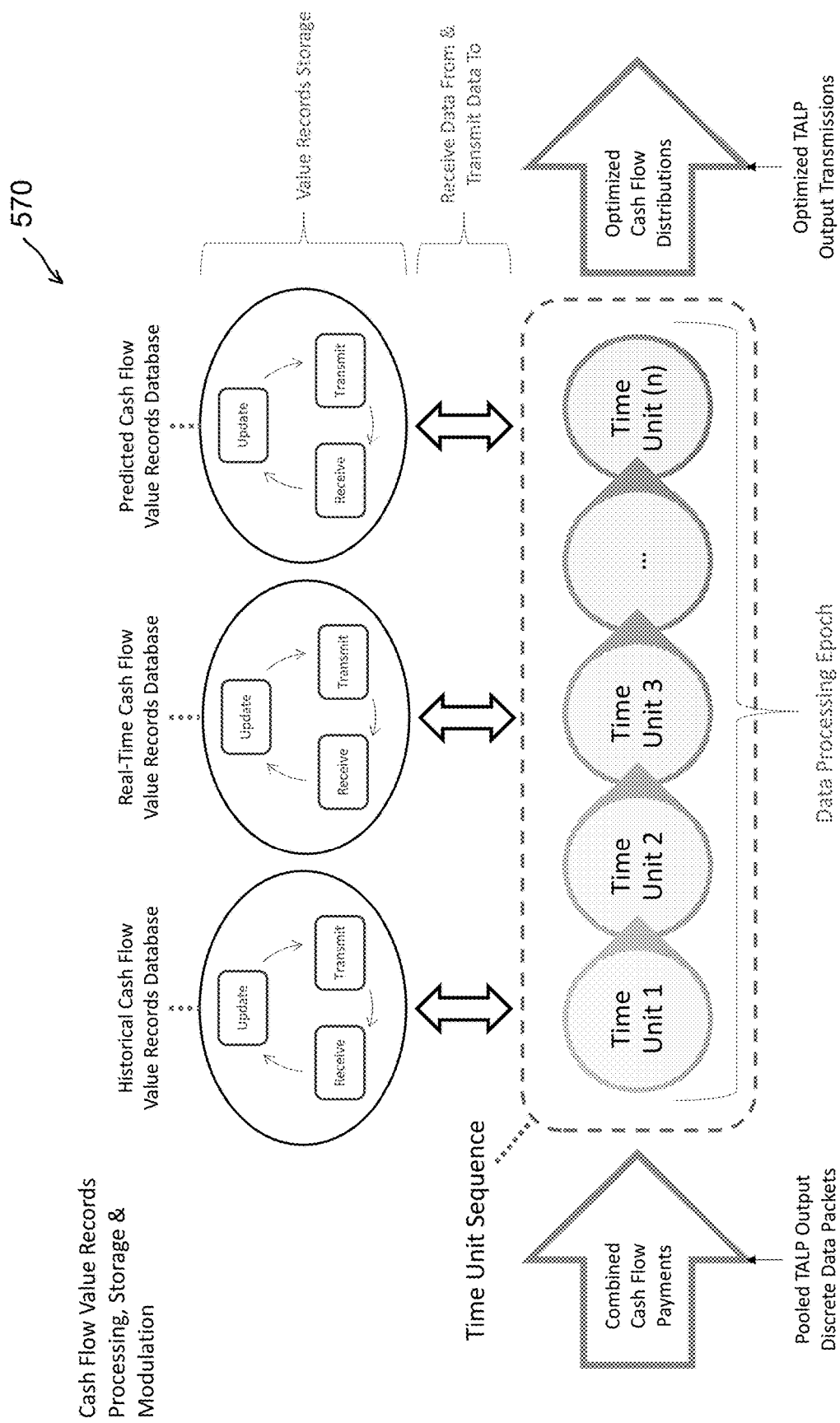
FIG. 41 shows a diagram of the three TALP output (cash flow) value records databases operating in synchronization throughout a time unit sequence comprised of multiple time units within a single data processing epoch, in accordance with embodiments of the present invention.

FIG. 41 shows a diagram 570 of the three TALP output (cash flow) value records databases of FIG. 40 operating in synchronization throughout a time unit sequence comprised of multiple time units within a single data processing epoch. Data feedback and feedforward loops continuously and simultaneously receive unprocessed data from and transmit processed data back to the time units.

The databases employ persistent data reception (Receive), updating (Update), and transmission (Transmit) cycles to process and store the unprocessed historical, real-time, and predicted TALP output (cash flow) value records received from individual time units within the time unit sequence.

The freshly processed historical, real-time, and predicted TALP output (cash flow) value records are subsequently transmitted back to the time units to continuously modulate the optimization of multiple pooled TALP output discrete data packets (combined cash flow payments) into multiple optimized TALP output transmissions (cash flow distributions) over the course of the time unit sequence within the data processing epoch.

Figure 42:
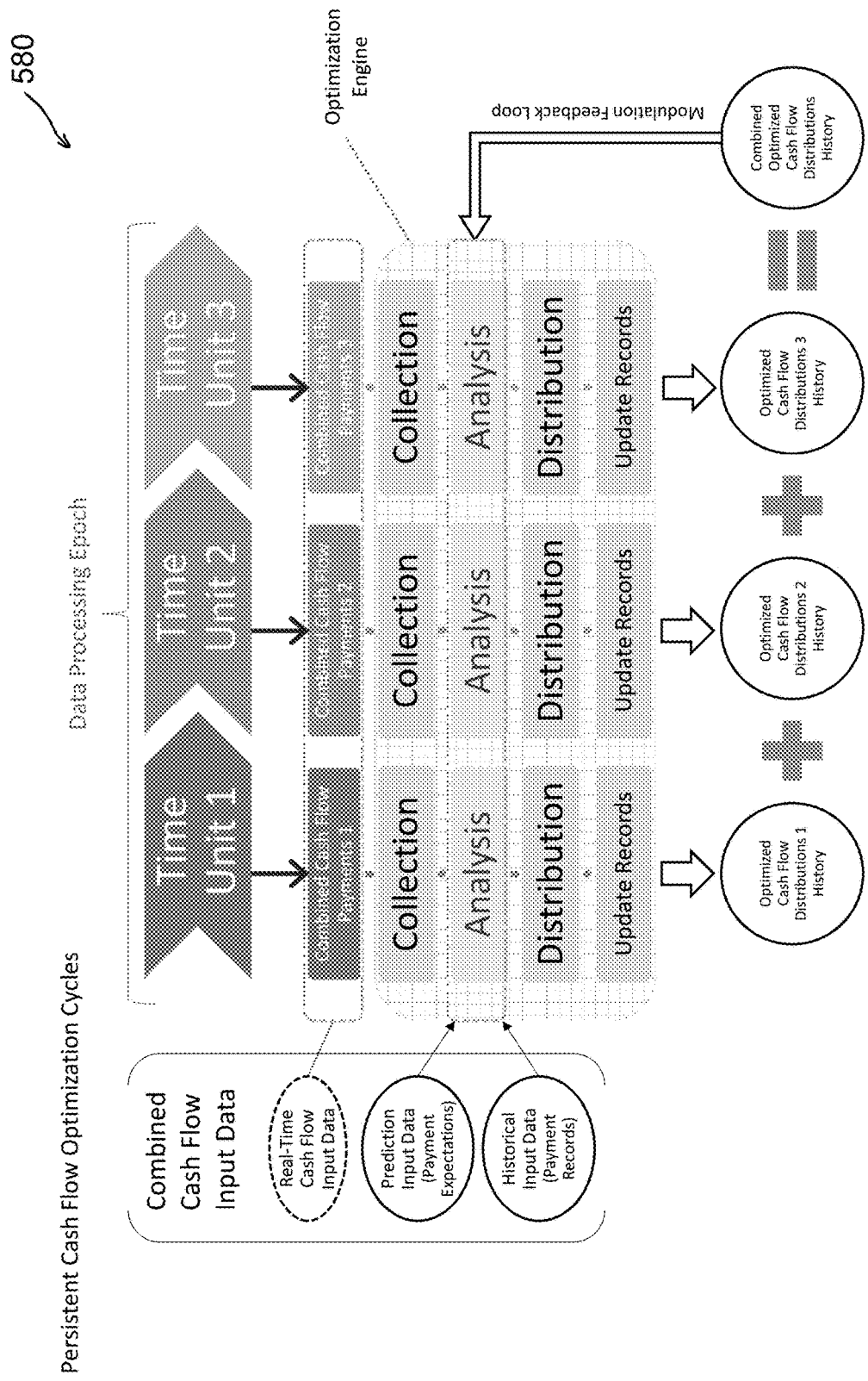
FIG. 42 shows a diagram of the persistent Collection, Analysis, and Distribution cycle (the Payment Collection, Payment Analysis, and Payment Distribution steps, in accordance with embodiments of the present invention.

FIG. 42 shows a diagram 580 of the persistent Collection, Analysis, and Distribution cycle (the Payment Collection, Payment Analysis, and Payment Distribution steps of FIG. 31 and FIG. 32) within the Optimization Engine of FIG. 36. Here multiple TALP output discrete data packets (cash flow payments) are pooled (combined) in each time unit within a single data processing epoch (Real-Time Cash Flow Input Data) (the processed real-time TALP output value records of FIG. 40 and the Real-Time Cash Flow Value Records of FIG. 41).

The pooled TALP output discrete data packets (combined cash flow payments) within each time unit are first identified, verified, collated, and matched (Collection step), and then separated and/or combined and routed as optimized TALP output allocations (cash flow allotments) (Analysis step). These optimization processes in the Analysis step are modulated by both the processed historical (the Historical Cash Flow Value Records of FIG. 41) (Historical Input Data) and predicted (the Predicted Cash Flow Value Records of FIG. 41) (Prediction Input Data) TALP output value records of FIG. 40.

The generated optimized TALP output allocations (cash flow allotments) are then transmitted (distributed) to various users (recipients) and user types (recipient types) (Distribution step) according to various selected distribution and timing methods. After transmission (distribution), the dataset generation and transmission (distribution) information for the optimized TALP output allocations (cash flow distributions) is processed and stored (the Update or Update Records step of FIGS. 32, 40, 41, and 42). This processed and stored information (Optimized Cash Flow Distributions 1, 2, and 3 History) is pooled from each time unit within the data processing epoch (Combined Optimized Cash Flow Distributions History) and transmitted via a feedback loop (Modulation Feedback Loop) to the Analysis step to modulate the optimization processes in subsequent time units.

Figure 43:
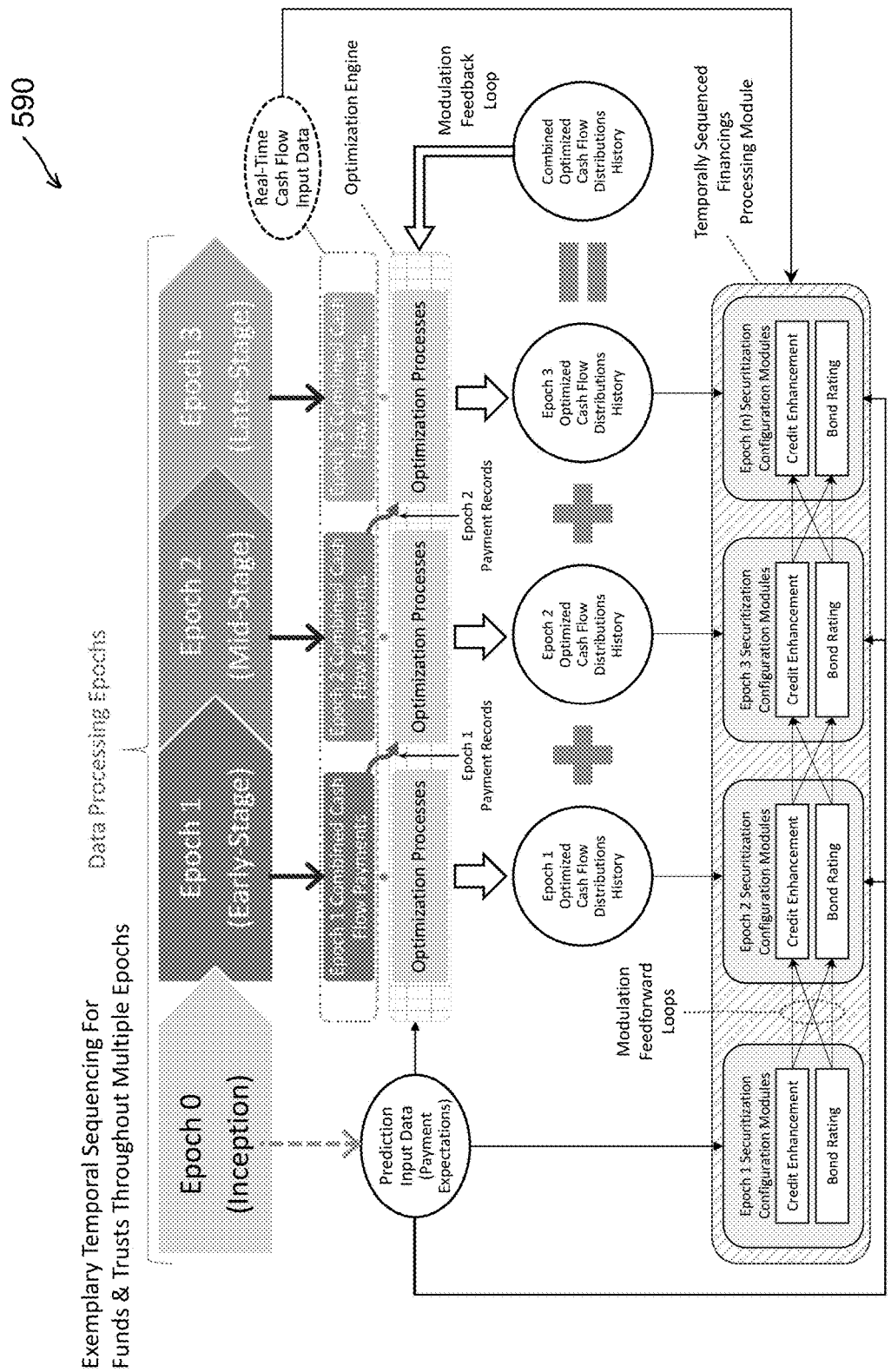
FIG. 43 shows a diagram of the Optimization Processes (the persistent Collection, Analysis, and Distribution cycle) within the Optimization Engine operating in the temporal sequencing model that runs throughout a data processing epoch sequence from Epoch 0 (Inception) to Epoch 3 (Late-Stage), in accordance with embodiments of the present invention.

FIG. 43 shows a diagram 590 of the Optimization Processes (the persistent Collection, Analysis, and Distribution cycle of FIG. 42) within the Optimization Engine of FIG. 36 operating in the temporal sequencing model of FIG. 37 that runs throughout a data processing epoch sequence from Epoch 0 (Inception) to Epoch 3 (Late-Stage). Here, multiple TALP output discrete data packets (cash flow payments) from TALP Family 1 (Portfolio 1) are pooled (combined) in each epoch within the data processing epoch sequence (Real-Time Cash Flow Input Data).

The pooled TALP output discrete data packets (combined cash flow payments) are then optimized per data processing epoch, with the Optimization Processes modulated by both the Historical Cash Flow Value Records (the Payment Records from the previous epochs) and the Predicted Cash Flow Value Records (Prediction Input Data) of FIG. 41.

The generated optimized TALP output allocations (cash flow allotments) are then transmitted (distributed) to their respective user types (recipient types), and the dataset generation and transmission (distribution) information is processed and stored. This processed and stored information (Epoch 1, 2, and 3 Optimized Cash Flow Distributions History) is pooled from each epoch within the data processing epoch sequence (Combined Optimized Cash Flow Distributions History) and transmitted via a feedback loop (Modulation Feedback Loop) to the Optimization Engine to modulate the Optimization Processes in subsequent data processing epochs.

The model further employs a Temporally Sequenced Financings Processing Module comprised of temporally discrete and recurring dual modules (Securitization Configuration Modules) that optimize the composition of user type (recipient type) securities that comprise the temporally sequenced financings for their respective data processing epochs. In this example, the dual modules calculate the optimal credit enhancement and bond ratings for the temporally sequenced financings in each epoch.

The optimization processes within the Securitization Configuration Modules for each data processing epoch are modulated by the Historical Cash Flow Value Records (Payment Records) and Optimized Cash Flow Distributions History from the previous epochs; the Real-Time Cash Flow Value Records (Real-Time Cash Flow Input Data) from the current epoch; and the Predicted Cash Flow Value Records (Prediction Input Data) for the subsequent epochs.

Initially at the inception of a fund or trust, the Epoch 1 Securitization Configuration Modules are only modulated by the Predicted Cash Flow Value Records (Prediction Input Data) generated in Epoch 0 (Inception). Once Epoch 1 is underway, these modules are also modulated by the Historical Cash Flow Value Records (Payment Records) and Real-Time Cash Flow Value Records (Real-Time Cash Flow Input Data) within that epoch. The subsequent Securitization Configuration Modules (Epochs 2, 3, and (n)) receive same-module and cross-module feedforward modulation from previous epochs.

Figure 44:
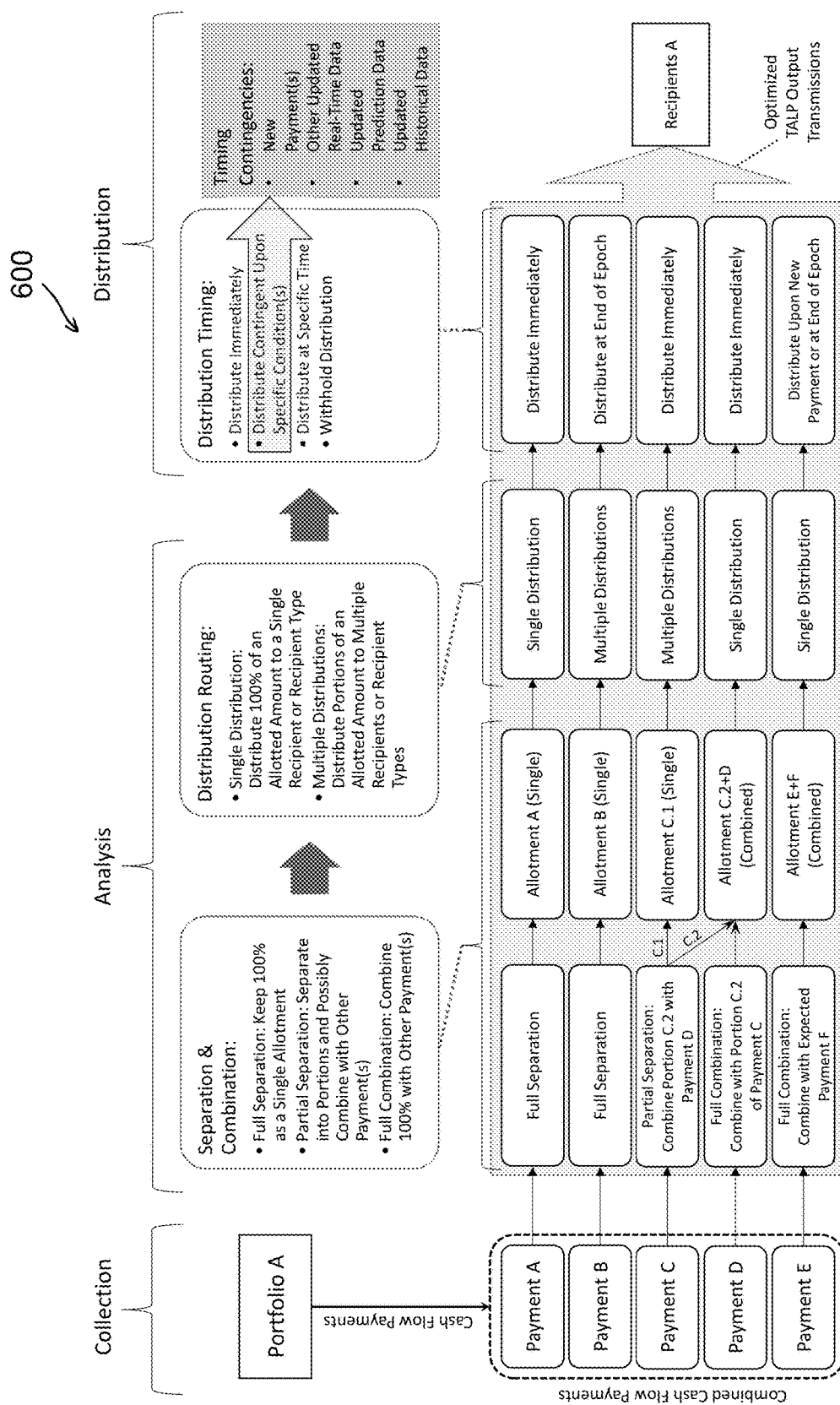
FIG. 44 shows a diagram of an exemplary decision-making model diagram for optimizing pooled TALP output (cash flow) values for the Analyze and Distribute steps, in accordance with embodiments of the present invention.

FIG. 44 shows a diagram 600 of an exemplary decision-making model for optimizing pooled TALP output (cash flow) values for the Analyze and Distribute steps of FIG. 31, FIG. 32, and FIG. 42. In this model, there are three sequential optimization decision steps (Decision-Making Flow) shown: Separation & Combination, Distribution Routing, and Distribution Timing. Certain Timing Contingencies are also shown to affect the Distribution Timing decisions made.

1) Separation & Combination:
   a. Full Separation [fully-separated]: in this decision outcome, 100% of a TALP output discrete data packet (cash flow payment) is kept separate from other TALP output discrete data packets as a single optimized TALP output allocation (cash flow allotment) designated for subsequent transmission (distribution) to one or more users or user types (recipients or recipient types);
   b. Partial Separation [partially-separated]: in this decision outcome, a TALP output discrete data packet (cash flow payment) is separated into at least two portions, each of which is either designated as a single optimized TALP output allocation (cash flow allotment) or merged with at least one other partially-separated or fully-combined TALP output discrete data packet (cash flow payment) into a combined optimized TALP output allocation (cash flow allotment) designated for subsequent transmission (distribution) to one or more users or user types (recipients or recipient types); and c. Full Combination [fully-combined]: in this decision outcome, 100% of a TALP output discrete data packet (cash flow payment) is merged with at least one other partially-separated or fully-combined TALP output discrete data packet (cash flow payment) into a combined optimized TALP output allocation (cash flow allotment) designated for subsequent transmission (distribution) to one or more users or user types (recipients or recipient types).

2) Distribution Routing:
  a. Single Distribution: a designated optimized TALP output allocation (cash flow allotment) generated from one or more decision outcomes in Step 1 (Separation & Combination) is transmitted (distributed) to one user or user type (recipient or recipient type), either as a single optimized TALP output allocation (cash flow allotment) generated from either a Full Separation or Partial Separation decision outcome, or as a combined optimized TALP output allocation (cash flow allotment) generated from either Partial Separation and/or Full Combination decision outcome(s); and
  b. Multiple Distributions: a designated optimized TALP output allocation (cash flow allotment) generated from a decision outcome in Step 1 (Separation & Combination) is apportioned and transmitted (distributed) to multiple users or user types (recipients or recipient types), either as a single optimized TALP output allocation (cash flow allotment) generated from either a Full Combination or Partial Separation decision output, or as a combined optimized TALP output allocation (cash flow allotment) generated from either Partial Separation and/or Full Combination decision outcome(s).

3) Distribution Timing:
  a. Distribute Immediately: a designated optimized TALP output allocation (cash flow allotment) is transmitted (distributed) to one or multiple users or user types (recipients or recipient types) immediately after generation from a decision outcome in Step 2 (Distribution Routing);
  b. Distribute Contingent Upon Specific Condition(s): a designated optimized TALP output allocation (cash flow allotment) is transmitted (distributed) to one or multiple users or user types (recipients or recipient types) if a certain future condition is met;
  c. Distribute at Specific Time: a designated optimized TALP output allocation (cash flow allotment) is transmitted (distributed) to one or multiple users or user types (recipients or recipient types) upon meeting a certain timing condition; and
  d. Withhold Distribution: a designated optimized TALP output allocation (cash flow allotment) is not transmitted (distributed) to any user(s) or user type(s) (recipient(s) or recipient type(s)).

4) Timing Contingencies for Step 3(b) (Distribute Contingent Upon Specific Condition(s)) decision outcomes:
  a. New Payment(s): a new TALP output discrete data packet(s) (cash flow payment(s)) is generated;
  b. Other Updated Real-Time Data: other TALP output data (non-payment-type) are generated;
  c. Updated Prediction Data: the Predicted TALP Output Value Records Database (Cash Flow Value Records Database) of FIG. 40 and FIG. 41 is updated; and
  d. Updated Historical Data: the Historical TALP Output Value Records Database (Cash Flow Value Records Database) of FIG. 40 and FIG. 41 is updated.

FIG. 44 further shows an exemplary TALP Family A (Portfolio A) with five pooled TALP output discrete data packets (cash flow payments) that are processed and optimized based upon the above sequential optimization decision steps (Decision-Making Flow).

Output A (Payment A) represents a TALP output discrete data packet (cash flow payment) that is kept separate (Full Separation) from other TALP output discrete data packets (cash flow payments) as a single optimized TALP output data allocation (cash flow allotment) (Allotment A). One hundred percent of the designated optimized TALP output allocation (cash flow allotment) (Allotment A) is transmitted (distributed) to a single user type (recipient type) (Single Distribution) within User Family A (Recipients A) immediately upon dataset generation (Distribute Immediately).

Output B (Payment B) represents another TALP output discrete data packet (cash flow payment) that is kept separate (Full Separation) from other TALP output discrete data packets (cash flow payments) as a single optimized TALP output allocation (cash flow allotment) (Allotment B). One hundred percent of the designated optimized TALP output allocation (cash flow allotment) (Allotment B) is transmitted (distributed) to two user types (recipient types) (Multiple Distributions) within User Family A (Recipients A) at the end of the data processing epoch (Distribute at End of Epoch).

Output C (Payment C) represents a TALP output discrete data packet (cash flow payment) that is separated into two portions (Portion C.1, Portion C.2) (Partial Separation). One portion (Portion C.1) is designated as a single optimized TALP output allocation (cash flow allotment) (Allotment C.1) that is transmitted (distributed) to two user types (recipient types) (Multiple Distributions) within User Family A (Recipients A) immediately upon dataset generation (Distribute Immediately).

The other portion (Portion C.2) is additively merged with the entirety of Output D (Payment D) (Full Combination) into a combined TALP output allocation (cash flow allotment) (Allotment C.2+D) and transmitted (distributed) to a single user type (recipient type) (Single Distribution) within User Family A (Recipients A) immediately upon dataset generation (Distribute Immediately).

Output E (Payment E) represents a TALP output discrete data packet (cash flow payment) that is slated to be combined in full (Full Combination) with the predicted values of Future Output F (Payment F). If Output F (Payment F) is generated during the current epoch, then it will be additively merged with the entirety of Output E (Payment E) into a combined optimized TALP output allocation (cash flow allotment) (Allotment E+F) and transmitted (distributed) to a single user type (recipient type) within User Family A (Recipients A) immediately upon dataset generation (Distribute Upon New Payment). If Output F (Payment F) is not generated before the end of the current epoch, then Output E (Payment E) will be designated as a single optimized TALP output allocation (cash flow allotment) (Allotment E) and transmitted (distributed) to the same user type (recipient type) within User Family A (Recipients A) after all data processing is completed for the current epoch (Distribute at End of Epoch).

Figure 45:
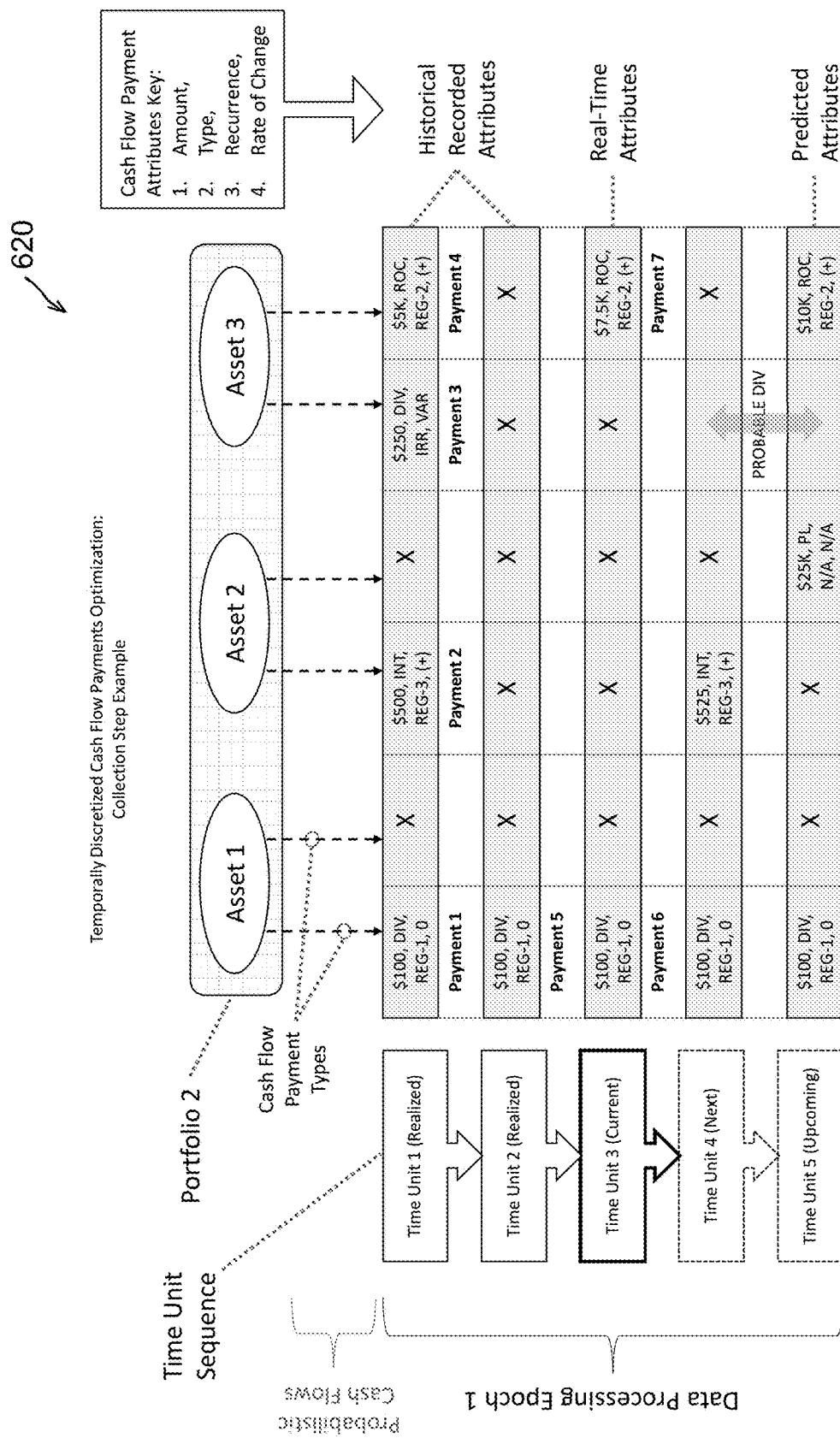
FIG. 45 shows a diagram of certain details of the Collection or Payment Collection step, with examples of various ways to discretize and process pooled TALP output (combined cash flow) values over time combining historical (Realized), current (Current), and predicted (Next) (Upcoming) pooled TALP output (combined cash flow) values within a data processing epoch (Data Processing Epoch 1), in accordance with embodiments of the present invention.

FIG. 45 shows a diagram 620 of certain details of the Collection or Payment Collection step of FIG. 31, FIG. 32, FIG. 42, and FIG. 44, with examples of various ways to discretize and process pooled TALP output (combined cash flow) values over time combining historical (Realized), current (Current), and predicted (Next) (Upcoming) pooled TALP output (combined cash flow) values within a data processing epoch (Data Processing Epoch 1).

TALP output discrete data packets (cash flow payments) from TALP Family 2 (Portfolio 2) organized as Cash Flow Payment Types from multiple TALPs (Assets) per time unit (Time Unit Sequence) within the data processing epoch (Data Processing Epoch 1) are either not generated; generated once; or repeatedly generated per data processing epoch (Data Processing Epoch 1). Each generated TALP output discrete data packet (cash flow payment) is identified, verified, collated, matched, and stored according to its unique variable attribute set, which may include the individual variable attributes shown in the Cash Flow Payment Attributes Key: Amount, Type, Recurrence, and Rate of Change.

Figure 46:
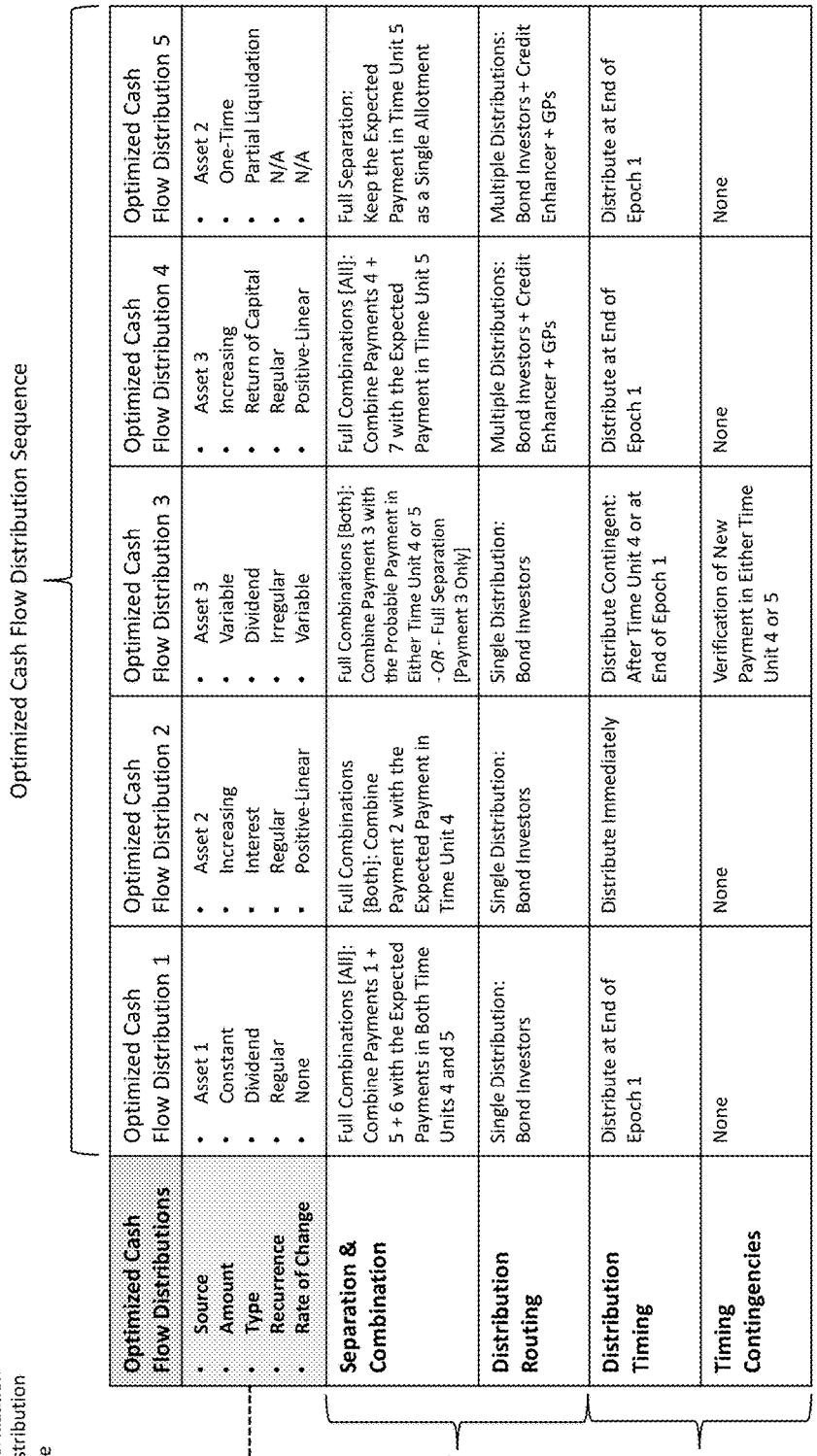
FIG. 46 shows a diagram of certain details of the Analysis or Payment Analysis and Distribution or Payment Distribution steps, with five exemplary optimized TALP output transmissions (Optimized Cash Flow Distributions) generated from the temporally discretized TALP output discrete data packets (cash flow payments) from TALP Family 2 (Portfolio 2), in accordance with embodiments of the present invention.

FIG. 46 shows a diagram 630 of certain details of the Analysis or Payment Analysis and Distribution or Payment Distribution steps of FIG. 31, FIG. 32, FIG. 42, and FIG. 44, with five exemplary optimized TALP output transmissions (Optimized Cash Flow Distributions) generated from the temporally discretized TALP output discrete data packets (cash flow payments) from TALP Family 2 (Portfolio 2) of FIG. 45. These optimized TALP output transmissions (cash flow distributions) represent various types of decision outcomes based upon the sequential optimization decision steps (Decision-Making Flow) of FIG. 44.

Optimized Cash Flow Distribution 1 represents a combined optimized TALP output allocation (cash flow allotment) generated via the identification and merging of multiple TALP output discrete data packets (cash flow payments) with the following common attribute set:
Source: Asset 1
Amount: Constant [$100]
Type: Dividend [DIV]
Recurrence: Regular-Every Time Unit [REG-1]
Rate of Change: None [0]
Distribution 1 additively merges the entireties (Full Combinations) of Realized Output 1 (Payment 1), Realized Output 5 (Payment 5), and Current Output 6 (Payment 6) with two predicted outputs (Expected Payments in Both Time Units 4 and 5). The combined optimized TALP output allocation (cash flow allotment) is transmitted to the Bond Investors (Single Distribution) at the end of the data processing epoch (Epoch 1).

Optimized Cash Flow Distribution 2 represents a combined optimized TALP output allocation (cash flow allotment) generated via the identification and merging of multiple TALP output discrete data packets (cash flow payments) with the following common attribute set:
Source: Asset 2
Amount: Increasing [$500; $525]
Type: Interest [INT]
Recurrence: Regular—Every Third Time Unit [REG-3]
Rate of Change: Positive-Linear [+]
Distribution 2 additively merges the entirety (Full Combination) of Realized Output 2 (Payment 2) with a single predicted output (Expected Payment in Time Unit 4). The combined optimized TALP output allocation (cash flow allotment) is transmitted to the Bond Investors (Single Distribution) immediately upon dataset generation.

Optimized Cash Flow Distribution 3 represents a combined optimized TALP output allocation (cash flow allotment) generated via the identification and merging of multiple TALP output discrete data packets (cash flow payments) with the following common attribute set:
Source: Asset 3
Amount: Variable [$250]
Type: Dividend [DIV]
Recurrence: Irregular [IRR]
Rate of Change: Variable [VAR]
Distribution 3 additively merges the entirety (Full Combination) of Realized Output 3 (Payment 3) with a single potential output (Probable Payment in Either Time Unit 4 or 5) (PROBABLE DIV). Depending on when the potential output is generated, the combined optimized TALP output allocation (cash flow allotment) is transmitted to the Bond Investors (Single Distribution) at the end of the corresponding time unit (Distribute Contingent). If the potential output is not generated, then Realized Output 3 is kept separate (Full Separation) as a single optimized TALP output allocation (cash flow allotment) and is transmitted to the Bond Investors (Single Distribution) at the end of the data processing epoch (Epoch 1).

Optimized Cash Flow Distribution 4 represents a combined optimized TALP output allocation (cash flow allotment) generated via the identification and merging of multiple TALP output discrete data packets (cash flow payments) with the following common attribute set:
Source: Asset 3
Amount: Increasing [$5K; $7.5K; $10K]
Type: Return of Capital [ROC]
Recurrence: Regular-Every Other Time Unit [REG-2]
Rate of Change: Positive-Linear [+]
Distribution 4 additively merges the entirety (Full Combination) of Realized Output 4 (Payment 4) and Current Output 7 (Payment 7) with a single predicted output (Expected Payment in Time Unit 5). The combined optimized TALP output allocation (cash flow allotment) is transmitted to the Bond Investors, the Credit Enhancer, and the GPs (Multiple Distributions) at the end of the data processing epoch (Epoch 1).

Optimized Cash Flow Distribution 5 represents a single optimized TALP output allocation (cash flow allotment) generated via the identification and separation of a single TALP output discrete data packet (cash flow payment) with the following unique attribute set:
Source: Asset 2
Amount: One-Time [$25K]
Type: Partial Liquidation [PL]
Recurrence: N/A [N/A]
Rate of Change: N/A [N/A]
Distribution 5 fully separates (Full Separation) a single predicted output (Expected Payment in Time Unit 5) as a single optimized TALP output allocation (cash flow allotment) which is transmitted to the Bond Investors, the Credit Enhancer, and the GPs (Multiple Distributions) at the end of the data processing epoch (Epoch 1).

Figure 47:
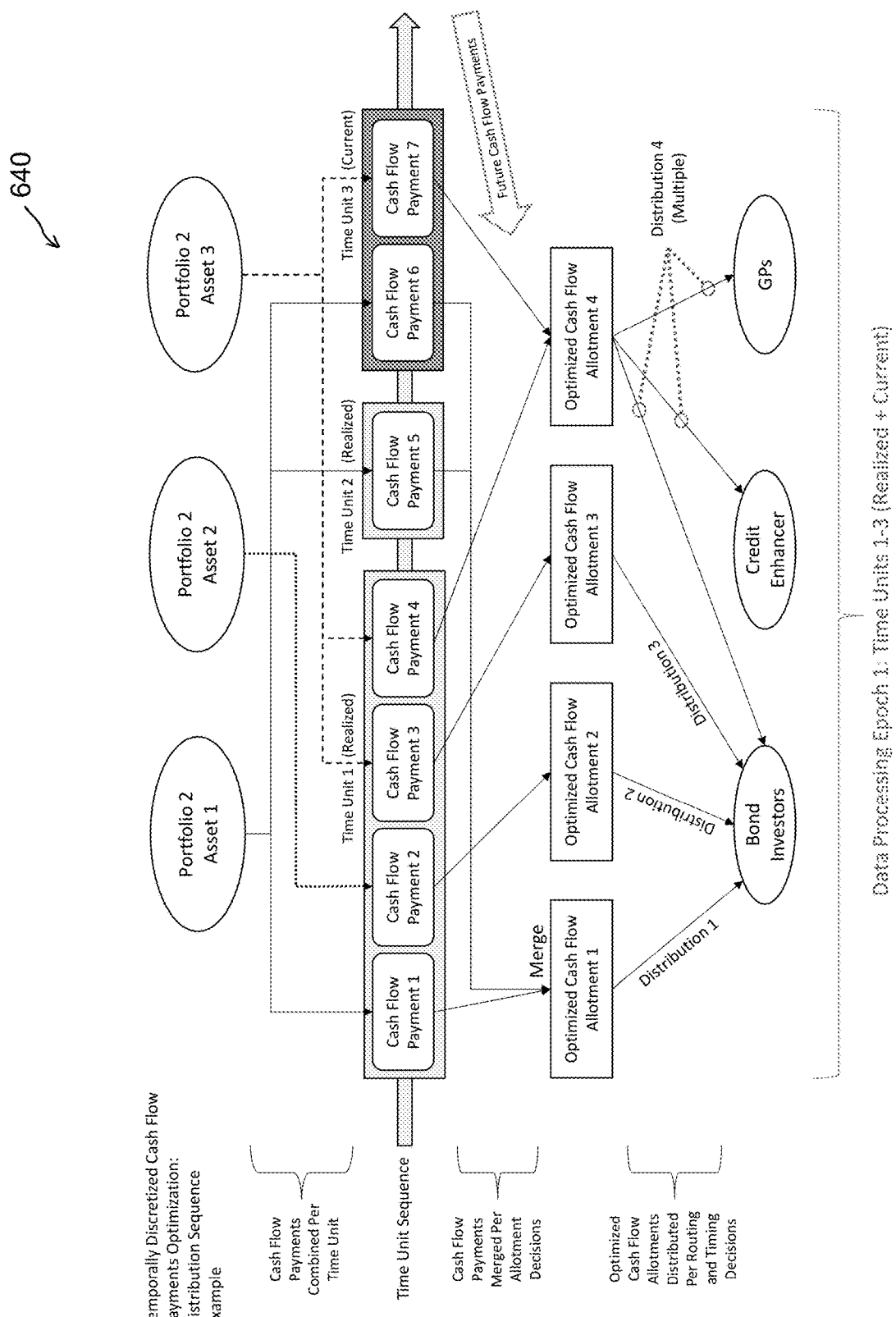
FIG. 47 shows a diagram of an exemplary Distribution Sequence as a combined representation based upon the sequential optimization decision steps (Decision-Making Flow), in accordance with embodiments of the present invention.

The diagram 640 of FIG. 47 illustrates an exemplary Distribution Sequence as a combined representation of FIG. 45 and FIG. 46 based upon the sequential optimization decision steps (Decision-Making Flow) of FIG. 44. FIG. 47 shows the sequence of temporally discretized TALP output discrete data packets (cash flow payments) from FIG. 45 as they are generated from their respective TALPs (Assets) in TALP Family 2 (Portfolio 2) and pooled (combined) per time unit (Cash Flow Payments Combined Per Time Unit) within the Time Unit Sequence.

The pooled (combined) TALP output discrete data packets (cash flow payments) are then merged or separated into their respective optimized TALP output allocations (cash flow allotments) (Cash Flow Payments Merged Per Allotment Decisions) which comprise the first four of the five optimized TALP output transmissions (cash flow distributions) of FIG. 46. The optimized TALP output transmissions (cash flow distributions) are then transmitted (distributed) to their respective user types (recipient types) (Optimized Cash Flow Allotments Distributed Per Routing and Timing Decisions).

The diagram shows only the past time (Realized) and current time (Current) individual TALP output discrete data packets (cash flow payments) from Time Units 1-3 in FIG. 45. Future Cash Flow Payments from Time Units 4 and 5 may also be integrated into the optimized TALP output allocations (cash flow allotments) and subsequent transmissions (distributions).

Figure 48:
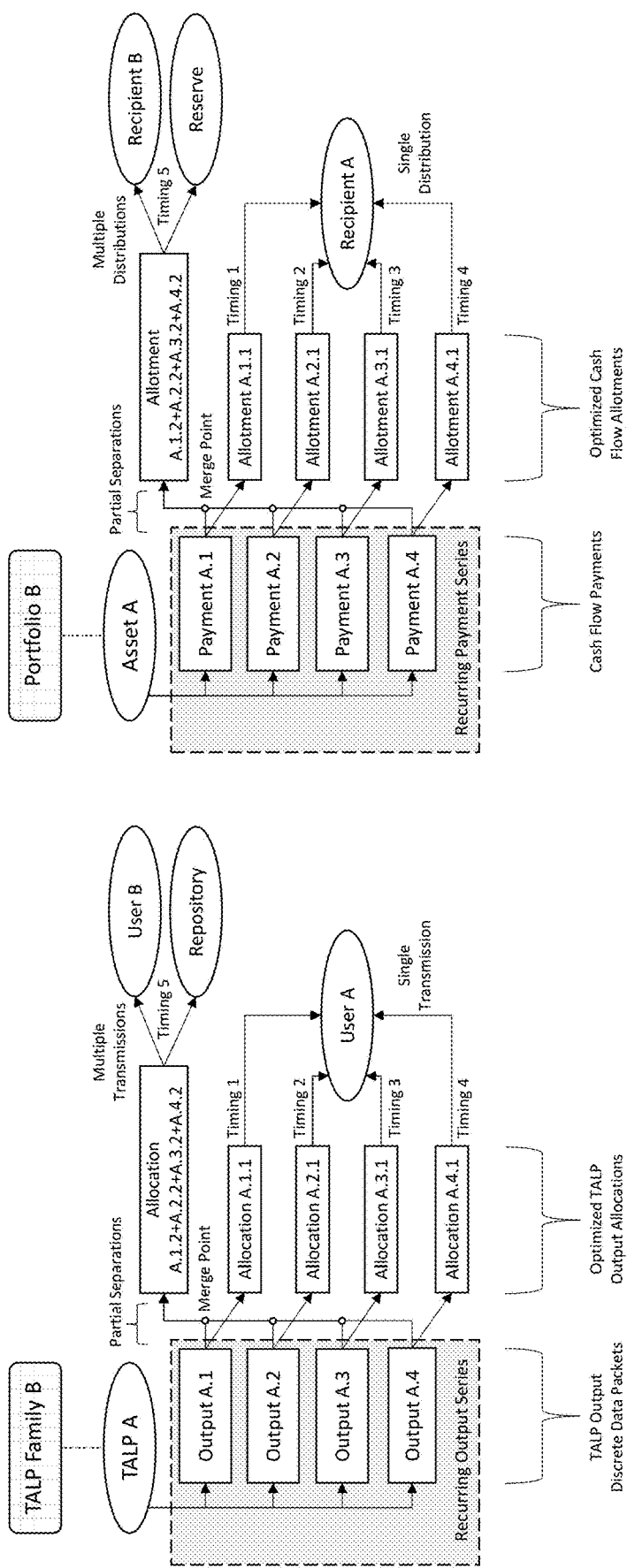
FIG. 48 shows two diagrams: the first depicts an example of the sequential optimization decision steps (Decision-Making Flow) used to process a Recurring Output Series from TALP A in TALP Family B, and the second diagram depicts an example of the sequential optimization decision steps (Decision-Making Flow) used to process a Recurring Payment Series from Asset A in Portfolio B, in accordance with embodiments of the present invention.

FIG. 48 shows two diagrams. The first diagram 650 (on the left side) shows an example of the sequential optimization decision steps (Decision-Making Flow) of FIG. 44 used to process a Recurring Output Series from TALP A in TALP Family B. A recurring output series is comprised of sequential TALP output discrete data packets from a single TALP source.

In this example, four sequential TALP output discrete data packets (Outputs A.1, A.2, A.3, and A.4) are each partially separated (Partial Separations) with their respective first portions kept separate as single optimized TALP output allocations (Allocations A.1.1, A.2.1, A.3.1, and A.4.1). Their respective second portions are additively merged (Merge Points) into a combined optimized TALP output allocation (Allocation A.1.2+A.2.2+A.3.2+A.4.2).

Each single optimized TALP output allocation (Allocations A.1.1, A.2.1, A.3.1, and A.4.1) is transmitted as a single transmission to User A at the first four timing points (Timings 1-4) within a sequential timing pattern. The combined optimized TALP output allocation (Allocation A.1.2+A.2.2+A.3.2+A.4.2) is next transmitted as multiple transmissions to User B and Repository at the fifth timing point (Timing 5) within the sequential timing pattern.

The second diagram 660 (on the right side) shows an example of the sequential optimization decision steps (Decision-Making Flow) of FIG. 44 used to process a Recurring Payment Series from Asset A in Portfolio B. A recurring payment series is comprised of sequential cash flow payments from a single Asset source.

In this example, four sequential cash flow payments (Payments A.1, A.2, A.3, and A.4) are each partially separated (Partial Separations) with their respective first portions kept separate as single optimized cash flow allotments (Allotments A.1.1, A.2.1, A.3.1, and A.4.1). Their respective second portions are additively merged (Merge Points) into a combined optimized cash flow allotment (Allotment A.1.2+A.2.2+A.3.2+A.4.2).

Each single optimized cash flow allotments (Allotments A.1.1, A.2.1, A.3.1, and A.4.1) is distributed as a single distribution to Recipient A at the first four timing points (Timings 1-4) within a sequential timing pattern. The combined optimized cash flow allotment (Allotment A.1.2+A.2.2+A.3.2+A.4.2) is next distributed as multiple distributions to Recipient B and Reserve at the fifth timing point (Timing 5) within the sequential timing pattern. Any giving timing point within such a sequential timing pattern may be linked to any of the timing decision outcomes in FIG. 44.

Figure 49:
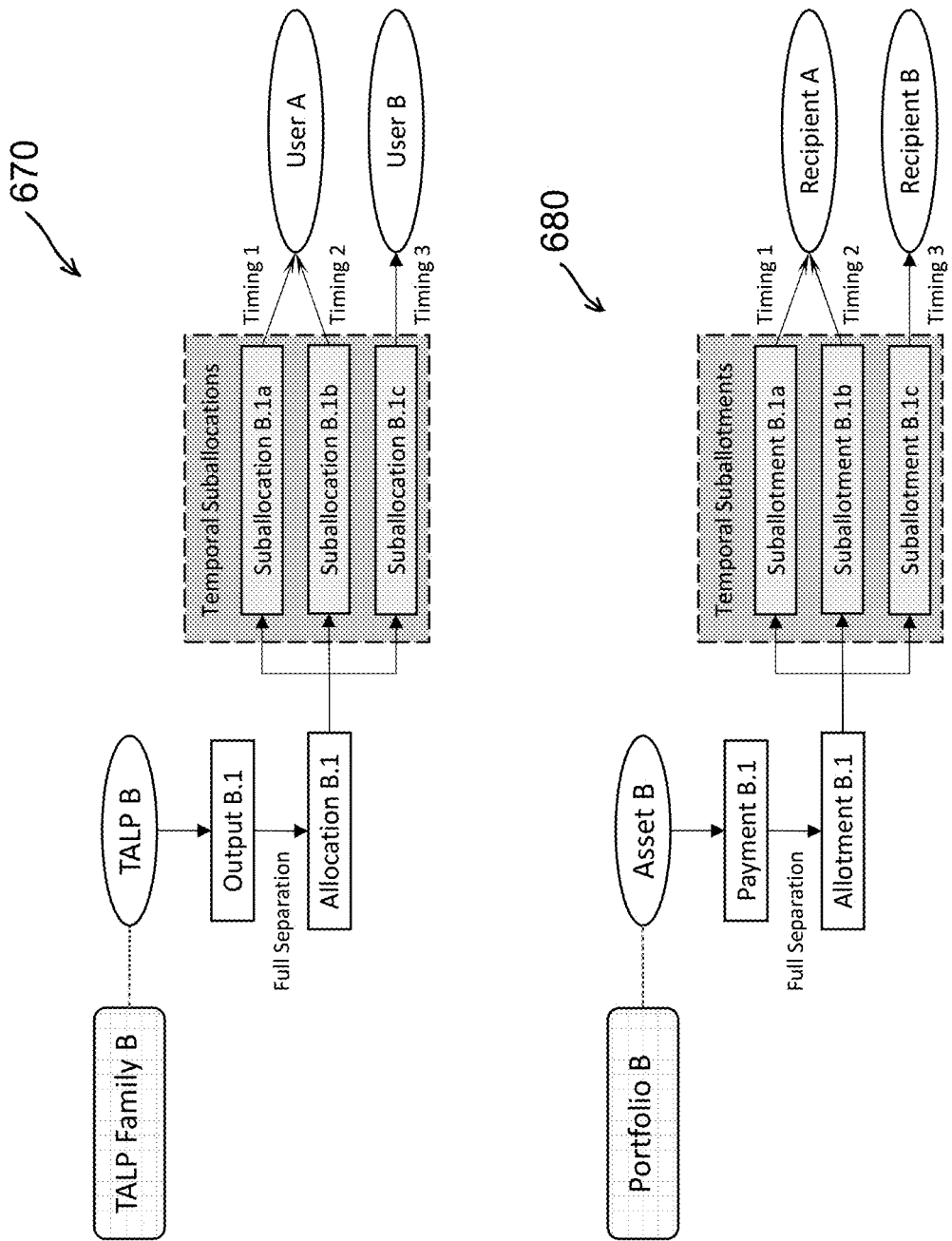
FIG. 49 shows two diagrams: the first depicts an example of the sequential optimization decision steps (Decision-Making Flow) used to generate Temporal Suballocations from a single optimized TALP output allocation from TALP B in TALP Family B, and the second diagram depicts an example of the sequential optimization decision steps (Decision-Making Flow) used to generate Temporal Suballotments from a single optimized cash flow allotment from Asset B in Portfolio B, in accordance with embodiments of the present invention.

FIG. 49 shows two diagrams. The first diagram 670 (on the top) shows an example of the sequential optimization decision steps (Decision-Making Flow) of FIG. 44 used to generate Temporal Suballocations from a single optimized TALP output allocation from TALP B in TALP Family B. Temporal suballocations are comprised of temporally discretized portions of an optimized TALP output allocation which are sequentially transmitted.

In this example, a TALP output discrete data packet (Output B.1) is kept separate (Full Separation) as a single optimized TALP output allocation (Allocation B.1) which is then temporally discretized into three temporal suballocations (Suballocation B.1a, B.1b, B.1c). Each temporal suballocation is then transmitted as a single transmission to User A and User B in a sequential timing pattern (Timings 1-3).

The second diagram 680 (on the bottom) shows an example of the sequential optimization decision steps (Decision-Making Flow) of FIG. 44 used to generate Temporal Suballotments from a single optimized cash flow allotment from Asset B in Portfolio B. Temporal suballotments are comprised of temporally discretized portions of an optimized cash flow allotment which are sequentially transmitted.

In this example, a cash flow payment (Payment B.1) is kept separate (Full Separation) as a single optimized cash flow allotment (Allotment B.1) which is then temporally discretized into three temporal suballotments (Suballotment B.1a, B.1b, B.1c). Each temporal suballotment is then distributed as a single distribution to Recipient A and Recipient B in a sequential timing pattern (Timings 1-3).

Figure 50:
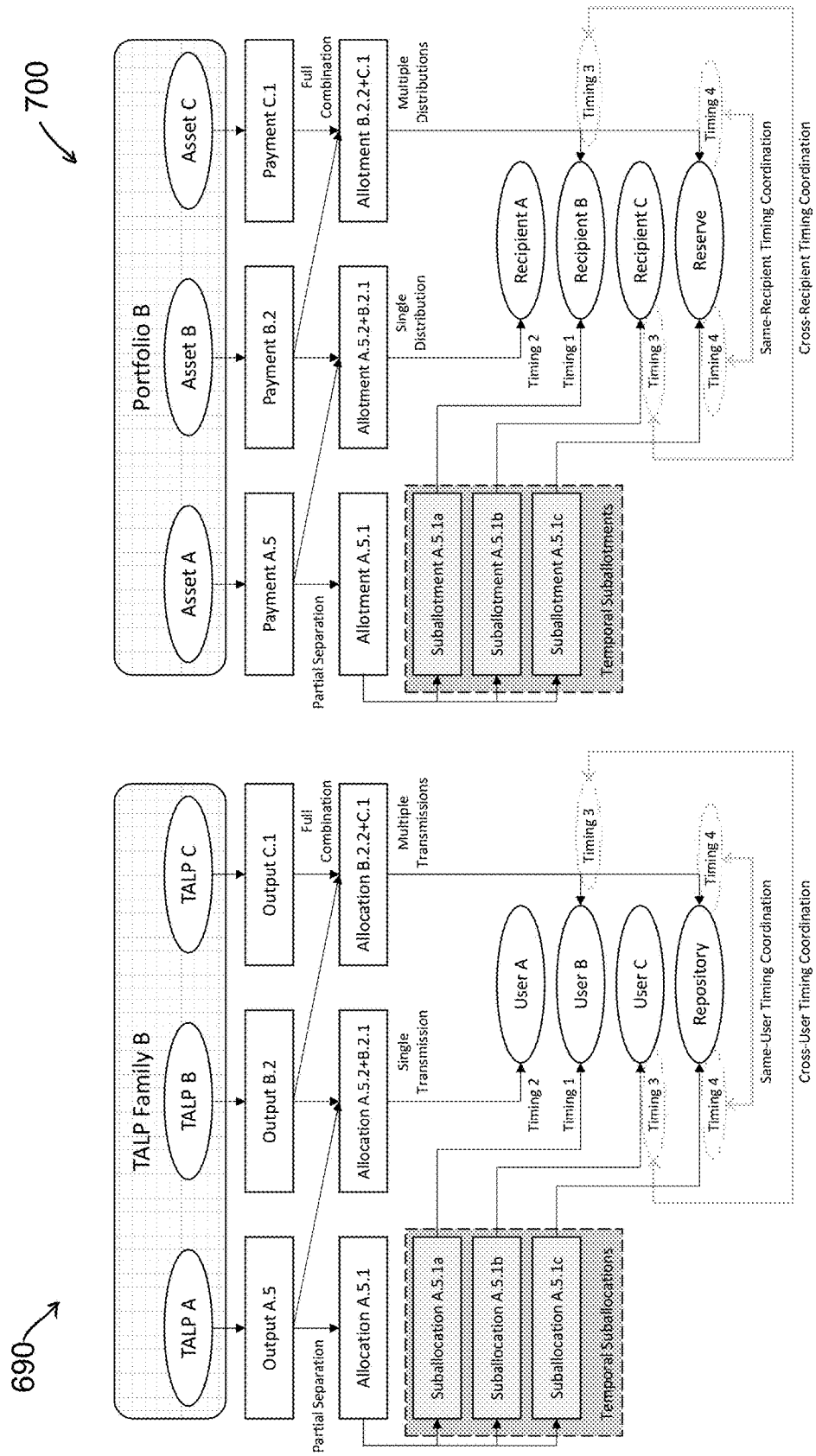
FIG. 50 shows two diagrams: the first depicts an example of the sequential optimization decision steps (Decision-Making Flow) used to both generate temporal suballocations and to calculate user timing coordination from TALP Family B, and the second diagram depicts an example of the sequential optimization decision steps (Decision-Making Flow) used to both generate temporal suballotments and to calculate recipient timing coordination from Portfolio B, in accordance with embodiments of the present invention.

FIG. 50 shows two diagrams. The first diagram 690 (on the left side) shows an example of the sequential optimization decision steps (Decision-Making Flow) of FIG. 44 used to both generate temporal suballocations and to calculate user timing coordination from TALP Family B. User timing coordination synchronizes the timing of multiple optimized TALP output transmissions sent to one or more users to meet certain optimization goals.

In this example, a TALP output discrete data packet (Output A.5) from TALP A is partially separated (Partial Separation) with one portion designated as a single optimized TALP output allocation (Allocation A.5.1) which is then temporally discretized into three temporal suballocations (Suballocation A.5.1a, A.5.1b, A.5.1c). The other portion of partially-separated Output A.5 is additively merged with one portion of a TALP output discrete data packet (Output B.2) from TALP B into a combined optimized TALP output allocation (Allocation A.5.2+B.2.1). The other portion of partially-separated Output B.2 is additively merged with the entirety (Full Combination) of a TALP output discrete data packet (Output C.1) from TALP C into a combined optimized TALP output allocation (Allocation B.2.2+C.1).

In this scenario, the optimized TALP output transmissions are executed in a sequential timing pattern:
- The first timing point (Timing 1): Suballocation A.5.1a is transmitted as a single transmission to User B;
- The second timing point (Timing 2): Allocation A.5.2+B.2.1 is transmitted as a single transmission to User A;
- The third timing point (Timing 3): Suballocation A.5.1b is transmitted as a single transmission to User C in synchronization with one portion of Allocation B.2.2+C.1 which is transmitted to User B (Cross-User Timing Coordination); and The fourth timing point (Timing 4): The other portion of Allocation B.2.2+C.1 is transmitted to Repository in synchronization with Suballocation A.5.1c which is also transmitted to Repository (Same-User Timing Coordination).

The second diagram 700 (on the right side) shows an example of the sequential optimization decision steps (Decision-Making Flow) of FIG. 44 used to both generate temporal suballotments and to calculate recipient timing coordination from Portfolio B. Recipient timing coordination synchronizes the timing of multiple optimized cash flow distributions sent to one or more recipients to meet certain optimization goals.

In this example, a cash flow payment (Payment A.5) from Asset A is partially separated (Partial Separation) with one portion designated as a single optimized cash flow allotment (Allotment A.5.1) which is then temporally discretized into three temporal suballotments (Suballotment A.5.1a, A.5.1b, A.5.1c). The other portion of partially-separated Payment A.5 is additively merged with one portion of a cash flow payment (Payment B.2) from Asset B into a combined optimized cash flow allotment (Allotment A.5.2+B.2.1). The other portion of partially-separated Payment B.2 is additively merged with the entirety (Full Combination) of a cash flow payment (Payment C.1) from Asset C into a combined optimized cash flow allotment (Allotment B.2.2+C.1).

In this scenario, the optimized cash flow distributions are made in a sequential timing pattern:

The first timing point (Timing 1): Suballotment A.5.1a is distributed as a single distribution to Recipient B;

The second timing point (Timing 2): Allotment A.5.2+B.2.1 is distributed as a single distribution to Recipient A;

The third timing point (Timing 3): Suballotment A.5.1b is distributed as a single distribution to Recipient C in synchronization with one portion of Allotment B.2.2+C.1 which is distributed to Recipient B (Cross-Recipient Timing Coordination); and The fourth timing point (Timing 4): The other portion of Allotment B.2.2+C.1 is distributed to Reserve in synchronization with Suballotment A.5.1c which is also distributed to Reserve (Same-Recipient Timing Coordination).

Figure 51:
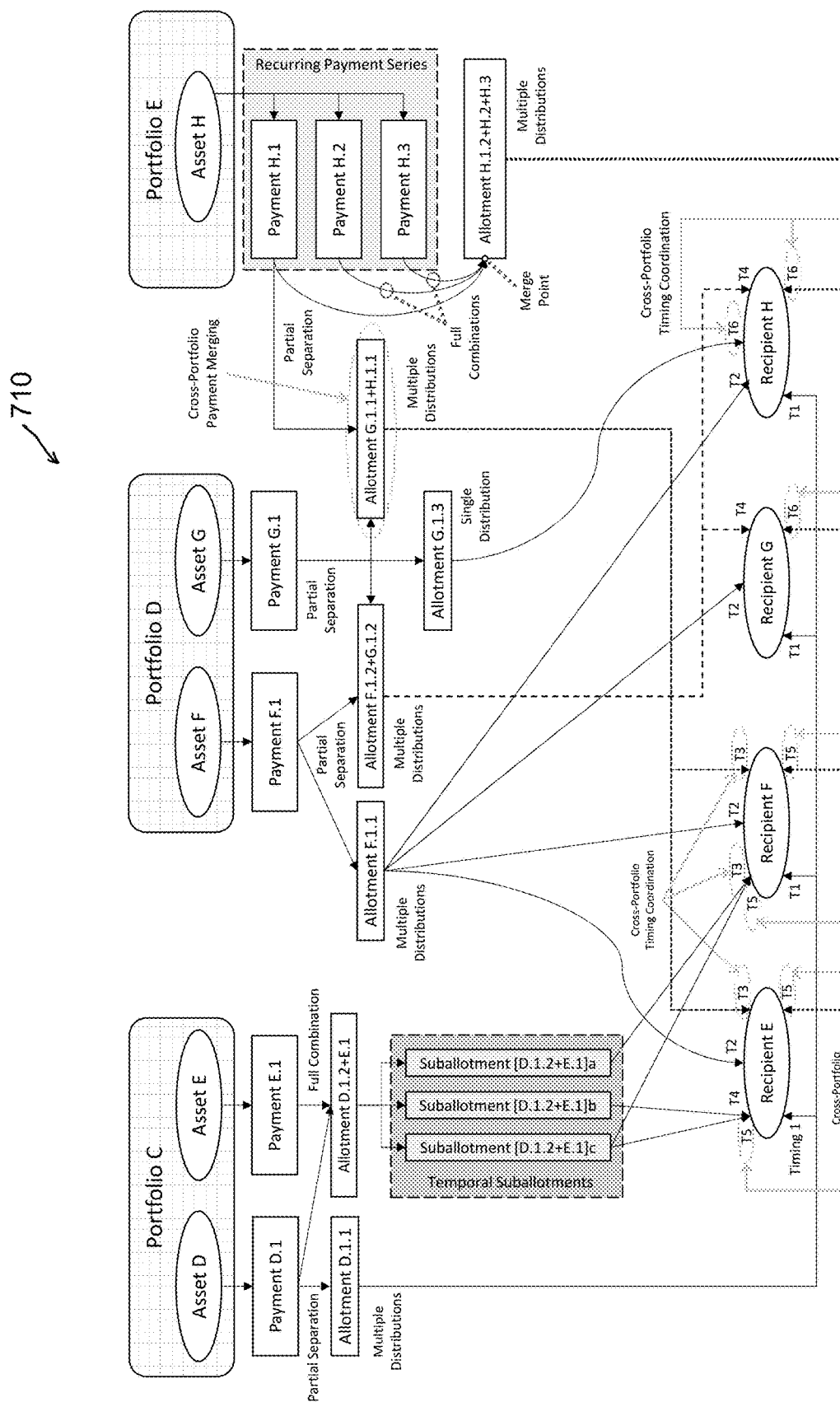
FIG. 51 shows a diagram of a scenario with multiple portfolios in which the sequential optimization decision steps (Decision-Making Flow) are used, in accordance with embodiments of the present invention.

FIG. 51 shows a diagram 710 of a scenario with multiple portfolios in which the sequential optimization decision steps (Decision-Making Flow) of FIG. 44 are used to:

Process a recurring payment series;

Generate multiple optimized cash flow allotments, including an allotment comprised of payments merged from two portfolios (Cross-Portfolio Payment Merging);

Generate temporal suballotments; and

Calculate recipient timing coordination of distributions from the multiple portfolios (Cross-Portfolio Timing Coordination).

In this example, one portion of a partially-separated (Partial Separation) cash flow payment (Payment G.1) from Asset G in Portfolio D is additively merged with one portion of a partially-separated (Partial Separation) cash flow payment (Payment H.1) from Asset H in Portfolio E into a combined optimized cash flow allotment (Allotment G.1.1+H.1.1) (Cross-Portfolio Payment Merging).

In this scenario, there are three instances of recipient timing coordination of distributions from the multiple portfolios (Cross-Portfolio Timing Coordination):

Suballotment [D.1.2+E.1] a (generated from Portfolio C) is distributed as a single distribution to Recipient F in synchronization with Allotment G.1.1+H.1.1 (generated from Portfolio D and Portfolio E) which is distributed as multiple distributions to Recipient E and Recipient F at the third timing point (Timing 3);

Suballotment [D.1.2+E.1] c (generated from Portfolio C) is distributed as multiple distributions to Recipient E and Recipient F in synchronization with two portions of Allotment H.1.2+H.2+H.3 (generated from Portfolio E) which are also distributed as multiple distributions to Recipient E and Recipient F at the fifth timing point (Timing 5); and Allotment G.1.3 (generated from Portfolio D) is distributed as a single distribution to Recipient H in synchronization with the remaining two portions of Allotment H.1.2+H.2+H.3 (generated from Portfolio E) which are distributed as multiple distributions to Recipient G and Recipient H at the sixth timing point (Timing 6).

Figure 52:
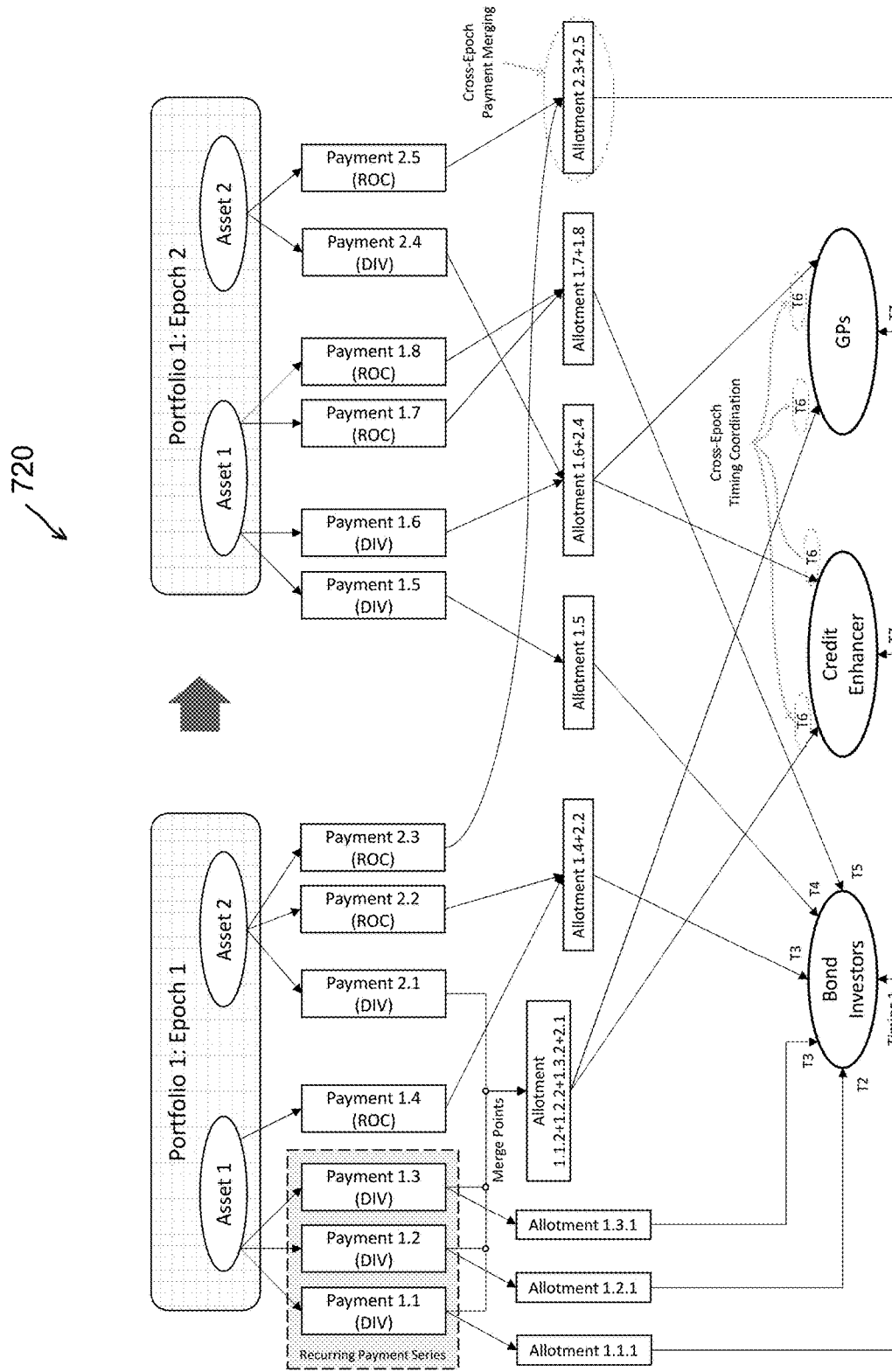
FIG. 52 shows a diagram of the temporal sequencing model in which the sequential optimization decision steps (Decision-Making Flow) are used to both generate multiple optimized cash flow allotments and calculate recipient timing coordination during and between Epoch 1 and Epoch 2, in accordance with embodiments of the present invention.

FIG. 52 shows a diagram 720 of the temporal sequencing model of FIG. 37 in which the sequential optimization decision steps (Decision-Making Flow) of FIG. 44 are used to both generate multiple optimized cash flow allotments and calculate recipient timing coordination during and between Epoch 1 and Epoch 2.

In this example, a fully-combined return-of-capital (ROC) cash flow payment (Payment 2.3) from Asset 2 in Portfolio 1 during Epoch 1 is additively merged with a fully-combined return-of-capital (ROC) cash flow payment (Payment 2.5) also from Asset 2 in Portfolio 1 during Epoch 2 into a combined optimized cash flow allotment (Allotment 2.3+2.5) (Cross-Epoch Payment Merging).

In this scenario, there is one instance of recipient timing coordination of distributions between Epoch 1 and Epoch 2 (Cross-Epoch Timing Coordination): Allotment 1.1.2+1.2.2+1.3.2+2.1 is distributed as multiple distributions to Credit Enhancer and GPs in synchronization with Allotment 1.6+2.4 which is also distributed as multiple distributions to Credit Enhancer and GPs at the sixth timing point (T6).

Figure 53A:
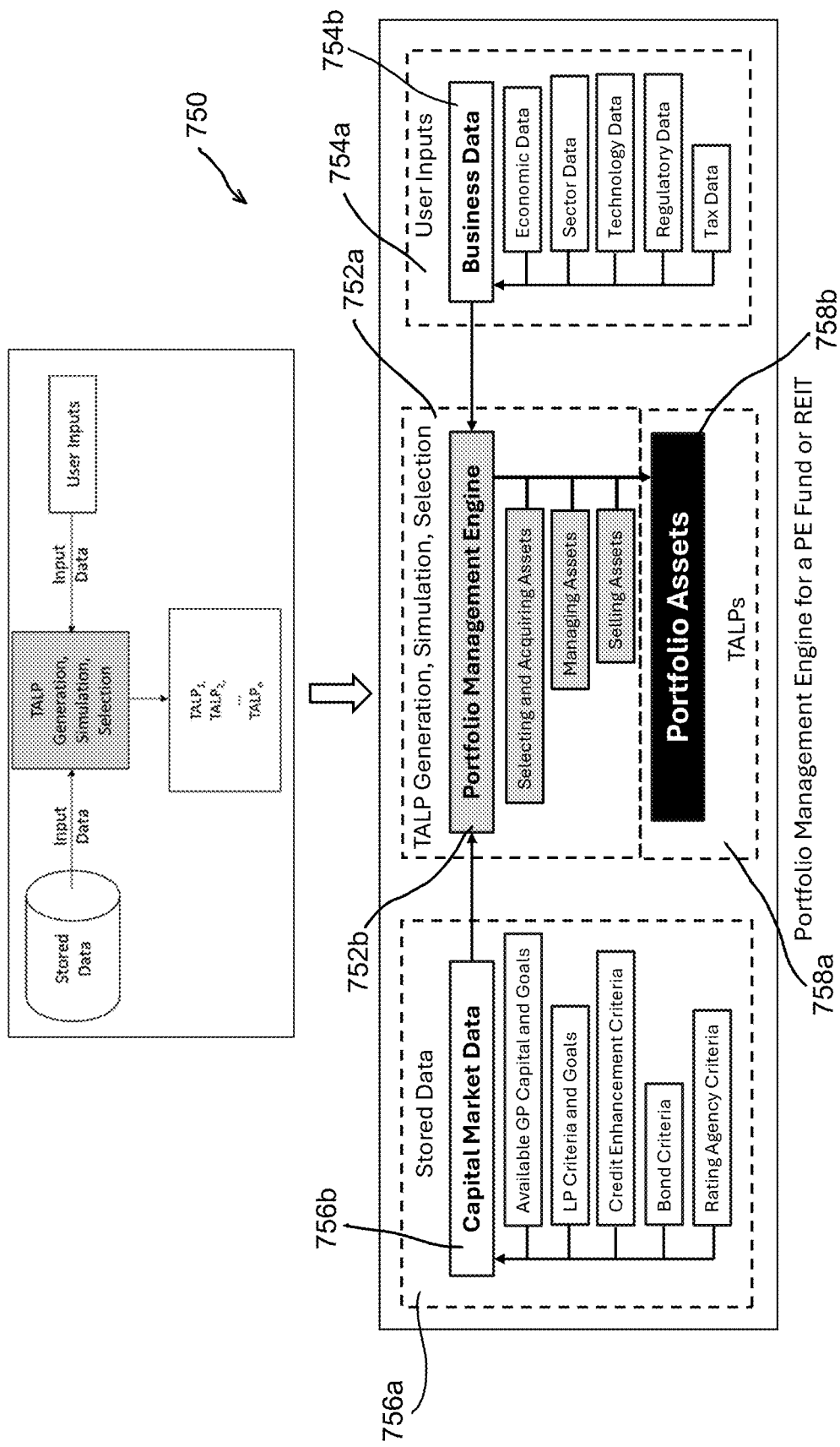
FIG. 53A is a diagram showing how a TALP Generation, Simulation, Selection Engine of an MTF E&M system uses both large-scale user inputs (as Business Data) and stored data (as Capital Market Data) to generate one or more TALPs (depicted as Portfolio Assets) and their inherent predictive analytics, in accordance with embodiments of the present invention.
Figure 53B:
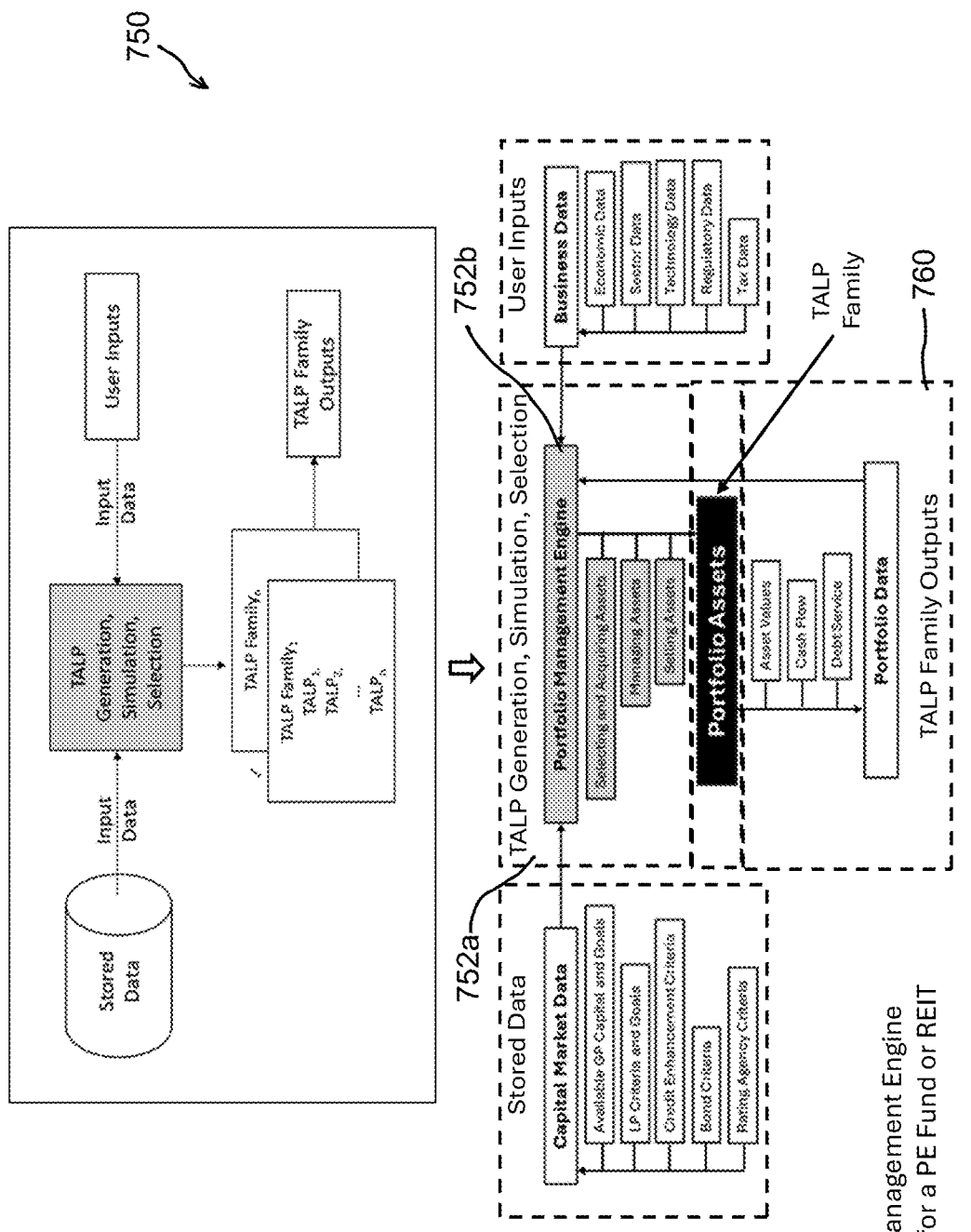
FIG. 53B shows a diagram expanding on the TALP Generation Simulation Selection portion or Engine of the system (the real-time Portfolio Management Engine) shown in FIG. 53A to illustrate that the generation of TALP Family Outputs from merging TALP-generated data (unoptimized real-time data from the Portfolio Assets (Asset Values, Cash Flow, and Debt Service)) with user inputs and stored data (unoptimized real-time Business data and Capital Markets data) and generating new TALPs and TALP Families used to transform new data into inherent predictive analytics to generate optimized TALP Family Output Data, in accordance with embodiments of the present invention.
Figure 53C:
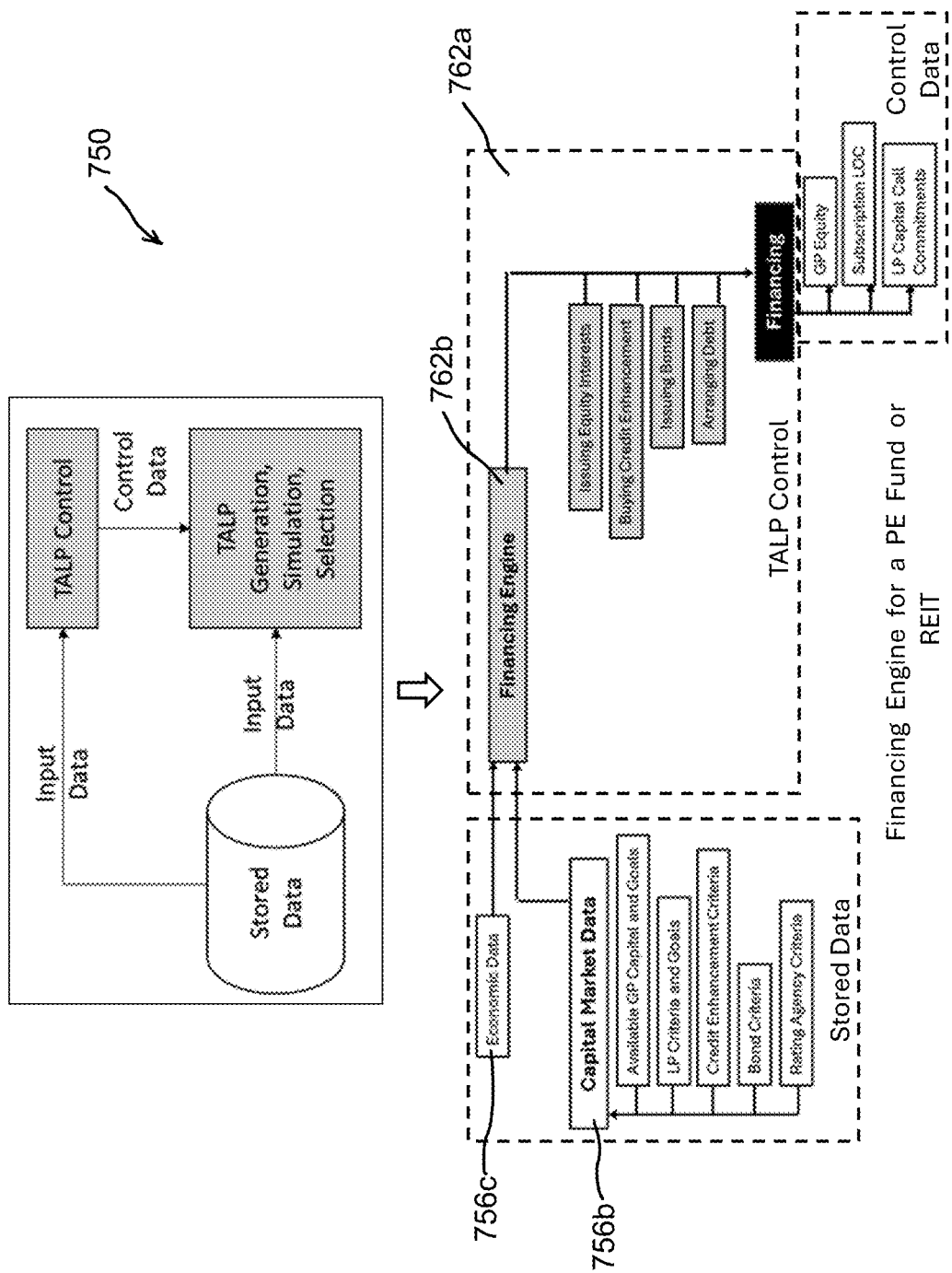
FIG. 53C shows a diagram illustrating the generation and selection of TALPs using various input and control data, in accordance with embodiments of the present invention.
Figure 53D:
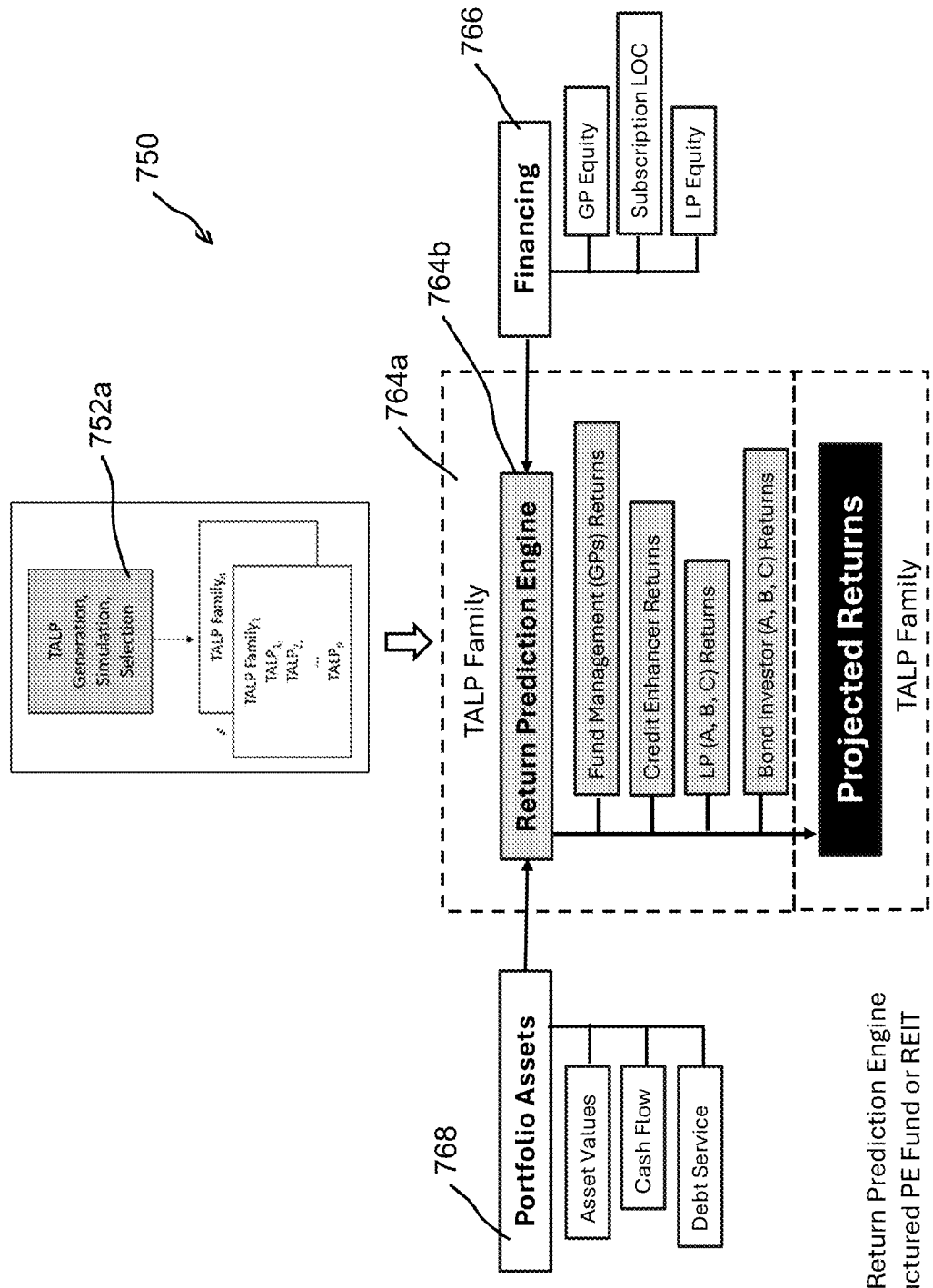
FIG. 53D shows a diagram illustrating the creation of TALP Families by illustrating how a Return Prediction Engine for a PE Fund or REIT merges and uses data transformation algorithms to convert the inherent predictive analytics in unoptimized Financing Data and Portfolio Data into projected returns for various classes of investors, in accordance with embodiments of the present invention.
Figure 53E:
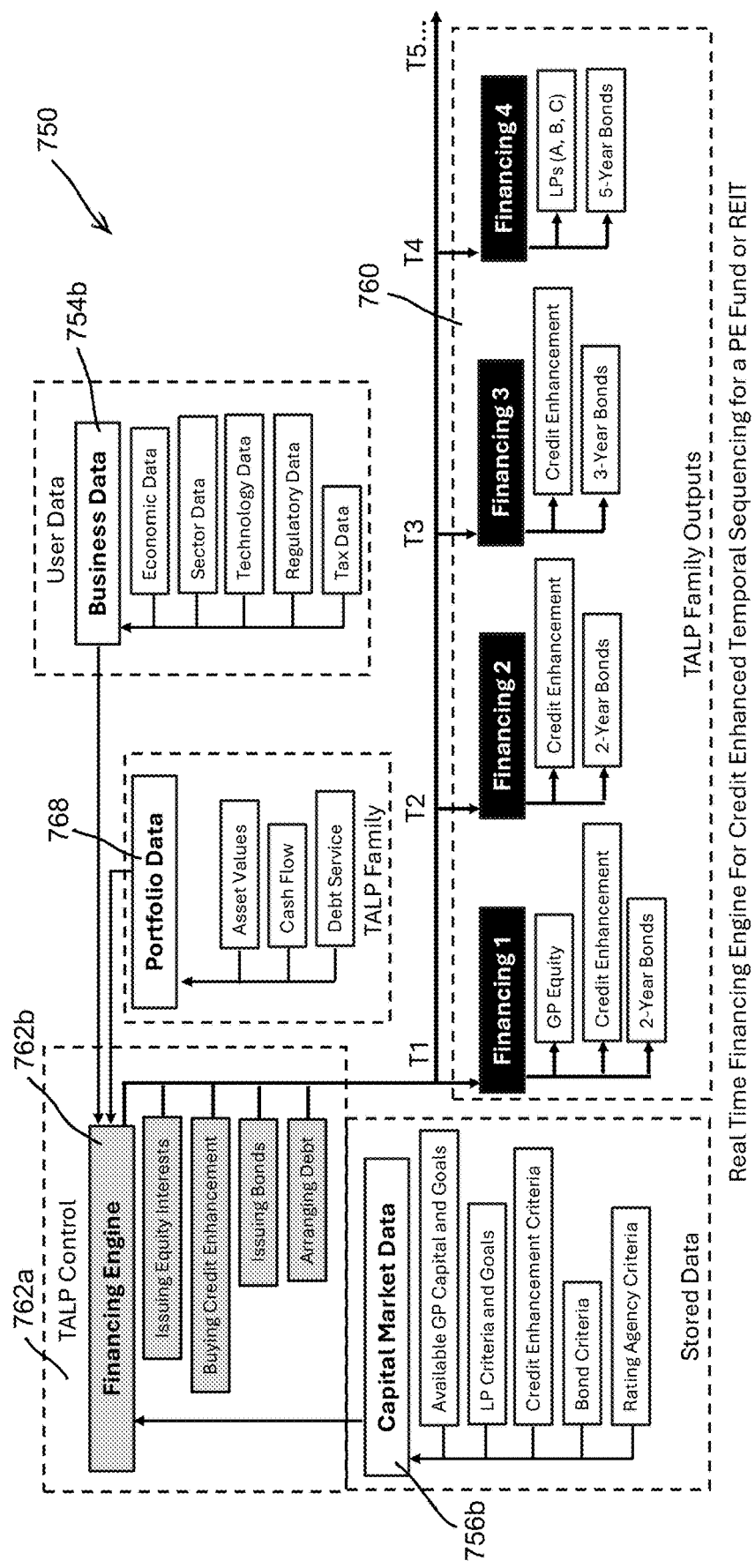
FIG. 53E shows a diagram transforming the Financing Engine of FIG. 53C into a real-time Financing Engine that merges unoptimized Portfolio Data, Business Data, and Capital Markets Data and uses data transformation algorithms to automatically convert the inherent predictive analytics in the data into time-sequenced TALP Family Output Data, in accordance with embodiments of the present invention.
Figure 53F:
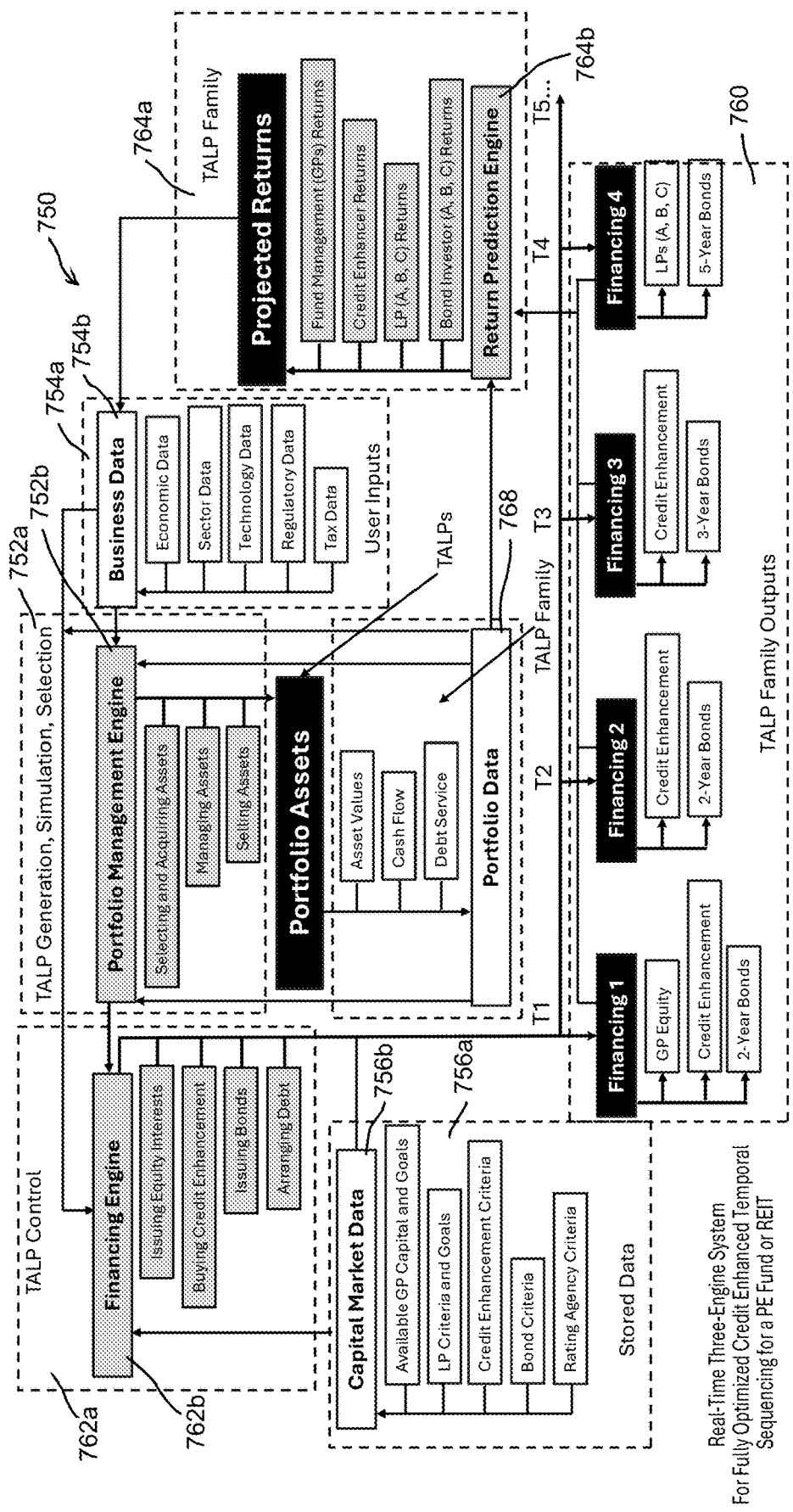
FIG. 53F shows a diagram illustrating that it is possible for multiple types of TALP Families to be simultaneously generated by combining various TALP generation methods using a TALP Control Engine, in accordance with embodiments of the present invention.

Referring generally to FIGS. 53A-53F, these figures highlight the use of an MTF E&M system 750 interacting with both users and stored data to automatically produce TALPs. An exemplary use case shows how the MTF E&M system 750 can be used in advanced portfolio management. The use of TALPs here is justified as there are both continuously changing run-time-associated user inputs (in this example, real-time economic, sector, technology, regulatory and tax data, etc.) and stored data (capital availability, detailed use criteria and goals, etc.). No set of humans could generate executable TALPs (in this example, assets) from this user and stored data and meet the real-time requirements needed to manage those assets and groups of assets (TALPs and TALP Families). Various data is merged to produce the predictive analytics, including the analytic that predicts the non-spatial, non-temporal outputs, which is a TALP, and the analytics that predict various spatial or temporal aspects of the TALP. The MTF E&M system 750 groups TALPs into families shown herein using, in this example, various PE and REIT management engines as TALP control. The non-spatial, non-temporal predictive analytics are used to generate TALP family outputs (in this example, financing) that can be combined and optimized using the spatial and temporal predictive analytics. These figures provide a summary of each of the components needed to build an exemplary, real-time three-engine system for optimizing Credit Enhanced Temporal Sequencing (CETSS) for a PE Fund or REIT. The full three-engine system is illustrated in FIG. 53F. It merges the predictive analytics inherent in a multitude of data types in engines using data transformation algorithms to convert the data into a multitude of types of optimized TALP family outputs. Parallel feedback loops to the engines within the system serve to further improve the system's efficiency. The net effect of the illustrated system is that the manager of a PE Fund or REIT can increase (e.g., double) the return on their assets under management (AUM) while also substantially reducing the time it takes to launch a new fund.

FIG. 53A shows how a TALP Generation, Simulation, Selection Engine 752a (represented by the Portfolio Management Engine 752b) portion of the MTF E&M system 750 uses both large-scale user inputs 754a (as Business Data 754b) and stored data 756a (as Capital Market Data 756b) to generate one or more TALPs 758a (depicted as Portfolio Assets 758b) and their inherent predictive analytics. The Portfolio Management Engine 752b merges the Business Data 754b with Capital Markets Data 756b and uses data transformation algorithms to convert the inherent predictive analytics in the data into optimized TALP family outputs for optimizing the selection and management of assets in a PE Fund or a REIT's Portfolio.

FIG. 53B expands the TALP Generation Simulation Selection portion or Engine 752a of the system (the real-time Portfolio Management Engine 752b) shown in FIG. 53A to illustrate that the generation of TALP Family Outputs 760 from merging TALP-generated data (unoptimized real-time data from the Portfolio Assets (Asset Values, Cash Flow, and Debt Service)) with user inputs and stored data (unoptimized real-time Business data and Capital Markets data) and generating new TALPs and TALP Families used to transform new data into inherent predictive analytics to generate optimized TALP Family Output Data. This optimized TALP Family Output Data is fed back into the Portfolio Management Engine 752b for continuous optimization; thus, the acquisition, management, and sale of assets in a PE Fund or a REIT's Portfolio occurs on a continuous real-time basis over the life of the investment vehicle.

FIG. 53C illustrates the generation and selection of TALPs using various input and control data. As an example of this method, a Financing Engine 762b (the TALP Control component or Engine 762a) for a PE Fund or REIT is shown able to merge and convert the inherent predictive analytics in unoptimized Capital Markets data 756b (which includes the goals of the GPs and LPs) and Economic Data 754b and use data transformation algorithms to automatically generate optimized TALP family Outputs 760, creating an optimized structured financing for multiple classes of investors (each of which is a TALP family) in a PE Fund or an REIT. The exemplary Financing Engine 762b is shown to be equivalent to the TALP Control or TALP Control Engine 762a of an E&M system 750 while the stored data for a TALP is shown as the Capital Market 756b and Economic data 756c.

FIG. 53D highlights the creation of TALP Families by illustrating how a Return Prediction Engine 764b (substituted for the TALP Family (predictive modeling Engine) 764a of the E&M system) for a PE Fund or REIT merges and uses data transformation algorithms to convert the inherent predictive analytics in unoptimized Financing Data 766 and Portfolio Data 768 into projected returns (substituted for optimized TALP Family Output Data) for various classes of investors (which are substituted for the multiple TALP families).

FIG. 53E transforms the Financing Engine 762b of FIG. 53C (TALP Control Engine or component 762a) into a real-time Financing Engine that merges unoptimized Portfolio Data 768, Business Data 754b, and Capital Markets Data 756b and uses data transformation algorithms to automatically convert the inherent predictive analytics in the data into time-sequenced TALP Family Output Data 760, represented here by temporally sequenced financings in real time over the life of a PE Fund or REIT.

FIG. 53F shows that it is possible for multiple types of TALP Families to be simultaneously generated. This is accomplished by combining the various TALP generation methods (here represented by the Financing Engine 762b, Portfolio Management Engine 752b, and Return Prediction Engine 764b) using the TALP Control Engine 762a. This is illustrated in a three-engine system (which substitutes for TALP Control (Engine) 762a, TALP Generation Simulation Selection (simulating and selection Engine) 752a, TALP Family (predictive modeling Engine) 764a, respectively, and TALP Family Outputs 760 portions of the MTF E&M system 750) that draws upon the components in FIGS. 23A-23E to optimize returns on AUM for managers of PE Funds and REITs.

PE Funds and REITs have traditionally been capitalized at their inception using funding from a combination of sources; usually the managers of the investment vehicle (GPs), the equity investors (LPs), and the creditors (subscription lenders and bond investors). A return from the PE fund or REIT is usually realized through the liquidation of its assets upon maturity. Such investments are thus generally illiquid, of long duration, and "blind" at inception. The return that is necessary to attract equity investors in the industry is therefore high, around 14% per year. Returns are net of the GPs' fees, which are typically 2% per year plus a 20% carried interest. The industry has thus developed to be able to generate high gross returns, suggesting there may be other more efficient means of managing and financing investment vehicles than the ones used today.

FIG. 53F illustrates an embodiment or instantiation of the system 750 that optimizes the real-time operation of multiple aspects of operating a PE Fund or REIT. The instantiation shown merges and uses data transformation algorithms to automatically convert the inherent predictive analytics in multiple types of unoptimized data in three optimization engines (Financing Engine 762b substituting for TALP Control (Engine) 762a, Portfolio Management Engine 752b substituting for TALP Generation, Simulation, Selection (Engine) 752a, and Return Prediction Engine 764b substituting for TALP Family (modeling Engine) 764a) running in parallel into optimized TALP Family Output Data 760 in an advanced instantiation of the Type II Chained TALPs of FIG. 23, the rRAV Engine of FIG. 27, and the CETSS of FIGS. 37, 38, 48 and 52.

FIG. 53F depicts the merging of unoptimized Business Data 754b (substituting for user inputs 754a), Capital Markets Data 756b (substituting for stored data 756a and includes the goals of the GPS and LPs), and Portfolio Data 768 (substituting for TALP Family) in a Portfolio Management Engine 752b (substituting for TALP Generation, Simulation, Selection component or Engine 752a) that uses data transformation algorithms to automatically convert the inherent predictive analytics in the merged data into optimized TALP family outputs (Selecting and Acquiring Assets, Managing Assets, and Selling Assets) used to optimize the selection and management of a PE Fund or an REIT's Portfolio. To further optimize the management of the portfolio on a real-time basis, FIG. 53F shows a parallel feedback loop for merging real-time unoptimized Portfolio Data 768 (Asset Values, Cash Flow and Debt Service), Business Data 754b, and Capital Markets Data 756b in the Portfolio Management Engine 752b, which uses data transformation algorithms to automatically convert the inherent predictive analytics in the merged data into optimized TALP family outputs to continuously optimize the Portfolio on a real time basis.

As the Portfolio matures, real time data from the Portfolio enables decision making, not only for the management of the Portfolio, but also for the ongoing financing of the PE Fund or REIT, and for predicting the investors' returns.

Since an investment vehicle's risk/return profile is best determined after its assets have been acquired, there are advantages to refinancing the investment vehicle after its portfolio has been established. Likewise, there are advantages to refinancing the investment vehicle as its risk/return profile improves over time. FIG. 53F illustrates a mechanism for realizing those advantages by using the predictive analytics inherent in multiple types of data and using data transformation algorithms to automatically convert them into multiple types of optimized TALP family outputs, including tools for managing the Portfolio assets, configuring Temporally Sequenced Financings, and predicting returns for multiple types of investors.

Instead of an investment vehicle manager having to predict the long-term performance of a PE Fund or REIT at its inception, as is currently done, FIG. 53F shows how to use inherent predictive analytics and data transformation algorithms to generate TALP family outputs to optimize a series of financings that reflect the change in risk as an investment vehicle's portfolio is acquired and matures. This strategy simplifies the analysis for prospective investors: they only need to ascertain whether the investment vehicle can service the round of financing at hand and refinance itself when the round matures.

Note that this example strategy shows the optimization potential of TALP Families and, in the exemplary cases, enable shorter term investments that are easier to value, making them more liquid than the long-term investments used in funding PE Funds and REITs presently. Such investments can provide fund managers with a lower cost of capital and correspondingly higher returns on their AUM. This strategy also enables PE Funds and REITs to utilize credit enhancement to reduce an investment vehicle's cost of capital in its earlier stages of growth. The use of inherent predictive analytics, data transformation algorithms, and optimized TALP family outputs as shown in FIG. 53F to optimize a series of Credit Enhanced Temporally Sequenced (CETSS) financings can further improve the returns earned by managers of PE Funds and REITs.

FIG. 53F illustrates a three-engine system that optimizes the management of a PE Fund or a REIT's portfolio (TALP Family Output optimization), the execution of a series of CETSS financings, and the prediction of returns for various categories of investors. As shown in FIG. 53F, inherent predictive analytics are derived from Capital Markets Data 756b (substituted for Stored Data), Portfolio Data 768 (substituted for TALP Generation, Simulation, Selection Engine 752a), and Business Data 754b (substituted for User Inputs) and automatically converted using data transformation algorithms in the Financing Engine 762b (TALP Control 762a) to optimized TALP Family Output Data for Issuing Equity Interests, Buying Credit Enhancement, Issuing Bonds, and Arranging Debt on a real-time basis to optimize a series of Temporally Sequenced Financings 760 (Financing 1, Financing 2, Financing 3, Financing 4 and Financing 5 . . . ) over the life of a PE Fund or REIT. The first three Temporally Sequenced Financings are shown to utilize Credit Enhancement, illustrating how CETSS can enable a PE Fund or a REIT's GPs to earn higher returns by benefiting from the lower rates of short-term bonds versus the higher rates that LPs would have required.

The CETSS embodiment or instantiation of FIG. 53F further shows predictive analytics being derived from unoptimized Financing Data and Portfolio Data and being merged and automatically converted using data transformation algorithms in a Return Prediction Engine (substituted for TALP Family or TALP family modeling Engine) into real-time TALP family outputs that optimize the parallel distributions among various investor groups (GPs, Credit Enhancers, LPs, and Bond Investors substituted for some of the TALP Family Outputs 760). The instantiation illustrates inherent predictive analytics being derived from merged Projected Return Data (substituted for TALP Family) and Business Data (substituted for User Inputs) and automatically converted using data transformation algorithms in both the Portfolio Management and Financing Engines into optimized TALP family outputs for the continuous real time optimization of both the Portfolio and future Financings of a PE Fund, a REIT, and the like.

In the system illustrated in FIG. 53F, the Credit Enhancer (TALP optimization) absorbs much of the risk (a TALP predictive analytic) of the uncertainty in the early stages of a PE Fund or REIT to lower the cost of the debt issued to acquire assets for the portfolio. The risk that the Credit Enhancers absorb, though, is primarily limited to the risk of refinance, not the long-term risk of the performance of the portfolio. This risk can be accurately calculated and managed using the three processing engines shown in FIG. 53F. This CETSS strategy would lower the cost of capital for a PE Fund or REIT and generate higher returns for the investment vehicle's management team. By way of illustration, if a fund is able to generate the industry-standard 14% annualized net return normally paid to its LPs, and credit enhancement is able to bring that cost of capital down to 5% by enabling the issuance of rated bonds. Such a strategy would enable a 9% reduction in the cost of capital which could be shared between the investment vehicle's managers (the GPs) and the Credit Enhancer. If the 9% difference was evenly split between the GPs and the Credit Enhancer, the extra 4.5% earned by the GPs would more than double their annualized return on AUM.

Figure 54:
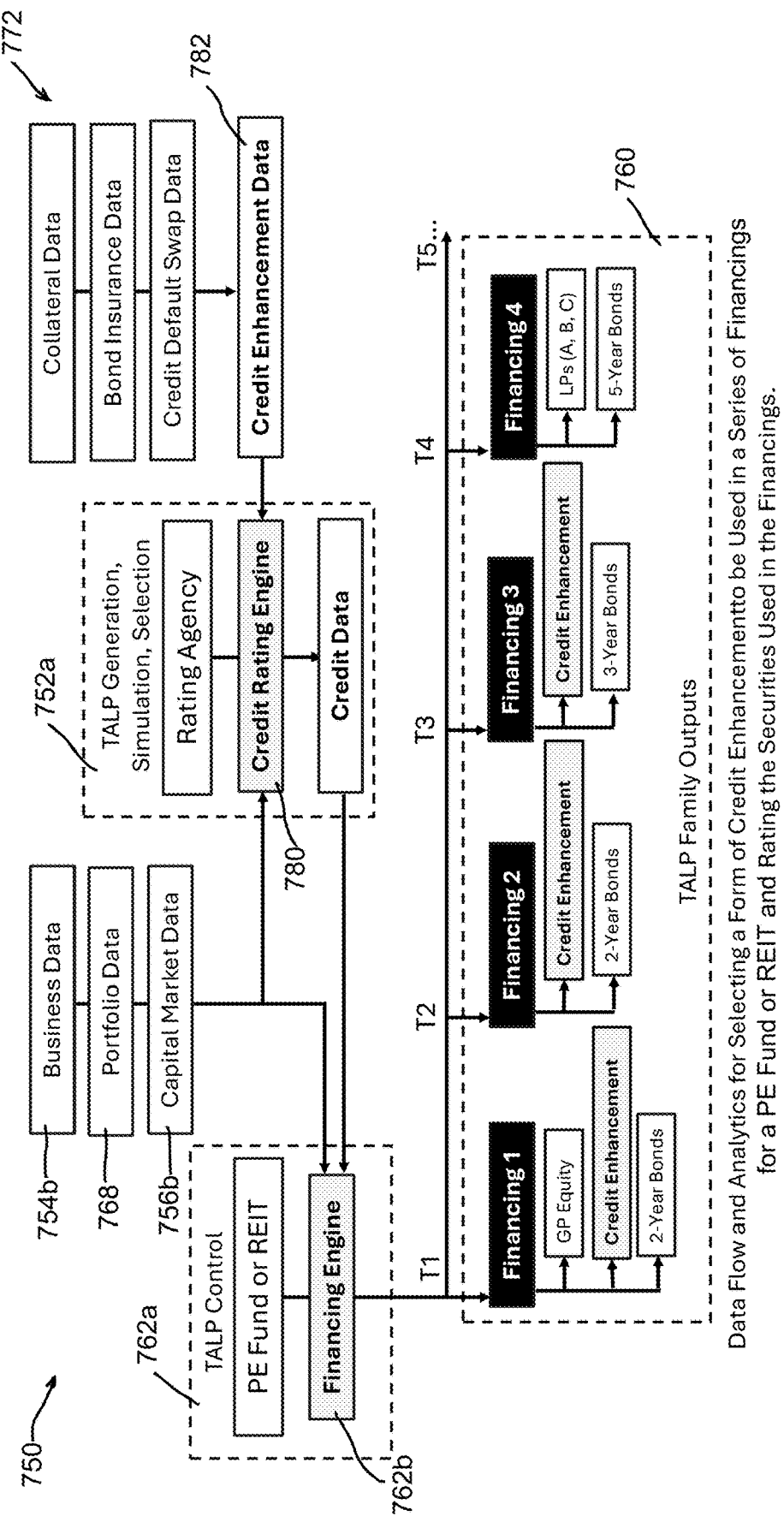
FIG. 54 shows a diagram, expanding on FIG. 53E, illustrating the data flow and analytics necessary to optimize the form of Credit Enhancement used in a series of Financings for a PE Fund or REIT, in accordance with embodiments of the present invention.

FIG. 54 expands on FIG. 53E to show the data flow and analytics necessary to optimize the form of Credit Enhancement (TALP Control Engine 762a, TALP Generation Simulation Selection Engine 752a, and TALP Family Outputs 760) used in a series of Financings for a PE Fund or REIT. The diagram also shows the data flow 772 (Collateral, Bond Insurance, and Credit Default Swap Data substituting for the Stored Data 756a portion of the MTF E&M system) and analytics (from Credit Rating Engine 780 substituting for TALP Generation, Simulation, Selection Engine 752a) necessary to rate some or all the securities used in the Financings (in the Financing Engine 762b substituting for TALP Control Engine 762a portion of the MTF E&M system 750). FIG. 54 shows predictive analytics derived from unoptimized Credit Data being merged with unoptimized Portfolio Data, Business Data, and Capital Markets Data by a Financing Engine using data transformation algorithms to automatically convert the inherent predictive analytics in the data into TALP family output data for optimizing a series of Financings 1-4 over the life of a PE Fund or REIT.

FIG. 54 also shows predictive analytics derived from unoptimized Portfolio Data 768, Business Data 754b, and Capital Markets Data 756b (substituting for the Stored Data 756a portion of the E&M system) being merged with unoptimized Credit Enhancement Data 782 by a Rating Agency's Credit Rating Engine 780 (substituting for TALP Generation, Simulation, Selection Engine 752*a* of the system) using data transformation algorithms (in the Financing Engine 762*b* which substitutes for the TALP Control Engine 762*a* of the MTF E&M system) to automatically convert the inherent predictive analytics in the data into financing data to rate bonds used in a series of credit enhanced Financings 1-3 for a PE Fund or REIT. In this embodiment or instantiation, the Credit Enhancement Data 782 is shown to include, but is not limited to, Bond Insurance Data, Credit Default Swap Data, Collateral Data, and the like. Also in this instantiation, Financing 4 is shown as not requiring credit enhancement to be rated.

Figure 55:
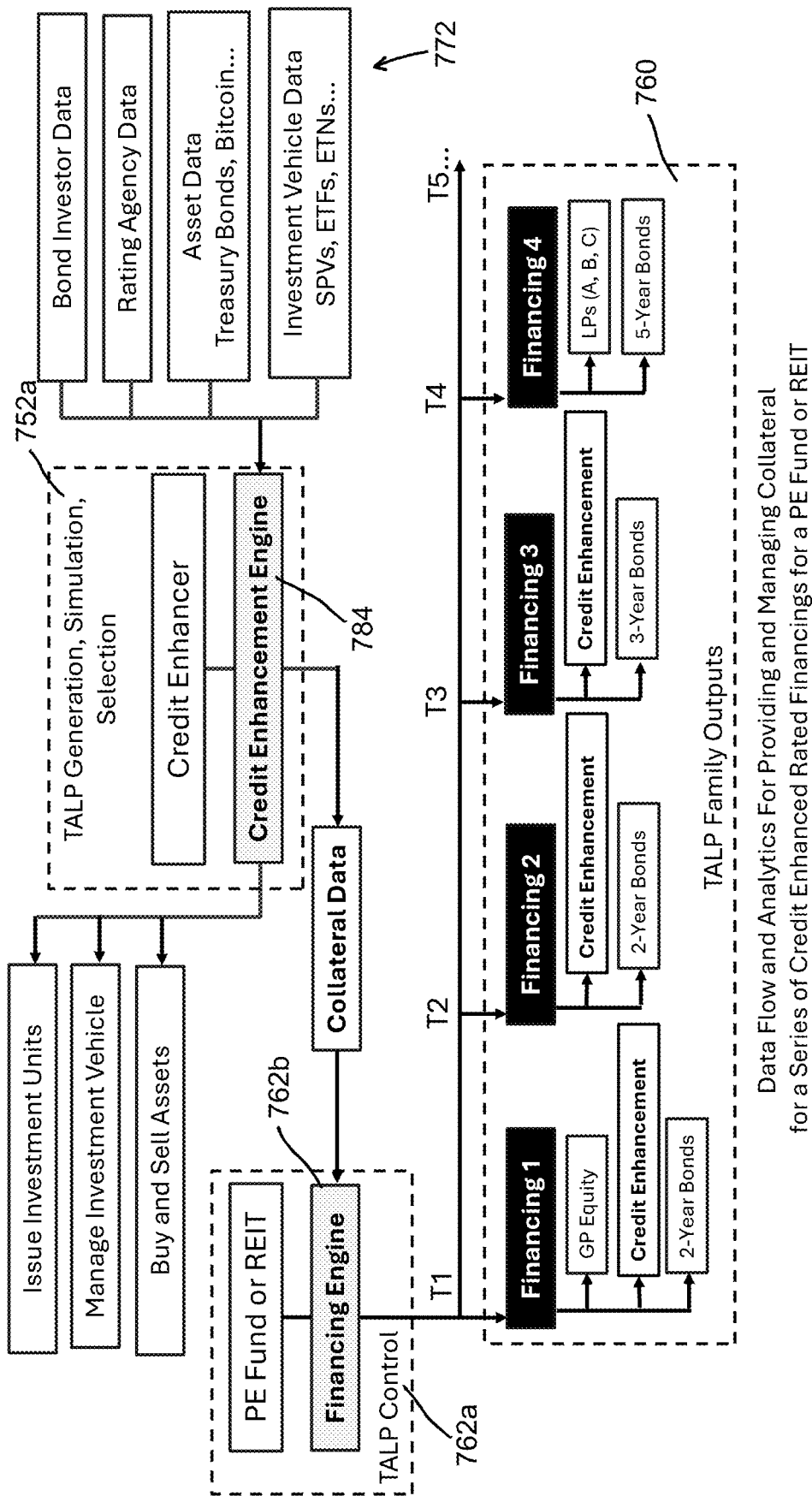
FIG. 55 shows a diagram illustrating that TALP enhancement or optimization can be accomplished using an exemplary Credit Enhancement Engine, in accordance with embodiments of the present invention.

FIG. 55 illustrates that TALP enhancement or optimization can be accomplished using an exemplary Credit Enhancement Engine 784 (substituting for the TALP Generation, Simulation, Selection Engine 752*a*). This is shown as a two-engine system (Financing Engine 762*b* substituting for the TALP Control Engine 762*a* and the Credit Enhancement Engine 784 substituting for the TALP Generation, Simulation, Selection Engine 752*a*) for handling the data flow 772 and analytics necessary for providing and managing the collateral for a series of credit enhanced rated financings for a PE fund or REIT (shown as part of the TALP Control component of the system). FIG. 55 shows predictive analytics derived from unoptimized data from a PE Fund or REIT being merged with unoptimized Collateral Data by a Financing Engine 762*b* using data transformation algorithms to automatically convert the inherent predictive analytics in the data into TALP Family Output Data 760 to provide the collateral necessary in a series of credit enhanced Financings 1-3 for a PE Fund or REIT.

FIG. 55 also shows that the Credit Enhancement Engine 784 (TALP Generation, Simulation, Selection Engine 752*a*) generates predictive analytics derived from unoptimized Bond Investor Data, Rating Agency Data, Asset Data, Investment Vehicle Data, and the like, being merged by the Credit Enhancement Engine using data transformation algorithms to automatically convert the inherent predictive analytics in the data into TALP Family Output Data 760 to manage the collateral used in a series of credit enhanced Financings 1-3 for a PE Fund or REIT. In this embodiment or instantiation, the TALP Family Output Data is used to issue and manage investment units in investment vehicles, which are shown as, for instance, Special Purpose Vehicles (SPVs), Exchange Traded Funds (EFTs), Exchange Traded Notes (EFNs), and the like, and to buy and sell assets, such as Treasury bonds, Bitcoin, other cryptocurrencies, and the like.

Figure 56:
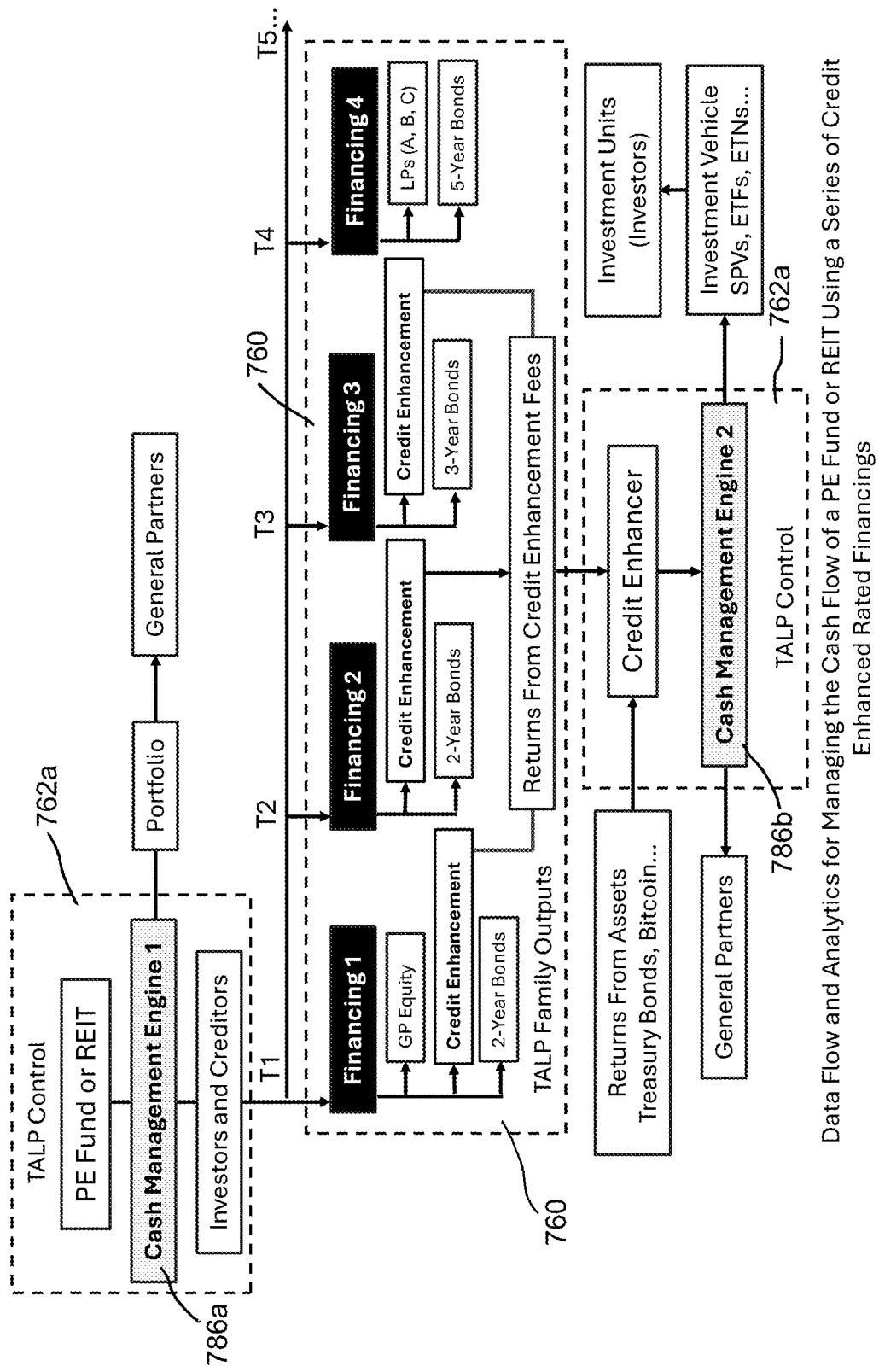
FIG. 56 shows a diagram illustrating that TALP management can be accomplished using an example two-engine system for handling the data flow and analytics for providing and managing collateral for a series of credit enhanced rated financings for a PE Fund or REIT, in accordance with embodiments of the present invention.

FIG. 56 illustrates that TALP management can be accomplished using an example two-engine system (Cash Management Engine 1 786*a* substituted for a first TALP Control 762*a* and Cash Management Engine 2 786*b* substituted for a second TALP Control 762*a*) for handling the data flow and analytics for providing and managing collateral for a series of credit enhanced rated financings for a PE Fund or REIT. In FIG. 56, predictive analytics derived from unoptimized cash flow data from a PE Fund or REIT is merged by Cash Management Engine 1 786*a* using data transformation algorithms to automatically convert the inherent predictive analytics in the data into TALP Family Output Data 760 to optimize the timing and amounts of distributions made to Investors and Creditors in Financings 1-4, as well as to a PE Fund's or REIT's Portfolio and General Partners.

FIG. 56 also shows predictive analytics derived from unoptimized cash flow data coming into a Credit Enhancer 788 (substituted for the second TALP Control 762*a*) from Financings 1-4 (Returns from Credit Enhancement Fees) as well as Returns from Assets being merged by Cash Management Engine 2 786*b* using data transformation algorithms to automatically convert the inherent predictive analytics in the data into TALP Family Output Data 760 to optimize the timing and amounts of distributions made to a PE Fund or REIT's General Partners and Investors. In this embodiment or instantiation, the Investors are shown to receive their returns through Investment Units that they own in Investment Vehicles that include, such as SPVs, ETFs, ETNs, and the like.

Figure 57:
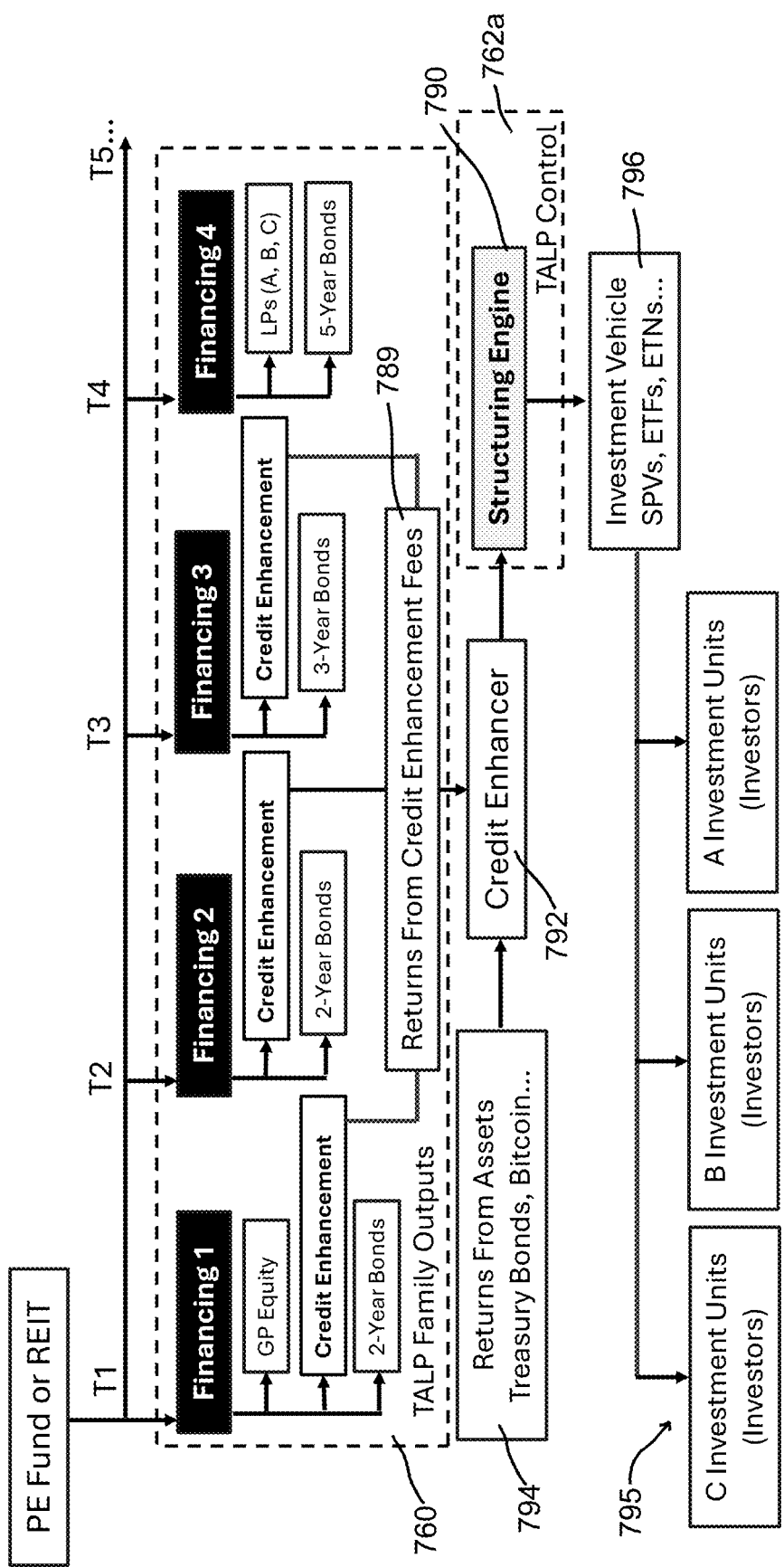
FIG. 57 shows a diagram illustrating TALP management using a Structuring Engine for structuring and managing investment units (TALPs) and investment vehicles (TALP Families) that provide collateral for credit-enhanced PE Funds and REITs (managed TALP Families), in accordance with embodiments of the present invention.

FIG. 57 further illustrates TALP management using a Structuring Engine 790 (substituting for TALP Control Engine 762*a*) for structuring and managing investment units (TALPs) and investment vehicles (TALP Families) that provide collateral for credit-enhanced PE Funds and REITs (managed TALP Families). FIG. 57 shows predictive analytics derived from unoptimized cash flow data coming into a Credit Enhancer 792 from Financings 1-4 (Returns From Credit Enhancement Fees 794) as well as Returns From Assets 794 being merged by the Structuring Engine 790 using data transformation algorithms to automatically convert the inherent predictive analytics in the data into TALP Family Output Data 760 to optimize the structure of Investment Units 795 for an Investment Vehicle 796 that owns Collateral used to credit enhanced bonds issued by a PE Fund or REIT. In this embodiment or instantiation, the Investment Vehicle 796 (TALP Family) has three classes of Investment Units 795 (A, B, and C), that is, three types of TALPs, which may receive cash flow (TALP Family Output Data) in different orders or levels of seniority.

FIGS. 54, 55, 56, and 57 illustrate methodologies to substantially reduce the net cost-of-capital for PE Funds and REITs by using TALP family outputs to optimize the timing, maturities, and creditworthiness of their financings, which would substantially improving the returns that GPs realize. The figures show several instantiations or embodiments of how TALP family outputs can be used to select the optimal form of credit enhancement, as well as the optimal types of investment vehicles and assets to provide the collateral needed for credit enhancement.

The methodologies shown above in the description and figures also benefit investors in PE Funds and REITs. Whereas an investment in a PE Fund or REIT has conventionally been illiquid, requiring investors to lock up their funds for a long period of time (generally 12 years) without knowing in advance the assets that will be purchased for the fund's portfolio, TALP family outputs can be used to provide investments in PE Funds and REITs with investment grade ratings and a high degree of liquidity. This would enable investors to instantly buy and sell their investments to earn short-term returns.

TALP family outputs open the door to more capital to managers of PE Funds and REITs. The amount of money available for liquid, rated investments is much more than is available for long-term, illiquid, and blind investments. TALP family outputs would thus help the industry to grow in size.

The three primary risks in the conventional way of financing private equity—illiquidity, a long lock-up period, and the need for a high IRR over an extended period—can be mitigated by using a Credit Enhancer to insure a series of short-term rated financings. No party is locked into an illiquid long-term investment at a fund's inception with this strategy, and the future of the fund can be managed in stages. In doing so, the cost-of-capital is low, and the Credit Enhancer and GP can share in the upside while minimizing their downside. This approach keeps many options open after each round of financing: the GP and Credit Enhancer can continue with short-term rounds of financing for the duration of the fund, without ever being locked into a termination date; the GP can take out the Credit Enhancer with an equity round of LPs after an initial round or two of financing-thus, the LPs can come into a fund with known assets that are already performing and have a short event horizon, and the Credit Enhancer can even convert some of their fees into a subordinate LP position to gain exposure to the fund's upside and to make it easier to bring LPs, and the Credit Enhancer can also earn a carry; The fund, with a series of short-term financings, can be resized along the way, shedding assets, retaining promising assets, and adding new assets; and a Credit Enhancer can also be used to refinance a conventional 80/20 fund, for example, to give LPs an early exit and to enable the GP to continue to grow their portfolio.

There are multiple ways to provide the credit enhancement detailed above and herein. Conventional bond insurance, credit default swaps with sovereign funds, and collateral pledges from corporate treasuries are all feasible vehicles. It is also possible to create SPVs for providing credit enhancement. SPVs can be financed through the sale of securities to acquire assets to provide the collateral to guarantee the bonds issued by PE funds. The assets could be Treasury bonds, or they could even be free and clear real estate with a line of credit (LOC). The SPV could contract with a master insurer to reinsure a portion of the risk it assumes as a credit enhancer. The owners of the SPV would receive the income from the assets, the fees earned from credit enhancement, and the return from the SPV's carry in the insured PE fund, less any expenses, losses incurred, and management fees.

The interests in the SPV could be traded on an exchange, and ETFs could even be issued on an SPV. The value of the interests over time would depend on the assets owned by the SPV and the terms of the credit enhancement. Interests in SPVs that had a significant carry in the funds whose bonds they enhanced would grow in value over time based upon the perceived value of the carry at the fund's termination. SPVs that earn income from the assets they own, plus predetermined fees for credit enhancement, would trade like mid-term bonds do.

Various features and software methods disclosed above and herein are provided with the embodiments of the present invention.

For instance, a Credit Rating Engine 780 uses TALPs to provide ratings on a series of credit enhanced Financings; a Financing Engine 762b uses TALPs to formulate and optimize a series of Financings; and TALPs are used to select the form of credit enhancement that would optimize returns to the general partners of PE Funds and REITs.

In addition, a Credit Enhancement Engine 784 uses TALPs to issue investment units, manage investment vehicles, and buy and sell assets to provide the collateral necessary to enhance a series of Financings; TALPs are used to optimize the selection, purchase, management, sale, and trading of assets used for collateral; TALPs are used to optimize the selection and management of investment vehicles used to hold the assets used for collateral; TALPs are used to optimize the ratings achieved using collateral for credit enhancement; TALPs are used to pool exchange traded funds and notes to serve as collateral to credit enhance a series of financings for PE Funds and REITs; TALPs are used to pool Treasury bonds to serve as collateral to credit enhance a series of financings for PE Funds and REITs; and/or TALPs are used to pool assets, including but not limited to Treasury bonds, stocks, bonds, real estate, Bitcoin, and other cryptocurrencies, held in a variety of investment vehicles, including but not limited to exchange traded funds and notes and special purpose vehicles to serve as collateral to enhance the credit of a series of financings for PE Funds or REITs.

Further, a Cash Management Engine 786a, 786b is used to optimize the cash flow between investors, creditors, a portfolio, and general partners in a PE Fund or REIT; TALPS are used to optimize the returns to general partners providing credit enhancement to PE Funds and REITs; TALPS are used to minimize the cost of capital to general partners managing PE Funds and REITs using credit enhancement; a Cash Management Engine optimizes the cash flow from multiple sources (for example, assets owned and fees received from providing collateral for credit enhancement) and investment vehicles, investors, and general partners; and/or TALPs are used to maximize returns to investors in the collateral used to provide credit enhancement to PE Funds and REITs.

In various embodiments, TALPS can be created, processed, and used to: structure, optimize, and issue temporally sequenced financings over the life of a PE Fund or REIT; structure, optimize, and issue credit enhanced temporally sequenced financings over the life of a PE Fund or REIT; optimize the refinancing of a PE Fund or REIT as its portfolio's risk/return profile changes over time; optimize the capital structure of a PE Fund or REIT; optimize returns to the managers of PE Funds or REITs; use credit enhancement to optimize a PE Fund or REIT's cost of capital; reduce the maturity of investments in PE Funds and REITs; increase the liquidity of investments in PE Funds and REITs; optimize the cost of capital at the inception of a PE Fund or REIT; optimize the time and cost of launching a PE Fund or REIT; and/or optimize the selection, acquisition, management, and disposition of a PE Fund or REIT's portfolio assets.

In various embodiments, TALPs can be created, processed, and used to: create a Financing Engine that models a series of financings, weighing the use of credit enhancement with bonds against the issuance of LP units and subscription lines (debt collateralized by the capital call commitments of the LPs); create a Financing Engine that calculates returns to the Credit Enhancer that would allow the Credit Enhancer to self-insure-if the fees collected by the Credit Enhancer were sufficient that they could buy the subordinate LP tranches themselves when it came time to refinance the bonds they were insuring, they would minimize their risk, and it would be an attractive exit for them; create a real-time Portfolio Management engine that coordinates the management of the Portfolio with the Finance Engine—e.g., strategically manage the companies in the portfolio to optimize the various rounds of financing coming up; create a real-time Portfolio Management engine that coordinates management of the portfolio with the Return Engine-selling companies, or refinancing companies to facilitate paying off interim bonds with each round of financing; create a real-time Portfolio Management engine that responds to changes in the economy, technology, news, the capital market, etc.; create a real-time Financing Engine that responds to those same factors by rapidly changing different components of the financing structure; create a real-time Financing Engine that facilitates the trade of the securities issued by the fund-giving daily market values for the securities, offering buybacks of the securities, enabling the fund to be its own market maker for the securities; create a real-time Portfolio Manager that enables the fund to participate in a real asset exchange, whereby it could buy and sell virtualized interests in the assets in its portfolio and other funds' portfolios; and/or create optimized feedback loops between the Portfolio Management Engine, the Financing Engine, and the Return Prediction Engine.

With this and other concepts, systems, and methods of the present invention, a method of a software enhancement and management system comprises: inputting one or more data transformation algorithms representing asset data; decomposing the one or more data transformation algorithms into a plurality of TALPs; executing the plurality of TALPs to generate at least one or more value complexity prediction polynomials; simulating one or more investment data units and external stored data to generate a simulated data output based at least on the one or more value complexity prediction polynomials; executing a TALP control engine using predictive analytics and at least the simulated data output to create temporally sequenced TALP output data; pooling the temporally sequenced TALP output data; modeling predictive outcomes based at least on the pooled temporally sequenced TALP output data merged with external unoptimized context data via a feedback loop over time; and outputting optimized and discretized data based on the modeled predictive outcomes.

In various embodiments, simulating the one or more investment data units and external data is performed at TALP simulation and selection engine.

In various embodiments, the TALP simulation and selection engine includes a portfolio management engine.

In various embodiments, the one or more investment data units includes business data, which includes at least one or more of: economic data, sector data, technology data, regulatory data, and tax data.

In various embodiments, the external data includes at least capital market data, which includes at least one or more of: available GP capital or goals data, LP criteria or goals data, credit enhancement criteria data, bond data, and rating agency data.

In various embodiments, the TALP control engine includes a financing engine and the temporally sequenced TALP output data is at least one or more of: GP equity output data, LP output data, credit enhancement output data, and bond year output data.

In various embodiments, modeling predictive outcomes is performed at a TALP family modeling engine.

In various embodiments, the TALP family modeling engine includes a return prediction engine.

In various embodiments, the optimized and discretized data includes projected return data, including at least one or more of: fund management return data, fund management GP returns, credit enhancer return data, LP return data, and bond investor return data.

In various embodiments, pooling temporally sequenced TALP output data includes pooled asset data, including at least one or more of: treasury bond data, stock data, bond data, real estate data, and cryptocurrency data.

In various embodiments, at least one of the treasury bond data, stock data, bond data, real estate data, and cryptocurrency data are provided to serve as collateral data for a PE fund or a REIT.

In one or more embodiments from the perspective of a software enhancement and management system, a program code is stored in memory and the memory is in operative communication with a processor (or CPU or processing element), wherein the processor can execute the program code to: (i) input one or more data transformation algorithms representing asset data; (ii) decompose the one or more data transformation algorithms into a plurality of TALPs; (iii) execute the plurality of TALPs to generate at least one or more value complexity prediction polynomials; (iv) simulate one or more investment data units and external stored data to generate a simulated data output based at least on the one or more value complexity prediction polynomials; (v) execute a TALP control engine using predictive analytics and at least the simulated data output to create temporally sequenced TALP output data; (vi) pool the temporally sequenced TALP output data; (vii) model predictive outcomes based at least on the pooled temporally sequenced TALP output data merged with external unoptimized context data via a feedback loop over time; and (viii) output optimized and discretized data based on the modeled predictive outcomes. Additionally or alternatively, the processor can execute the program code to perform all of the described actions, steps, and methods described above, below, or otherwise herein.

While various embodiments have been described above, it should be understood that they have been presented by way of example only, and not limitation. Thus, the breadth and scope of the present disclosure should not be limited by any on the above-described embodiments or examples. Moreover, any combination of the above-described elements in all possible variations thereof is encompassed by the disclosure unless otherwise indicated herein or otherwise clearly contradicted by context.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

While the present invention has been described in connection with various aspects and examples, it will be understood that the present invention is capable of further modifications. This application is intended to cover any variations, uses or adaptation of the invention following, in general, the principles of the invention, and including such departures from the present disclosure as come within the known and customary practice within the art to which the invention pertains.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

All patents and patent application publications referenced, identified, or listed above are hereby fully incorporated herein by reference.

What is claimed is:

1. A method of software enhancement and management, comprising:
inputting one or more data transformation algorithms representing asset data;
decomposing the one or more data transformation algorithms into a plurality of time-affecting linear pathways (TALPs);

executing the plurality of TALPs to generate at least one or more value complexity prediction polynomials;

simulating one or more investment data units with external criteria data to generate a simulated data output based at least on the one or more value complexity prediction polynomials;

executing a TALP control engine using predictive analytics and at least the simulated data output to create temporally sequenced TALP output data;

pooling the temporally sequenced TALP output data; and modeling predictive outcomes based at least on the pooled temporally sequenced TALP output data merged with external unoptimized context data via a feedback loop over time to output optimized and discretized data as an operative input for the external criteria data for a new simulation to generate a new simulated data output.

2. The method of claim 1, wherein simulating the one or more investment data units and the external criteria data is performed at a TALP simulation and selection engine.

3. The method of claim 2, wherein the TALP simulation and selection engine includes a portfolio management engine.

4. The method of claim 3, wherein the one or more investment data units includes business data, which includes at least one or more of: economic data, sector data, technology data, regulatory data, and tax data.

5. The method of claim 3, wherein the external criteria data includes at least capital market data, which includes at least one or more of: available general partner (GP) capital or goals data, limited partner (LP) criteria or goals data, credit enhancement criteria data, bond data, and rating agency data.

6. The method of claim 1, wherein the TALP control engine includes a financing engine and the temporally sequenced TALP output data is at least one or more of: GP equity output data, LP output data, credit enhancement output data, and bond year output data.

7. The method of claim 1, wherein modeling predictive outcomes is performed at a TALP family modeling engine.

8. The method of claim 7, wherein the TALP family modeling engine includes a return prediction engine.

9. The method of claim 8, wherein the optimized and discretized data includes projected return data, including at least one or more of: fund management return data, fund management GP returns, credit enhancer return data, LP return data, and bond investor return data.

10. The method of claim 1, wherein pooling temporally sequenced TALP output data includes pooled asset data, including at least one or more of: treasury bond data, stock data, bond data, real estate data, and cryptocurrency data.

11. The method of claim 10, wherein at least one of the treasury bond data, stock data, bond data, real estate data, and cryptocurrency data are provided to serve as collateral data for a Private Equity (PE) fund or a Real Estate Investment Trust (REIT).

12. A software enhancement and management system, comprising:

a memory; and a processor operatively coupled with the memory, wherein the processor is configured to execute a program code to:

input one or more data transformation algorithms representing asset data;

decompose the one or more data transformation algorithms into a plurality of time-affecting linear pathways (TALPs);

execute the plurality of TALPs to generate at least one or more value complexity prediction polynomials;

simulate one or more investment data units with external criteria data to generate a simulated data output based at least on the one or more value complexity prediction polynomials;

execute a TALP control engine using predictive analytics and at least the simulated data output to create temporally sequenced TALP output data;

pool the temporally sequenced TALP output data; and model predictive outcomes based at least on the pooled temporally sequenced TALP output data merged with external unoptimized context data via a feedback loop over time to output optimized and discretized data as an operative input for the external criteria data for a new simulation to generate a new simulated data output.

13. The system of claim 12, wherein simulating the one or more investment data units and the external criteria data is performed at a TALP simulation and selection engine.

14. The system of claim 13, wherein the TALP simulation and selection engine includes a portfolio management engine.

15. The system of claim 13, wherein the one or more investment data units includes business data, which includes at least one or more of: economic data, sector data, technology data, regulatory data, and tax data.

16. The system of claim 13, wherein the external criteria data includes at least capital market data, which includes at least one or more of: available general partner (GP) capital or goals data, limited partner (LP) criteria or goals data, credit enhancement criteria data, bond data, and rating agency data.

17. The system of claim 12, wherein the TALP control engine includes a financing engine and the temporally sequenced TALP output data is at least one or more of: GP equity output data, LP output data, credit enhancement output data, and bond year output data.

18. The system of claim 12, wherein modeling predictive outcomes is performed at a TALP family modeling engine.

19. The system of claim 18, wherein the TALP family modeling engine includes a return prediction engine.

20. The system of claim 19, wherein the optimized and discretized data includes projected return data, including at least one or more of: fund management return data, fund management GP returns, credit enhancer return data, LP return data, and bond investor return data.

21. The system of claim 12, wherein pooling temporally sequenced TALP output data includes pooled asset data, including at least one or more of: treasury bond data, stock data, bond data, real estate data, and cryptocurrency data.

22. The system of claim 21, wherein at least one of the treasury bond data, stock data, bond data, real estate data, and cryptocurrency data are provided to serve as collateral data for a Private Equity (PE) fund or a Real Estate Investment Trust (REIT).

* * * * *